(12) United States Patent
Miao et al.

(10) Patent No.: US 12,433,960 B2
(45) Date of Patent: Oct. 7, 2025

(54) VIVO GENE THERAPY USING INTRAOSSEOUS DELIVERY OF A LENTIVIRALGENE CONSTRUCT

(71) Applicant: Seattle Children's Hospital, Seattle, WA (US)

(72) Inventors: Carol Hsing Miao, Seattle, WA (US); David J. Rawlings, Seattle, WA (US); Chong Li, Seattle, WA (US)

(73) Assignee: Seattle Children's Hospital, Seattle, WA (US)

( * ) Notice: Subject to any disclaimer, the term of this patent is extended or adjusted under 35 U.S.C. 154(b) by 0 days.

(21) Appl. No.: 18/773,400

(22) Filed: Jul. 15, 2024

(65) Prior Publication Data

US 2024/0366797 A1   Nov. 7, 2024

Related U.S. Application Data

(63) Continuation of application No. 17/051,137, filed as application No. PCT/US2019/029490 on Apr. 26, 2019, now abandoned.

(60) Provisional application No. 62/663,930, filed on Apr. 27, 2018.

(51) Int. Cl.
| | |
|---|---|
| *A61K 48/00* | (2006.01) |
| *A61K 31/573* | (2006.01) |
| *A61K 39/395* | (2006.01) |
| *A61P 7/04* | (2006.01) |
| *C07K 16/28* | (2006.01) |

(52) U.S. Cl.
CPC ........ *A61K 48/0058* (2013.01); *A61K 31/573* (2013.01); *A61K 39/3955* (2013.01); *A61K 48/0075* (2013.01); *A61P 7/04* (2018.01); *C07K 16/2815* (2013.01)

(58) Field of Classification Search
None
See application file for complete search history.

(56) References Cited

U.S. PATENT DOCUMENTS

| | | | |
|---|---|---|---|
| 5,779,708 A | 7/1998 | Wu | |
| 8,821,871 B2 * | 9/2014 | Van Ryn | A61K 39/39583 |
| | | | 424/139.1 |
| 2005/0251872 A1 | 11/2005 | Bear et al. | |
| 2007/0190030 A1 | 8/2007 | Pawliuk et al. | |
| 2010/0216755 A1 | 8/2010 | Nihei et al. | |
| 2015/0191543 A1 | 7/2015 | Wu et al. | |
| 2016/0102133 A1 | 4/2016 | Xiao et al. | |

FOREIGN PATENT DOCUMENTS

| | | |
|---|---|---|
| CA | 2296319 A1 | 1/1999 |
| WO | 2016183593 A2 | 11/2016 |

OTHER PUBLICATIONS

Stryer, Biochemistry 4th, WH Freeman, New York. 1995 (Year: 1995).*
Baskaran, J. et al. Prothrombin Complex Concentrate. StatPearls Publishing LLC, 2023 NCBI Bookshelf ID: NBK539716 (Year: 2023).*
Wang, Xuefeng, Fu Richard, and Carol H. Miao. "Effective Therapy for Murine Hemophilia A by Enhancing Factor VIII Expression in Platelets." Blood 126.23 (2015): 5547 (Year: 2015).*
Miao, Carol Hsing, et al. "Intraosseous delivery of lentiviral vectors targeting factor VIII expression in platelets corrects murine hemophilia A." Molecular Therapy 23.4 (2015): 617-626 (Year: 2015).*
Siner, Joshua I et al. "Minimal modification in the factor VIII B-domain sequence ameliorates the murine hemophilia A phenotype." Blood vol. 121,21 (2013): 4396-403. doi:10.1182/blood-2012-10-464164 (Year: 2012).*
Agudo, et al., "A TLR and Non-TLR Mediated Innate Response to Lentiviruses Restricts Hepatocyte Entry and Can be Ameliorated by Pharmacological Blockade," Molecular Therapy, vol. 20, No. 12, 2012, pp. 2257-2267.
Aiuti, et al., "Gene therapy for ADA-SCID, the first marketing approval of an ex vivo gene therapy in Europe: paving the road for the next generation of advanced therapy medicinal products," EMBO Molecular Medicine, vol. 9, No. 6, 2017, pp. 737-740.
Astrakhan, et al., "Ubiquitous high-level gene expression in hematopoietic lineages provides effective lentiviral gene therapy of murine Wiskott-Aldrich syndrome," Blood, vol. 119, No. 19, 2012, pp. 4395-4407.
Carbonaro, et al., "In Vivo Transduction by Intravenous Injection of a Lentiviral Vector Expressing Human ADA into Neonatal ADA Gene Knockout Mice: A Novel Form of Enzyme Replacement Therapy for ADA Deficiency," Molecular Therapy, vol. 13, No. 6, 2006, pp. 1110-1120.
Challita, et al., "Multiple modifications in cis elements of the long terminal repeat of retroviral vectors lead to increased expression and decreased DNA methylation in embryonic carcinoma cells," Journal of Virology, vol. 69, No. 2, 1995, pp. 748-755.
Doering, et al., "Hematopoietic stem cells encoding porcine factor VIII induce pro-coagulant activity in hemophilia A mice with pre-existing factor VIII immunity," Molecular Therapy, vol. 15, No. 6, 2007, pp. 1093-1099.
Ertl, et al., "Impact of AAV Capsid-Specific T-Cell Responses on Design and Outcome of Clinical Gene Transfer Trials with Recombinant Adeno-Associated Viral Vectors: An Evolving Controversy," Human Gene Therapy, vol. 28, No. 4, 2017, pp. 328-337.

(Continued)

*Primary Examiner* — Zachariah Lucas
*Assistant Examiner* — Lia E Taylor
(74) *Attorney, Agent, or Firm* — C. Rachal Winger; Lee & Hayes PC

(57) ABSTRACT

Methods, compositions, and systems for treating subject(s) in need of plasma Factor VIII, particularly a subject having preexisting anti-FVIII inhibitory antibodies, are provided. The methods involve administering to the subject a therapeutically effective amount of an inflammation suppressor, a therapeutically effective amount of a CD8+ T cell depleting agent, and a therapeutically effective amount of a composition comprising a lentiviral vector (LV) comprising an optimized FVIII expression cassette expressibly linked to a megakaryocyte-specific promoter. Such methods, compositions, and systems are useful to treat subjects with blood clotting disorder(s), such as hemophilia A.

13 Claims, 52 Drawing Sheets

Specification includes a Sequence Listing.

(56) References Cited

OTHER PUBLICATIONS

Jin, et al., "The optimal choice of medication administration route regarding intravenous, intramuscular, and subcutaneous injection," Patient Preference and Adherence, vol. 9, 2015, pp. 923-942.

Lefrancais, et al., "The lung is a site of platelet biogenesis and a reservoir for haematopoietic progenitors," Nature, vol. 544, No. 7648, 2017, pp. 105-109.

Mcintosh, et al., "Therapeutic levels of FVIII following a single peripheral vein administration of rAAV vector encoding a novel human factor VIII variant," Blood, vol. 121, No. 17, 2013, pp. 3335-3344.

Miao, et al., "Bioengineering of coagulation factor VIII for improved secretion," Blood, vol. 103, No. 9, 2004, pp. 3412-3419.

Miao, et al., "CD4+FOXP3+ regulatory T cells confer long-term regulation of factor VIII-specific immune responses in plasmid-mediated gene therapy-treated hemophilia mice," Blood, vol. 114, No. 19, 2009, pp. 4034-4044.

Miao, Carol H., "Hemophilia A gene therapy via intraosseous delivery of factor VIII-lentiviral vectors," Thrombosis Journal, vol. 14, No. 41, 2016, 7 pages.

Nguyen, et al., "Novel factor VII variants with a modified furin cleavage site improve the efficacy of gene therapy for hemophilia A," Journal of Thrombosis and Haemostasis, vol. 15, No. 1, 2016, pp. 110-121.

Pasi, et al., "Interim results of an open-label, phase 1/2 study of BMN 270, an AAV5-FVIII gene transfer in severe hemophilia A," Haemophilia, vol. 22, No. S4, 2016, pp. 151-152.

PCT Search Report and Written Opinion for Application No. PCT/US19/29490, mailed on Jul. 14, 2020, 20 pages.

Pipe, S.W., "Functional roles of the factor VII B domain," Haemophilia, vol. 15, No. 6, 2009, pp. 1187-1196.

Pittman, et al., "Biochemical, immunological, and in vivo functional characterization of B-domain-deleted factor VIII," Blood, vol. 81, No. 11, 1993, pp. 2925-2935.

Podolska, et al., "Gene therapy prospects—intranasal delivery of therapeutic genes," Advances in Clinical and Experimental Medicine, vol. 21, No. 4, 2012, pp. 525-534.

Rangarajan, et al., "AAV5-Factor VIII Gene Transfer in Severe Hemophilia A," New England Journal of Medicine, vol. 377, No. 26, 2017, pp. 2519-2530.

Siner, et al., "Minimal modification in the factor VIII B-domain sequence ameliorates the murine hemophilia A phenotype," Blood, vol. 121, No. 21, 2013, pp. 4396-4403.

Wang, et al., "Enhancing Factor VIII Expression in Platelets of Hemophilia A Mice Following Intraosseous Delivery of Lentiviral Vectors," Hematologic and Immunologic Diseases, vol. 23, No. 245, 2015, 2 pages.

Wang, et al., "Rapamycin relieves lentiviral vector transduction resistance in human and mouse hematopoietic stem cells," Blood, vol. 124, No. 6, 2014, pp. 913-923.

Wang, et al., "Intraosseous Delivery of Lentiviral Vectors Targeting Factor VIII Expression in Platelets Corrects Murine Hemophilia A," Molecular Therapy, vol. 23, No. 4, 2015, pp. 617-626.

Ward, et al., "Codon optimization of human factor VIII cDNAs leads to high-level expression," Blood, vol. 117, No. 3, 2011, pp. 798-807.

Wust, et al., "Preventive Treatment with Methylprednisolone Paradoxically Exacerbates Experimental Autoimmune Encephalomyelitis," International Journal of Endocrinology, vol. 2012, No. 417017, 2012, 8 pages.

Chinese Office Action mailed Mar. 1, 2024 for Chinese Application No. 201980034701.8, a foreign counterpart to U.S. Appl. No. 17/051,137, 28 pages.

Wang, et al., "Effective Therapy for Murine Hemophilia A by Enhancing Factor VIII Expression in Platelets", Blood American Society of Hematology, vol. 126, No. 23, 2015, pp. 5547-5550.

* cited by examiner

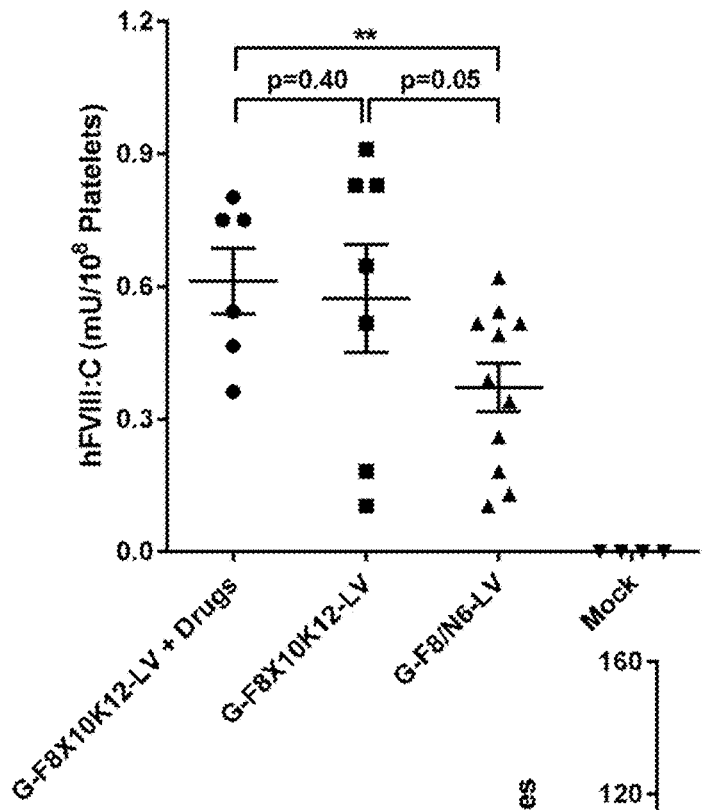
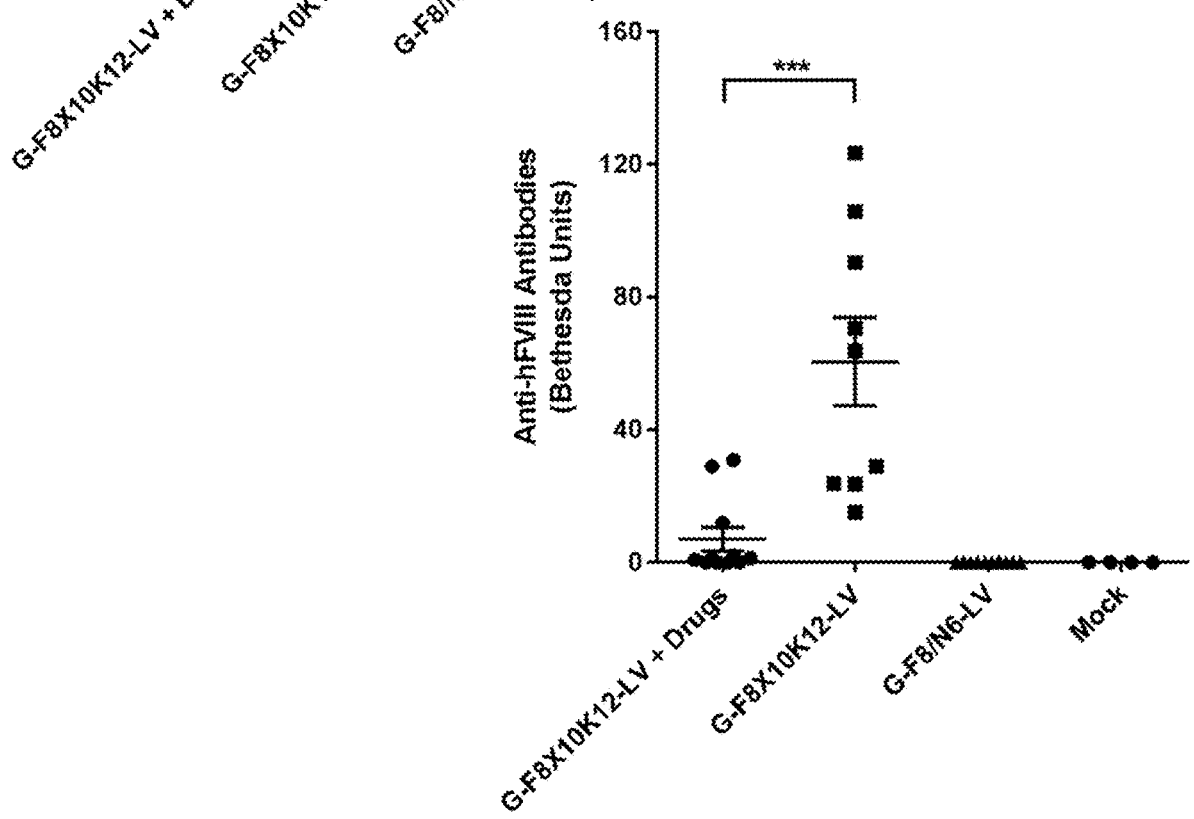

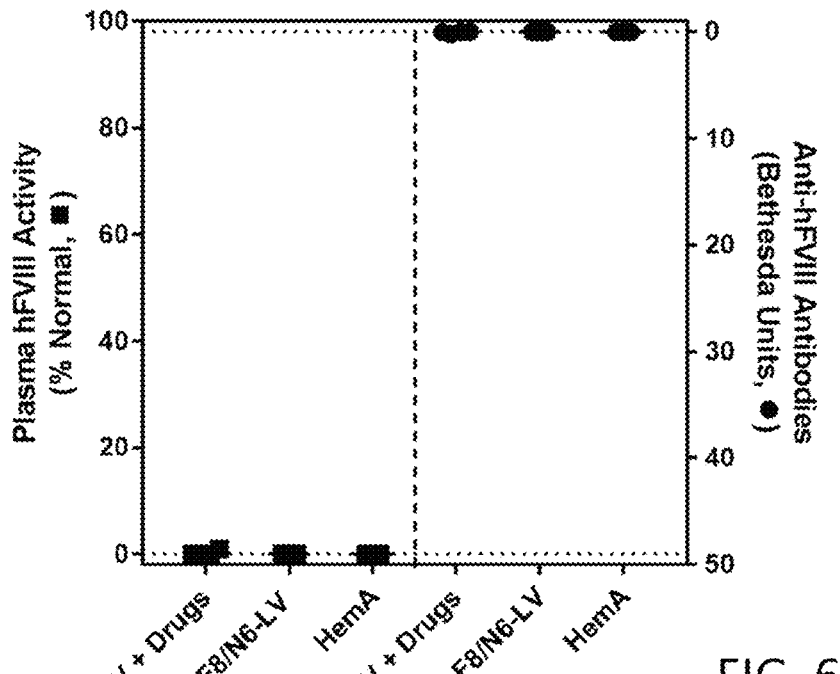
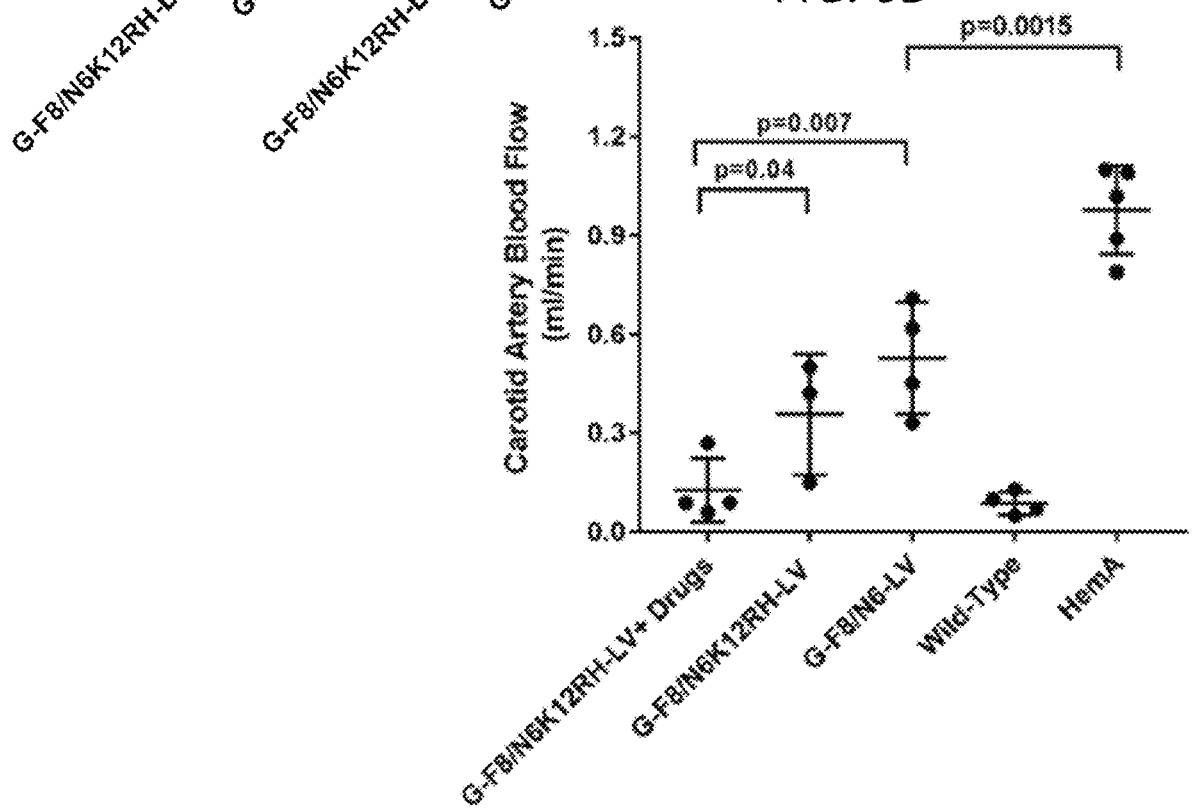

FIG. 11A
❖ LV-transduction of G-CSF mobilized human CD34+ PBSCs and evaluation of transgene expression in differentiated human cells *in vitro*.
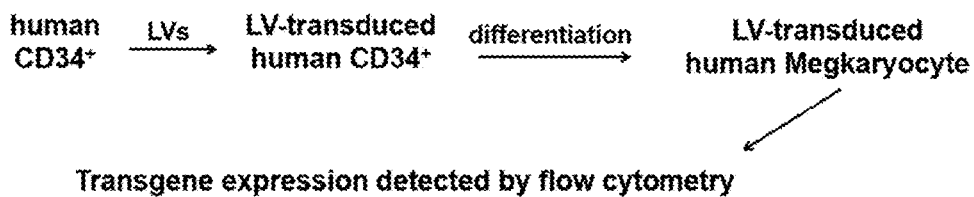
Transgene expression detected by flow cytometry
❖ Generation of humanized NSG mice
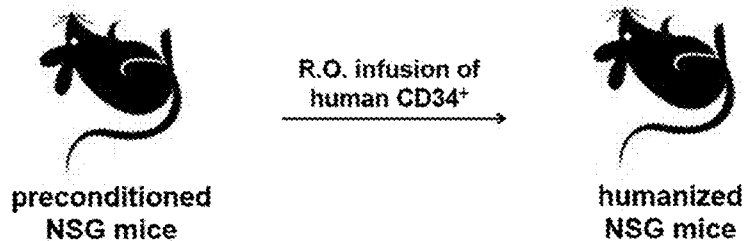
❖ IO delivery of LVs into humanized NSG mice
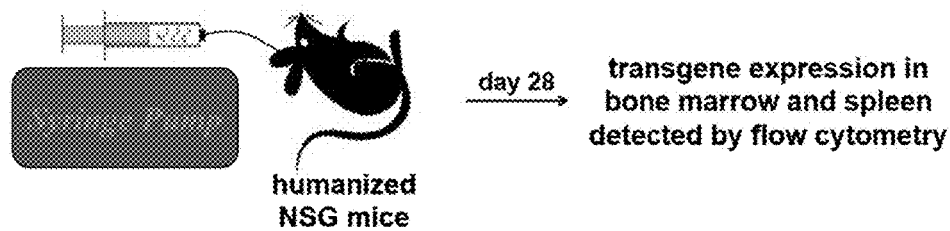
FIG. 11B
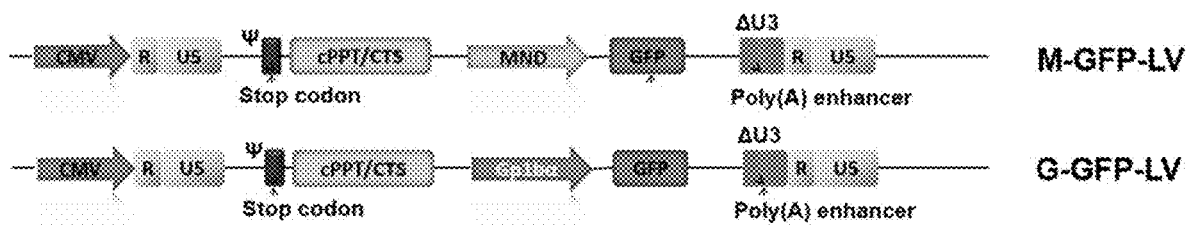

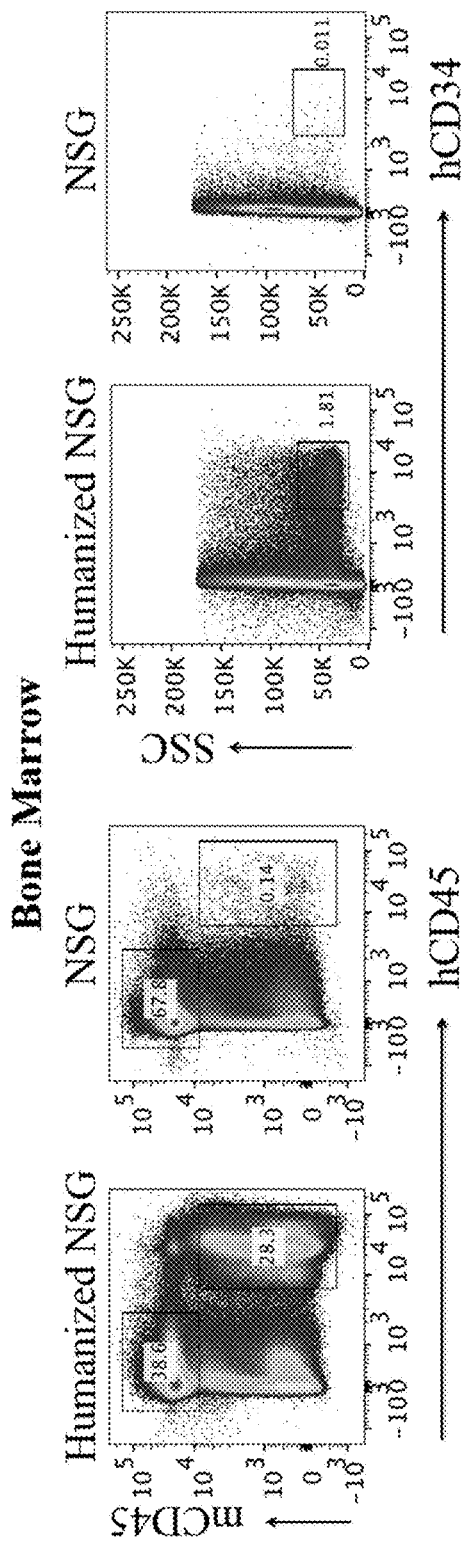
FIG. 13A Generation of Humanized NSG Mice — Bone Marrow
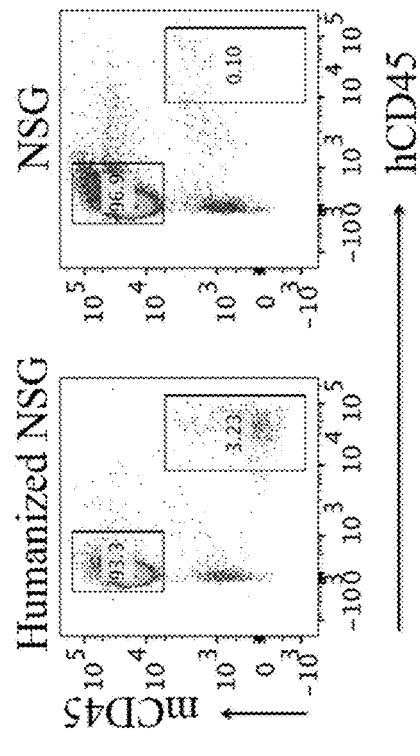
FIG. 13C Blood
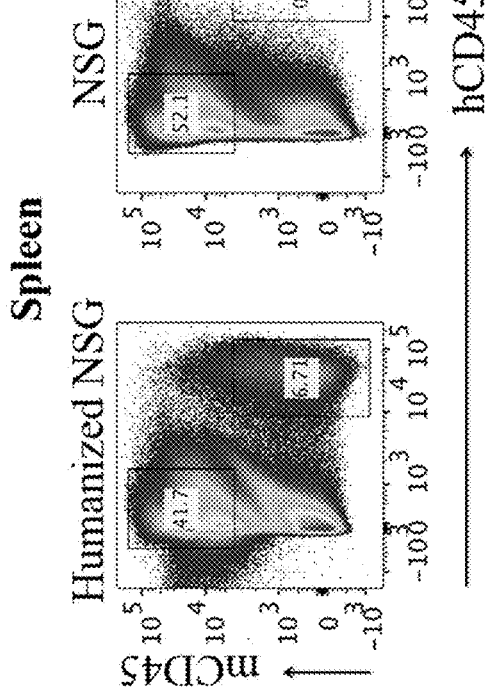
FIG. 13B Spleen

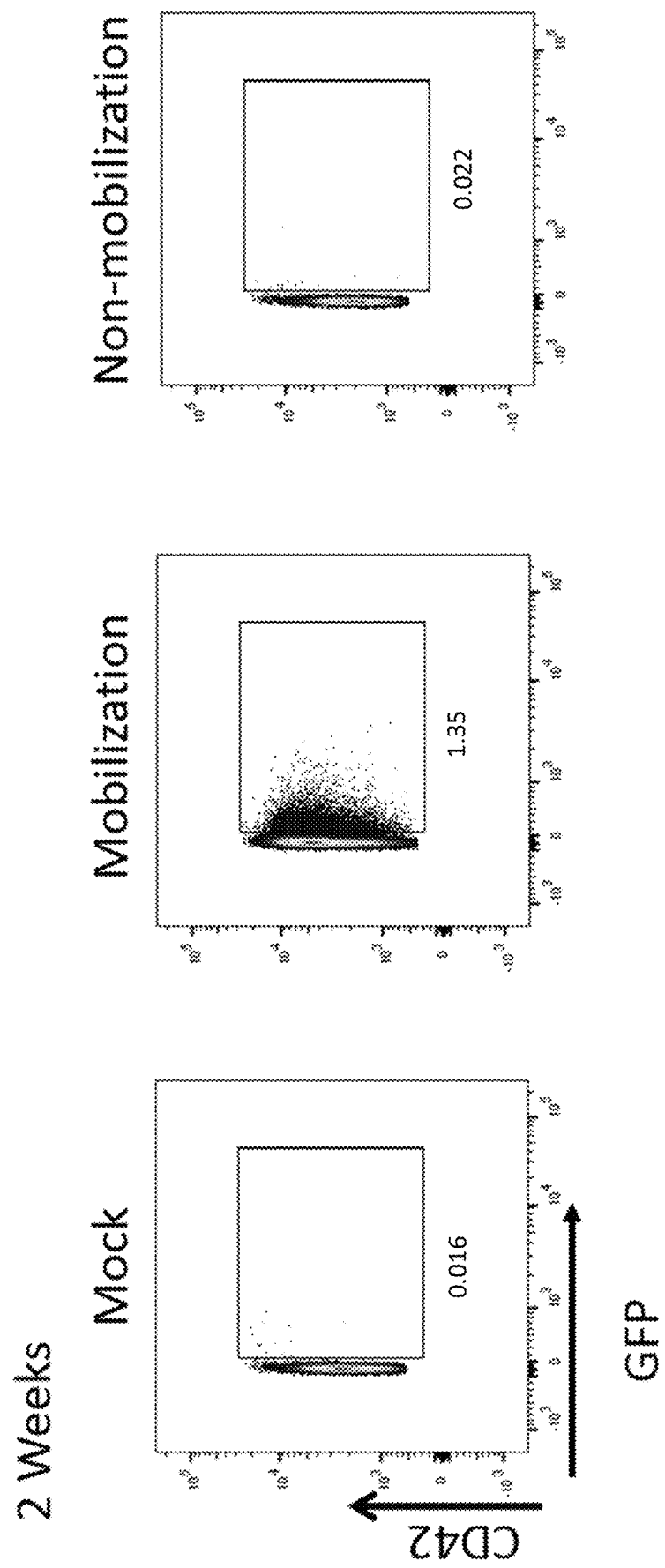

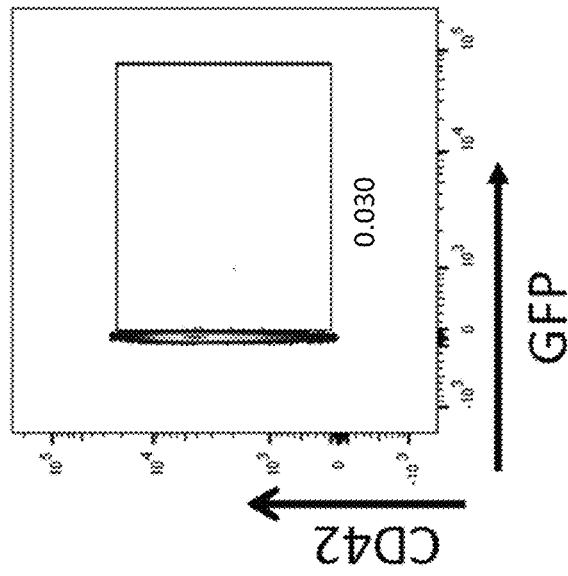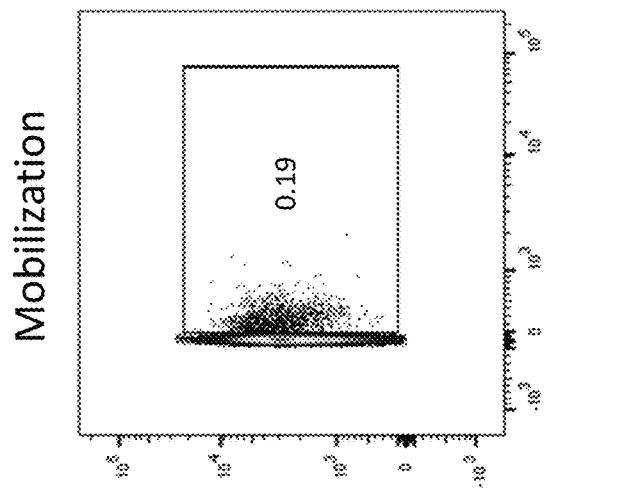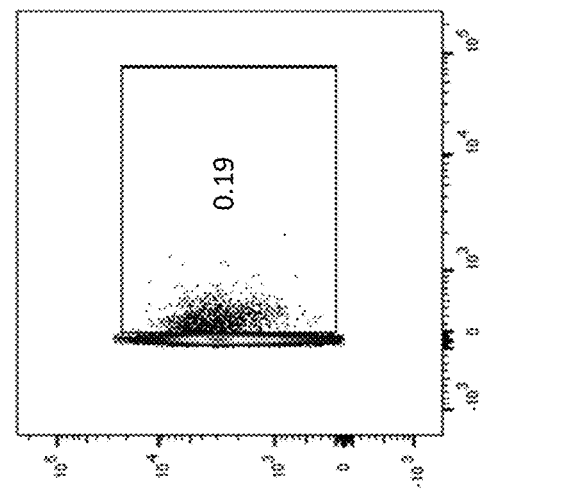
FIG. 18B, cont'd
10 Weeks

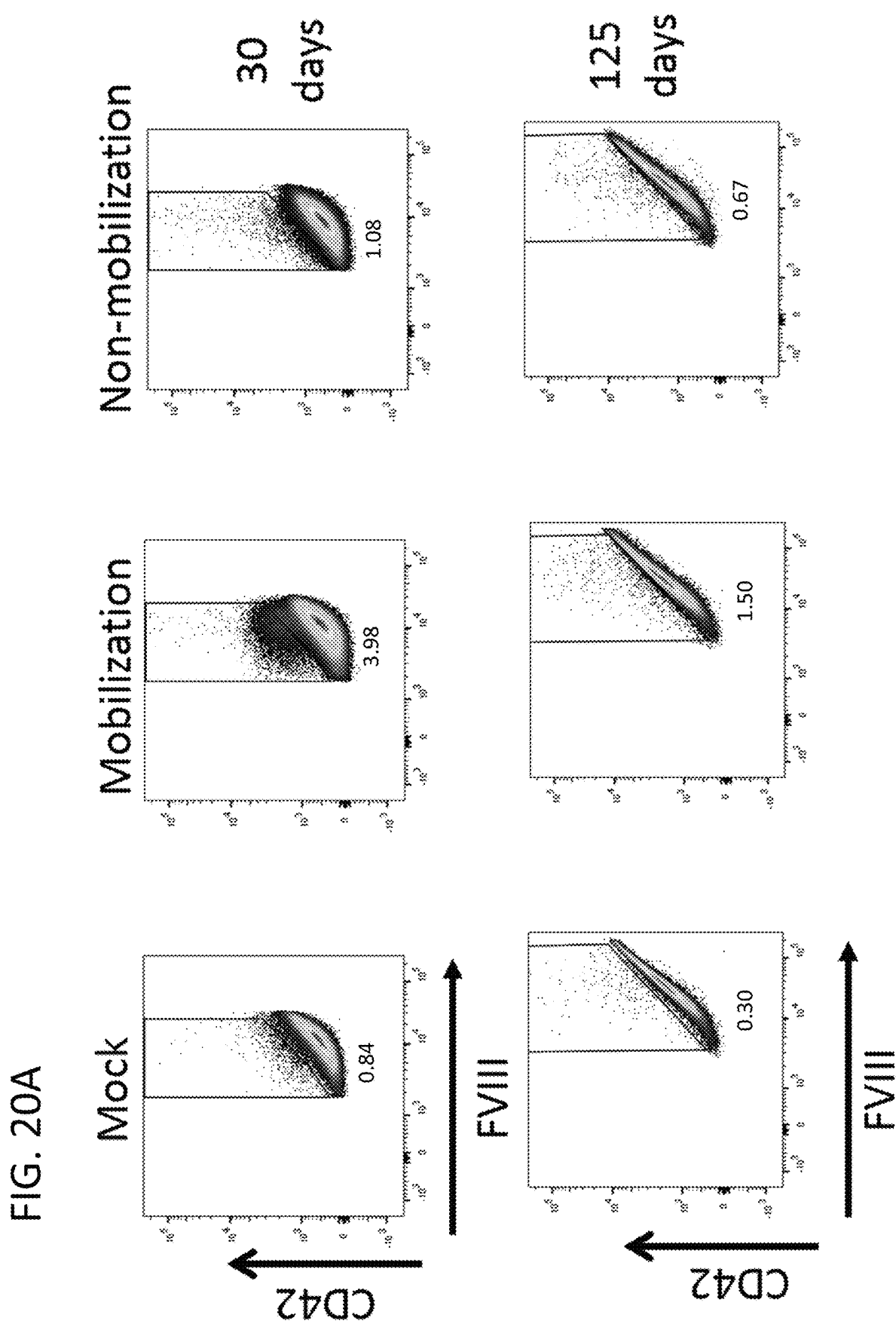

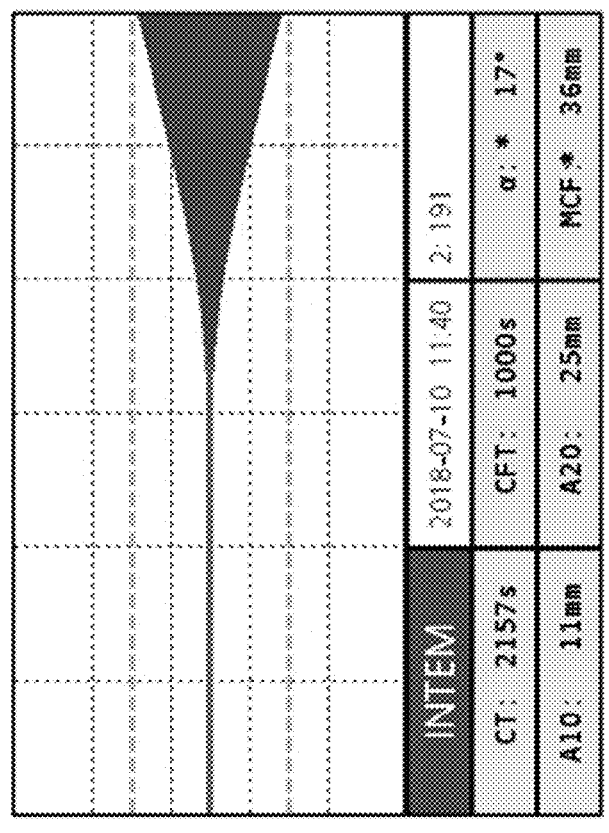
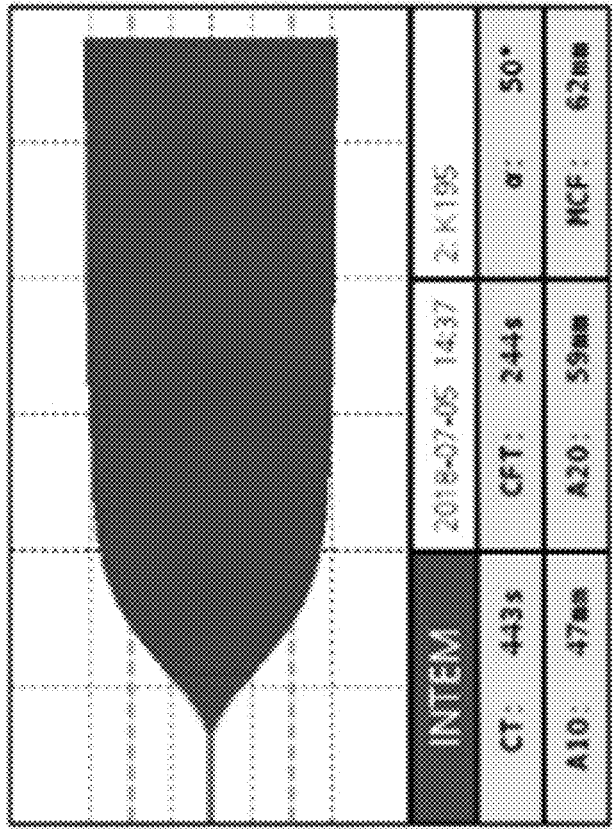
FIG. 21E mock     mobilized     Non-mobilized

FIG. 22E
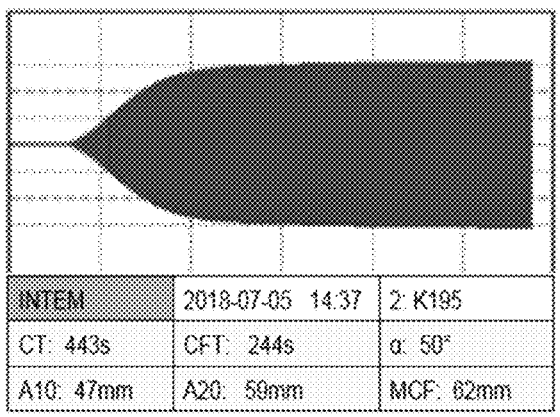
Panel 1
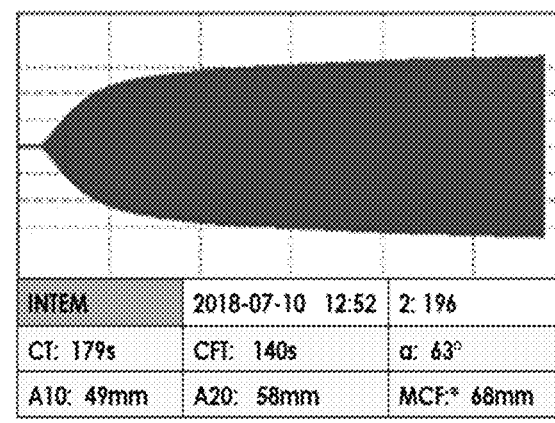
Panel 2
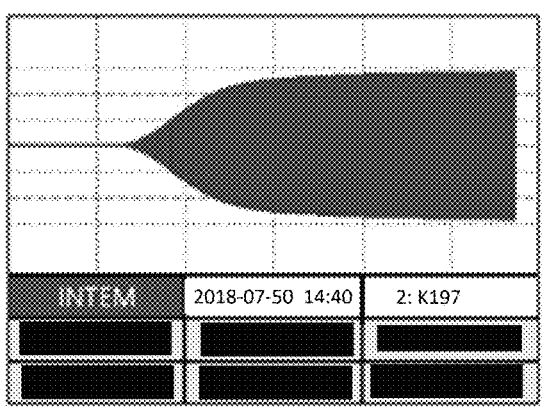
Panel 3
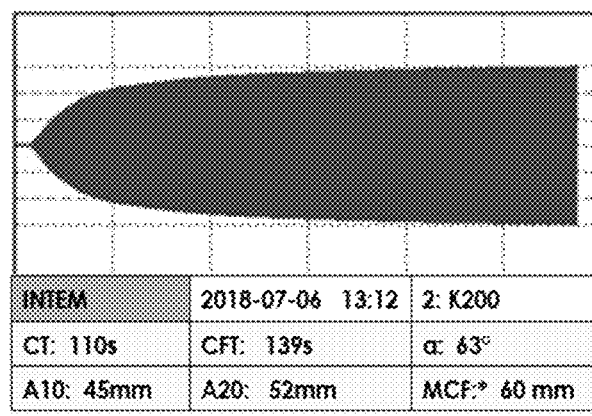
Panel 4
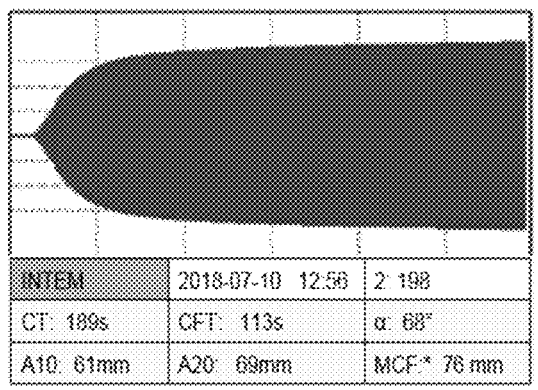
Panel 5

FIG. 22E, cont'd
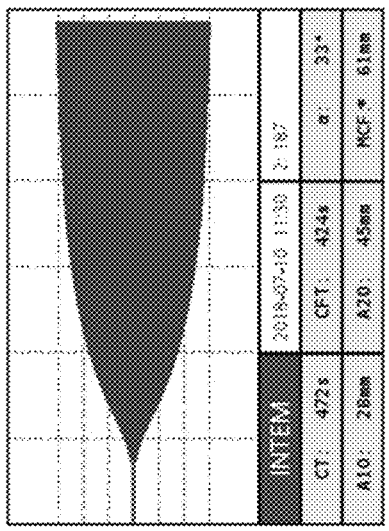
Panel 8
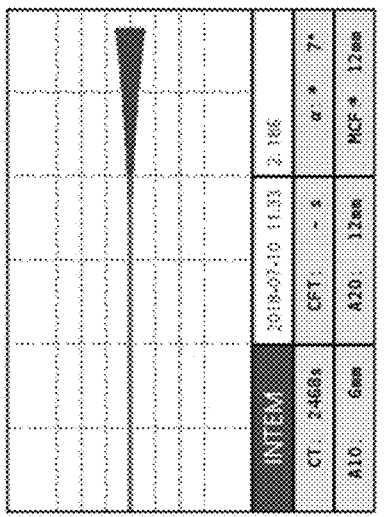
Panel 7
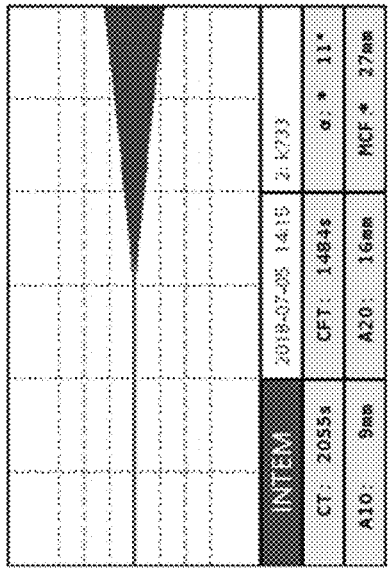
Panel 6
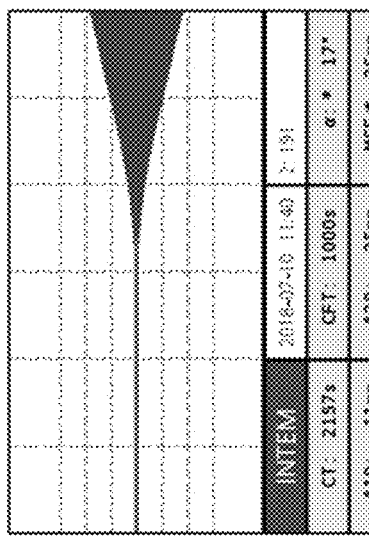
Panel 12
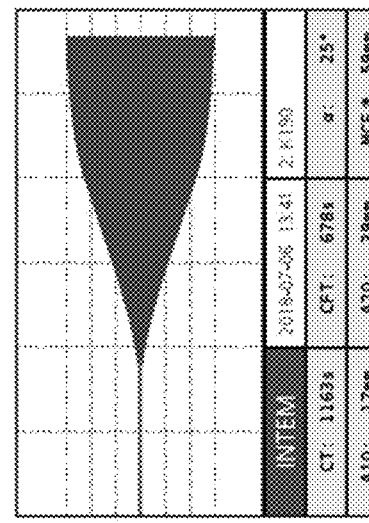
Panel 11
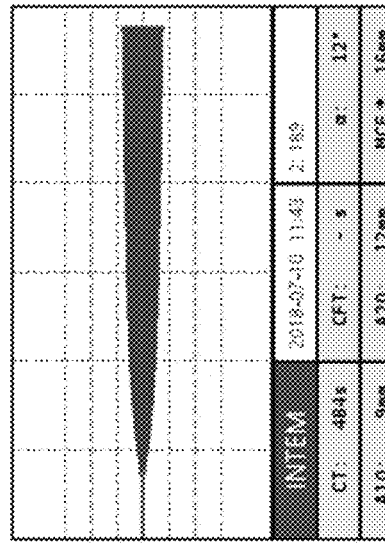
Panel 9

FIG. 22E, cont'd
hema     Panel 13                  Panel 14
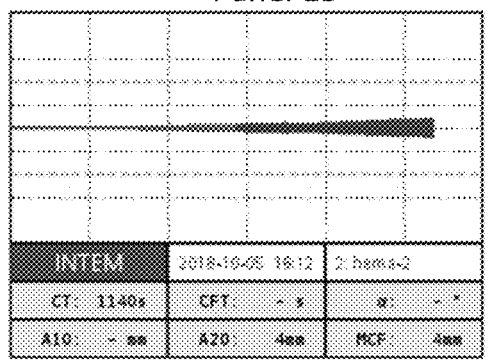 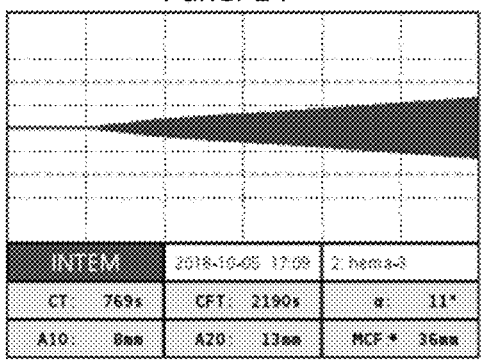
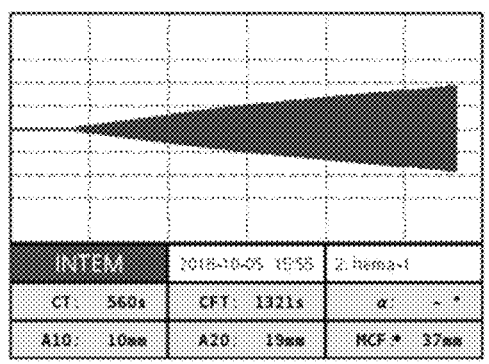
Panel 15
wt     Panel 16                  Panel 17
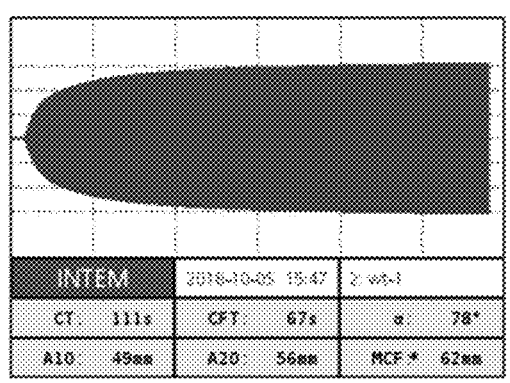 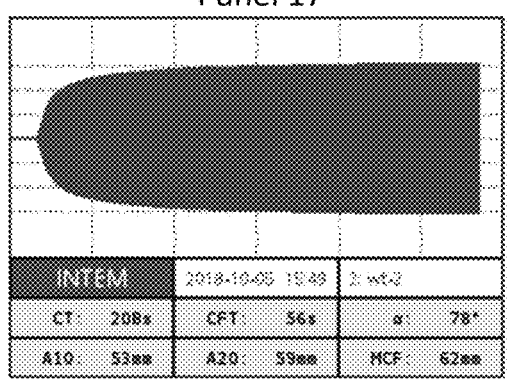
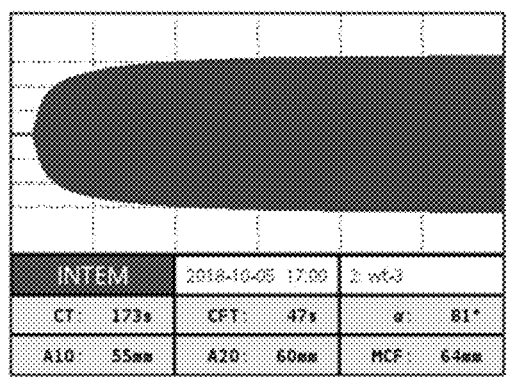
Panel 18

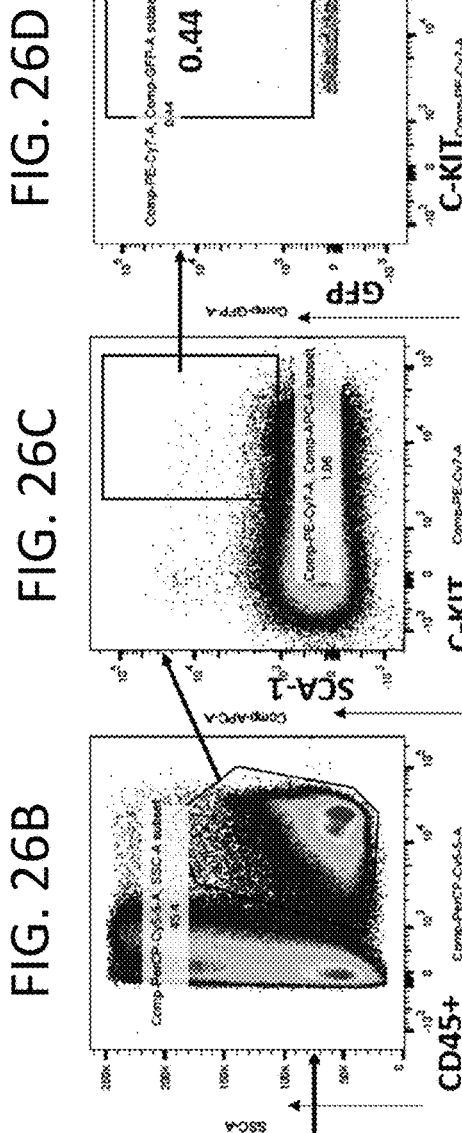
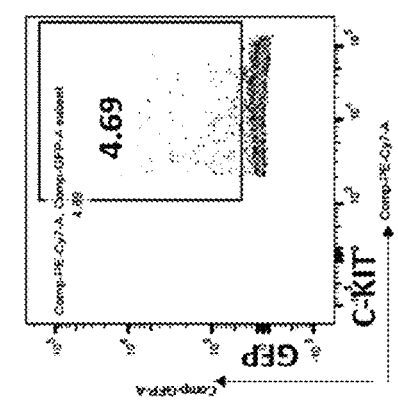
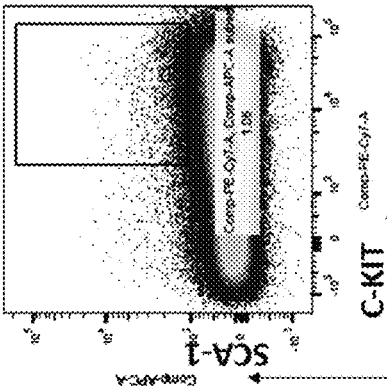
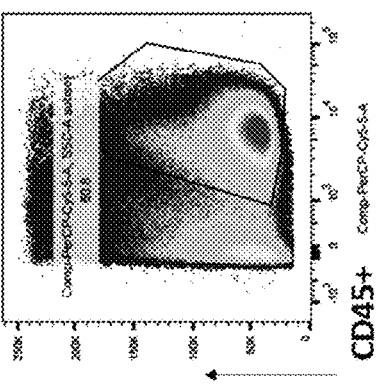
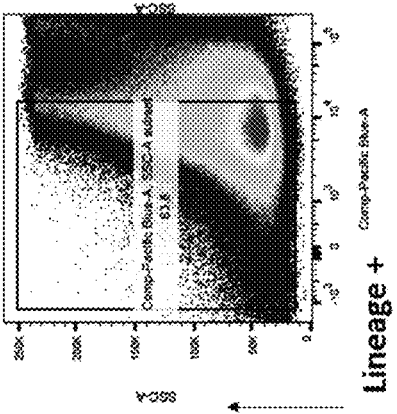

VIVO GENE THERAPY USING INTRAOSSEOUS DELIVERY OF A LENTIVIRAL GENE CONSTRUCT

CROSS-REFERENCE TO RELATED APPLICATIONS

This is continuation of U.S. patent application Ser. No. 17/051,137 filed Oct. 27, 2020, which is the 35 U.S.C. § 371 U.S. National Phase Application of International Patent Application No. PCT/US2019/029490, which was filed on Apr. 26, 2019, and which claims priority to U.S. Provisional Application No. 62/663,930 filed on Apr. 27, 2018. Each of these earlier filed applications is incorporated herein by reference in its entirety as if fully set forth herein.

STATEMENT REGARDING FEDERALLY SPONSORED RESEARCH OR DEVELOPMENT

This invention was made with government support under HL123326 and HL134321, awarded by the National Institutes of Health. The government has certain rights in the invention.

SEQUENCE LISTING

The Sequence Listing associated with this application is provided in xml format in lieu of a paper copy and is hereby incorporated by reference into the specification. The disclosed nucleic and/or amino acid sequences are shown using standard letter abbreviations for nucleotide bases, and one or three letter code for amino acids, as defined in 37 C.F.R. 1.832. Only one strand of each nucleic acid sequence is shown, but the complementary strand is understood as included by any reference to the displayed strand. A computer readable xml file, entitled "sequence_listing.xml" created on or about Jul. 15, 2024, with a file size of 49,152 bytes, contains the sequence listing for this application and is hereby incorporated by reference in its entirety. In the accompanying Sequence Listing and/or as provided herein:

SEQ ID NO: 1 is the nucleic acid sequence of the insert BDDFVIIIX10K12, which encodes the human FVIII variant F8X10K12; it differs from variant F8/N6 by a deleted B-domain, a 10-amino acid change in the AI domain and a 12-amino acid change in the light chain.

SEQ ID NO: 2 is the nucleic acid sequence of the insert BDDFVIIIn6K12RH, which encodes the human FVIII variant F8/N6K12RH; it differs from variant F8/N6 at a 12-amino acid change in the light chain and an amino acid change at the furin cleavage site within the B domain (position R1645H).

SEQ ID NO: 3 is the nucleic acid sequence of pRRL-GP1balpha-hF8X10K12-WPRE; the F8 cDNA insert hF8X10K12 (SEQ ID NO: 1) is at positions 2320-6738 of this sequence, which also includes the lentiviral vector backbone, platelet-specific GP1b alpha promoter, and WPRE element inserted in the vector to make stable mRNA.

SEQ ID NO: 4 is the nucleic acid sequence of pRRL-GP1balpha-hF8/N6K12RH-WPRE; the F8 cDNA insert hF8/N6K12RH (SEQ ID NO: 2) is at positions 2308-7414 of this sequence which also includes the lentiviral vector backbone, platelet-specific GP1b alpha promoter, and WPRE element inserted in the vector to make stable mRNA.

SEQ ID NOs: 5 and 6 are, respectively, the nucleotide sequences of forward and reverse amplification primer for GAG.

SEQ ID NO: 7 is the nucleotide sequence of a probe for GAG.

SEQ ID NOs: 8 and 9 are, respectively, the nucleotide sequences of forward and reverse amplification primer for human Factor VIII.

SEQ ID NOs: 10 and 11 are, respectively, the nucleotide sequences of forward and reverse amplification primer for Rp119.

FIELD OF THE DISCLOSURE

The present disclosure provides compositions and methods for in vivo gene therapy, for instance using intraosseous delivery or other delivery modes. Examples of such therapy provide platelet-specific expression of activity-enhanced plasma Factor VIII, for instance for treatment of hemophilia and other blood clotting disorders.

BACKGROUND OF THE DISCLOSURE

Inhibitory antibody formation against human factor VIII (FVIII) is a significant complication in treatment of hemophilia A (HemA) patients. Ectopic expression of FVIII in platelets could be an effective approach for treating HemA. Unlike circulating plasma FVIII, FVIII stored in α-granules of platelets is protected from being processed by antigen presenting cells, therefore significantly reducing the chance to induce anti-FVIII immune responses. Moreover, platelet FVIII is not neutralized by preexisting anti-FVIII inhibitory antibodies (inhibitors), which will benefit HemA patients who already developed inhibitors. During bleeding, the activated platelets locally excrete FVIII that can directly participate in the coagulation cascade and promote clot formation. It has recently been demonstrated that low levels of platelet FVIII can partially correct hemophilia phenotype in animal models.

One approach to direct FVIII long-term expression in platelets is intraosseous (IO) infusion of lentiviral vectors (LVs) carrying a FVIII transgene controlled by a megakaryocyte specific promoter Gp1bα (Gp1bα-F8-LVs). In this in vivo gene therapy protocol of HemA, hematopoietic stem cells (HSCs) were efficiently transduced by LVs in situ, followed by FVIII transgene expression in the late stage of megakaryocyte differentiation, and finally storage of FVIII protein in α-granules of platelets. Previous work showed that a single IO infusion of Gp1bα-F8-LV resulted in over 3% platelets containing hFVIII, leading to partial phenotype correction in immune competent HemA mice with and without pre-existing inhibitors.

Furthermore, in vivo delivery of LVs can avoid many difficulties and potential toxicities encountered by ex vivo gene therapy including loss of stem cell properties and engraftment potential after cell transfer, negative effects of ex vivo cytokine stimulation and pre-conditioning of the subject. However, one potential limitation of in vivo gene therapy protocols is the induction of LV-specific immune responses, which may decrease LV transduction efficiency and eliminate LV transduced cells.

HemA, characterized by a deficiency of functional plasma FVIII, is an ideal disease candidate for gene therapy to attain long-term therapeutic FVIII levels. An optimized transgene for effective in vivo gene therapy of hemophilia would confer a higher gene expression level and a transgene product with enhanced biological activity. Since the size of a full-length human FVIII cDNA is quite large (>7 kbp), it cannot be easily packaged in viral vectors, often resulting in low titers of viruses. Shorter cDNAs coding for FVIII variants have therefore been used in gene therapy preclinical research. For instance, a B-domain deleted FVIII (BDD-FVIII) variant exhibits similar functional activity as the full-length FVIII. Additional mutations have been incorporated into the gene coding for the BDD-FVIII to increase its secretion, such as, F8/N6 with a 226 aa B-domain variant sequence (Miao et al., *Blood* 103:3412-3419, 2004), codon optimized BDD-FVIII and F8/N6 (Ward et al., Blood 117: 798-807, 2011), F8-V3 (McIntosh et al., *Blood* 121:3335-3344, 2013) with a 17-aa peptide coding sequence replacing the 226 aa/N6 in F8/N6, and F8-RH encoding a BDD-FVIII variant with R1645H (Siner et al., *Blood* 121:4396-4403, 2013). Some FVIII variants, like FVIII-RH and furin-cleavage site deleted BDD-FVIII variants (Nguyen et al., *J Thromb Haemostas.* 15:110-121, 2017), exhibit an increase in biological activity compared with BDD-FVIII, likely due to its slower dissociation of the A2-domain upon thrombin activation.

U.S. Pat. No. 5,779,708 describes an intraosseous and/or hard tissue drug delivery device and method that perforates hard tissue and provides a drug delivery passage into underlying tissue. The device includes a hollow drill bit and a stylet removably inserted into the hollow drill bit. The stylet, which keeps the bore of the hollow drill bit from plugging up during drilling, is removed after drilling to permit the operator to inject medication through the bore of the hollow drill bit.

In spite of previous work, there still exists a need for safe and reliable methods of replacing or supplementing functional FVIII in a subject. There is a particular need for methods which do not rely on pre-conditioning or myeloablative treatments, and which can provide therapeutic benefit (such as appropriate clotting function) in spite of the presence of inhibitory anti-FVIII antibodies in the subject to be treated.

SUMMARY OF THE DISCLOSURE

Described herein is the development of clinically relevant strategies for treating HemA. In examples of these strategies, self-inactivating lentiviral vectors (LV) carrying various different FVIII variant transgenes (including variants optimized for expression in this system) driven by a platelet-specific promoter Gp1bα (G) were delivered into HemA subjects without preconditioning. In some embodiments, this transgene is delivered via intraosseous (IO) administration (for instance into the tibia or iliac bone). In other embodiments, delivery is intranasal (or otherwise to the lung) or intravenous. The provided FVIII transgenes can effectively transduce hematopoietic stem cells (HSCs), largely without elicitation of anti-FVIII inhibitory antibodies (anti-FVIII inhibitors). The resulting FVIII is expressed and stored in platelet α-granules, and can at least partially correct bleeding phenotype in immune-competent HemA subjects, even in the presence of pre-existing anti-FVIII inhibitors.

Embodiments of the current disclosure describe compositions and methods that enable combination treatments including IO delivery of LVs expressing a platelet-targeted modified FVIII gene. for treatment of hemophilia. The use of IO delivery for efficient transduction of HSCs in vivo results in a low inflammatory and/or immune response in the subject, accompanied by low systemic toxicity. This is particularly beneficial for certain subjects, including for instance subjects with a bleeding disorder such as hemophilia.

Additional embodiments provide a method of treating a subject in need of plasma Factor VIII, including: administering to the subject a therapeutically effective amount of an inflammation suppressor (such as dexamethasone (Dex)); administering to the subject a therapeutically effective amount of a CD8+ T cell depleting agent; and administering to the subject a therapeutically effective amount of a composition including a lentiviral vector including an optimized FVIII expression cassette expressibly linked to a megakaryocyte-specific promoter, wherein administration is via intraosseous (IO) infusion; intravenous (IV) delivery; or intranasal (IN) or inhaled delivery.

In examples of this method of treatment embodiment, the dexamethasone is administered in doses of 100 mg/kg at −24 h before, −4 h before, 4 h after, and 24 h after administration of the LV.

In examples of the provided embodiments, the CD8+ T cell depleting agent includes an anti-CD8 antibody. For instance, in examples, the CD8+ T cell depleting agent is an anti-CD8α mAb administered in doses of 4 mg/kg at −1 day before, 4 days after, and 11 days after delivery of the LV.

In other examples of the provided embodiments, the megakaryocyte-specific promoter is a GP1 b-alpha promoter.

Specifically contemplated in examples of the provided embodiments are methods that do not include pre-conditioning or myeloablative treatment of the subject.

In more examples of the provided embodiments, the IO infusion is carried out at a rate of 2 µL/min to 15 µL/min, 5 µL/min to 12 µL/min, or at no more than 10 µL/min. For instance, the IO infusion in some examples is carried out at a rate of 0.01 mL/min to 0.5 mL/min, 0.05 mL/min to 0.3 mL/min, 0.1 mL/min to 0.25 mL/min, or at no more than 0.4 mL/min. Optionally, the IO infusion is carried out over a period of no more than 45 minutes.

In yet additional examples, the optimized FVIII expression cassette includes hF8X10K12 (SEQ ID NO: 1) or hF8/N6K12RH (SEQ ID NO: 2). In any of the provided embodiments, the lentiviral vector may include SEQ ID NO: 3 or SEQ ID NO: 4, or a functional variant thereof.

Also provided are examples of the herein provided methods, which are methods for treating a hemostasis related disorder in the subject, and the subject is in need of such treatment. By way of example, the subject may have hemophilia A (hemA), von Willebrand disease, bleeding associated with trauma or injury, thrombosis, thrombocytopenia, stroke, coagulopathy, disseminated vascular coagulation (DIC), or over-anticoagulation treatment disorder.

In yet another embodiment of the provided treatment method, the subject is a HemA subject with preexisting anti-FVIII inhibitory antibodies.

Also provided are methods of treating a subject in need of plasma Factor VIII, essentially as described herein.

BRIEF DESCRIPTION OF THE FIGURES

At least one of the drawings submitted herewith is better understood in color. Applicant considers the color versions of the drawing(s) as part of the original submission and reserve the right to present color images of the drawings in later proceedings.

(FIG. 2A) Schematic of IO infusion of M-GFP-LVs into BL6 mice pretreated with intraperitoneal injection of Dexamethasone (Dex, 100 mg/kg, 4×, −24 h, −4 h, 4 h and 24 h) or anti-CD8α mAb (4 mg/kg, 3×, day −1, 4 and 11, or 5×, day −1, 4, 11, 16 and 21), or combined drugs (Dex 4×+Anti-CD8α mAb 5×). GFP expression in total bone marrow cells and HSCs (Lin⁻C-Kit⁺Sca1⁺) was measured by flow cytometry. (FIG. 2B) BL6 mice were pretreated with Dex following IO infusion of MND-GFP-LVs (8.8×10⁸ ifu/animal) or sterile PBS (20 µl/animal, mock). GFP expression in total bone marrow cells (left panel) and HSCs (right panel) was detected on Day 7. (FIG. 2C) BL6 mice were pretreated with anti-CD8α mAb (3×) following with IO infusion of GFP-LVs (8.8×10⁷ ifu/animal) or sterile PBS (20 µl/animal, mock). GFP expression in total bone marrow cells (left panel) and HSCs (right panel) was detected on Day 9, 30 and 63. (FIG. 2D) BL6 mice were pretreated with combined drugs following with IO infusion of GFP-LVs (3.6×10⁸ TU/animal) or sterile PBS (20 µl/animal, mock). GFP expression in total bone marrow cells (left panel) and HSCs (right panel) was detected on Day 7, 69 and 160. (FIG. 2E) Genomic DNA of the peripheral white blood cells (left panel) or of bone marrow cells (right panel) were isolated from the treated mice on day 160 in (FIG. 2D). GFP-LV copy number in these blood cells were detected by real time qPCR. Data were expressed as mean±SED. Differences were considered significant at $p<0.05(*)$, $p<0.01()$ and $p<0.001(*)$. Data shown were from two independent experiments.

(FIG. 3A) HemA phenotype correction of G-F8/N6-LV or G-F8/N6-LV+drugs treated mice was evaluated by tail clip assay on day 70 (n=6-8/group). The average blood loss of untreated HemA mice was set as 100%. Wild-type C57BL/6 mice were used as positive controls. (FIG. 3B) HemA phenotype correction of G-F8/N6-LV+drugs or G-F8/N6-LV treated mice was also evaluated by measuring carotid artery blood flow rate on day 84. (FIG. 3C) Plasma samples were collected from the G-F8/N6-LV+drugs or G-F8/N6-LV treated mice on day 84. hFVIII activity and anti-FVIII antibodies were measured by aPTT and Bethesda assay, respectively. The level of hFVIII activity in untreated HemA mice was corrected as 0% of normal and its level of anti-FVIII antibodies was 0 Bethesda unit. Each symbol represented an individual animal. Data were expressed as mean±SED. Differences were considered significant at $p<0.01()$, $p<0.001(*)$ and $p<0.0001(****)$.

(FIG. 4A) Schematic of a new human FVIII cDNA variant. Compared to F8/N6, F8X10K12 had a deleted B-domain, a 10-amino acid change in the AI domain and a 12-amino acid change in the light chain. (FIG. 4B) Both BDDF8X10K12 and F8/N6 were cloned into a lentiviral transgene backbone plasmid controlled under a ubiquitous promoter EF1α (pEF1α-F8X10K12 and pEF1α-F8/N6), respectively. Then HemA mice were hydrodynamically injected with pEF1α-F8X10K12 (n=3) or pEF1α-F8/N6 (n=9) (50 µg/animal) or sterile PBS (mock, 2 ml/animal). Plasma samples were collected on day 4 post injection and hFVIII activity was measured by aPTT. Data were expressed as mean±SED. Differences were considered significant at $p<0.0001 (****)$. (FIG. 4C) Both E-F8X10K12-LV and E-F8/N6-LV were generated to transduce 293T cells (MOI=100) on day 0. On day 5, hFVIII expression levels in 293T cells were detected by flow cytometry.

FIGS. 5A-5F: Phenotype correction was achieved in drugs pretreated HemA mice following with IO infusion of G-F8X10K12-LVs. (FIG. 5A) Schematic of a self-inactivating LV genome encoding F8X10K12 under the control of platelet-specific glycoprotein 1bα promoter (Gp1bα) (G-F8X10K12-LV). (FIG. 5B) HemA mice were pretreated with drugs (Dex 4×+Anti-CD8α mAb 5×) following with IO infusion of G-F8X10K12-LVs (2.2×10⁶ ifu/animal), or were only given IO infusion of G-F8/N6-LV (2.2×10⁶ ifu/animal) or G-F8X10K12-LVs (2.2×10⁶ ifu/animal) or sterile PBS (mock, 20 µl/animal) on day 0. hFVIII levels in platelet lysates in G-F8X10K12-LV+drugs treated mice or G-F8X10K12-LV only treated or G-F8/N6-LV only treated or mock were measured by ELISA on day 90. Each symbol represented an individual animal. (FIG. 5C) Anti-FVIII antibodies in the plasma samples collected from the treated and mock mice were measured by Bethesda assay on day 120. The level of anti-FVIII antibodies in mock mice was 0 Bethesda unit. Each symbol represented an individual animal. (FIG. 5D) LV copy numbers in peripheral white blood cells of treated or mock were detected by qPCR on day 120. Each symbol represented an individual animal. (FIG. 5E) HemA phenotype correction of the treated mice was monitored by tail clip assay on day 120. The average blood loss of untreated HemA mice was set as 100%. Wild-type C57BL/6 mice were used as positive controls. Each symbol represented an individual animal. (FIG. 5F) Platelet-rich plasma was isolated from the treated mice on day 200 and functional activity of FVIII was evaluated by thrombin generation assay. The generated thrombin in the assay was evaluated by three parameters: lag phase time, peak thrombin concentration and total thrombin. Data were expressed as mean±SED. Differences were considered significant at $p<0.01()$, $p<0.001(*)$ and $p<0.0001(****)$.

FIGS. 6A-6D: Phenotype correction was achieved in transiently immune suppressed HemA mice following with IO infusion of G-F8/N6K12RH-LVs. (FIG. 6A) Schematic of a new human FVIII cDNA variant—F8/N6K12RH. Compared to F8/N6, F8/N6K12RH had a 12-amino acid change in the light chain and an amino acid change at the furin cleavage site within the B domain (position R1645H). F8/N6K12RH was cloned into a lentiviral transgene backbone plasmid controlled under a ubiquitous promoter EF1α (pEF1α-F8/N6K12 RH). Then HemA mice were hydrodynamically injected with pEF1α-F8/N6K12RH (n=3) (50 µg/animal) or pEF1α-F8/N6 (n=5) (50 µg/animal) or sterile PBS (n=3) (mock, 2 ml/animal). Plasma samples were collected on day 4 post injection and hFVIII activity was measured by aPTT. (FIG. 6B) Schematic of a self-inactivating LV genome encoding F8/N6K12RH under the control of platelet-specific glycoprotein 1bα promoter (Gp1bα) (G-F8/N6K12RH-LV). (FIG. 6C) HemA mice were pretreated with drugs (Dex 4x+Anti-CD8α mAb 5x) following with IO infusion of G-F8/N6K12RH-LV ($2.2 \times 10^6$ ifu/animal) or of G-F8/N6-LV ($2.2 \times 10^6$ ifu/animal) or sterile PBS (mock, 20 μl/animal) on day 0. Plasma samples were collected from the treated mice or mock on day 84. hFVIII activity and anti-FVIII antibodies were measured by aPTT and Bethesda assay, respectively. The level of hFVIII activity in untreated HemA mice was corrected as 0% of normal and its level of anti-FVIII antibodies was 0 Bethesda unit. (FIG. 6D) HemA phenotype correction of G-F8/N6-LV only or G-F8/N6K12RH-LV+drugs treated mice was also evaluated by measuring carotid artery blood flow rate on day 84. Each symbol represented an individual animal. Data were expressed as mean±SED. Differences were considered significant at $p<0.05(*)$.

FIG. 7A hFVIII variants. Compared to F8/N6, F8X10K12 had a deleted B-domain, a 10-amino acid change in the AI domain and a 12-amino acid change in the light chain, and F8/N6K12RH had a 12-amino acid change in the light chain and an amino acid change at the furin cleavage site within the B domain (position R1645H). FIG. 7B Schematics of self-inactivating LV constructs encoding GFP under the control of a MND promoter or various hFVIII variants including F8/N6, F8X10K12 and F8/N6K12RH under the control of a ubiquitous EF1α promoter, or platelet-specific GP1 BA promoter.

(FIG. 8A) Intraperitoneal injection of anti-CD8α mAb (4 mg/kg, n=3) or sterile PBS (200 μl/animal, n=3) on day 0. On day 7, blood cells were collected and the percentage of $CD8\alpha^+CD3\epsilon+$ was detected by flow cytometry. (FIG. 8B) BL6 mice were pretreated with anti-CD8α mAb (4 mg/kg, 3×, day −1, 4 and 11) following with IO infusion of MND-GFP-LVs ($1.8 \times 10^8$ ifu/animal, n=10) or sterile PBS (20 μl/animal, mock, n=4). Blood samples were collected by retro-orbital bleeding and bone marrow cells were obtained after the treated mice or mock were sacrificed at different time points. The change of the percentage of $CD8\alpha^+CD3\epsilon$ over time was monitored by flow cytometry. Data were expressed as mean.

FIGS. 11A-11B illustrate proof-of-principle research models in humanized NSG mice. FIG. 11A is a flow chart showing steps of methods described in Example 3. FIG. 11B is schematic drawings of two lentiviral (LV) constructs used in the studies described in Example.

FIGS. 13A-13C. 6-week NSG mice were retro-orbitally injected with $1 \times 10^6$ human CD34+ cells one day after preconditioning with busulphan (25 mg/kg). After 13 weeks, bone marrow (FIG. 13A), spleen (FIG. 13B), and blood (FIG. 13C) were collected. Human CD34+ cells in bone marrow, and human CD45+ cells and murine CD45+ cells in bone marrow, spleen and blood were detected by flow cytometry.

(FIG. 17A) The mobilization drug is used to mobilize HSC from BM to blood in mice. Representative flow cytometry plot of LSKs (Lineage−, sca1+, c-kit+) in peripheral blood after mobilization by GSF and AMD3100. (FIG. 17B) After mobilization, IV delivery of GFP Lenti-vectors driven by a ubiquitous MND promoter was injected via retro orbital injection. The total GFP expression in PBMCs was detected at various time points. (FIG. 17C) LSK cells from mobilization treatment group or non-mobilization group were analyzed by flow cytometry. (FIGS. 17D-17F) Percentage of GFP marked cells, as determined by flow cytometer detection in T, B and Myeloid cells after treatment day 4 to 10 weeks. (FIG. 17G) MFI was analyzed after MND-GFP-LVs transduction in total bone marrow cells in different groups (FIG. 17H) MFI was determined after MND-GFP-LVs transduction in HSCs of bone marrow in different groups. Mock n=3, Mobilization group n=5, non-mobilization group n=5, $p<0.05(*)$.

FIGS. 18A-18B. Gp1bα promoter drives GFP expression in platelets after G-GFP-LVs injection in mobilized mice. (FIG. 18A) G-GFP positive platelets are detected in total platelets post G-GFP-LV injection by flow cytometry. (FIG. 18B, parts 1 and 2) The flow cytometry schematic presentation of GFP+ platelets at 2 weeks and 10 weeks. Mock n=3, Mobilization group n=5, non-mobilization group n=5, $p<0.01$ (**).

(FIG. 19A) Quantity of the circulatory FVIII in plasma was examined by ELISA assay. (FIG. 19B) Activity of the circulatory FVIII in plasma was detected by APTT assay. Meanwhile inhibition of the FVIII in plasma was detected by Bethesda assay. Mobilization group n=3, non-mobilization group n=3.

FIGS. 20A-20E. FVIII protein can be stored in platelets after G-FVIII-LV treatment. (FIG. 20A) The representative flow cytometry schematic of FVIII+ platelets at day 30 and 125. (FIG. 20B) The hFVIII intracellular staining in platelet were measured by flow cytometer on day 12, 30, 65,90 and 125. (FIG. 20C) The hFVIII levels in platelet lysates of the mobilization, and the non-mobilization mice were measured by ELISA on day 125. (FIG. 20D) Copy number was detected in BM after 6 months treatment by TaqMan q-PCR. (FIG. 20E) FVIII inhibition in plasma was detected by Bethesda assay after 6 months treatment. Mock n=3, Mobilization group n=5, non-mobilization group n=5.

FIGS. 21A-21E. G-FVIII-LVs gene therapy improved the function of blood clotting in mobilization HemA mice model. (FIGS. 21A-21D) The clotting time (CT), clotting formation time (CFT), max clotting firmness (MCF) and a angle was detected by ROTEM® assay in wild type, HemA, mobilization and non-mobilization group. (FIG. 21E) The representative schematic of the clotting in mobilization group (right) and non-mobilization group (left).

FIGS. 22A-22E. Intravenous delivery of lentiviral vectors to treat hemophilia A in a HSCs mobilization mouse model. (FIG. 22A) Schematics of self-inactivating LV constructs encoding GFP under the control of a MND promoter or a platelet-specific GP1BA promoter and encoding hFVIII/N6 under the control of a ubiquitous EF1α promoter, or platelet-specific GP1BA promoter. (FIG. 22B) Schematics of the method of mobilization of HSCs and subsequent intravenous infusion of LVs in hemophilia A mice. (FIG. 22C) Experimental schedule of mobilization of HSCs and subsequent intravenous infusion of LVs in hemophilia A mice. (FIG. 22D) GFP expression in mice treated with mobilization and M-GFP-LVs. Mock: untreated mice, mobilized: mice treated with mobilization and LVs, non-mobilized: mice treated with LVs only. (FIG. 22E) ROTEM assay results for different groups of mice, including: Panel 1-5: hemophilia A mice treated with HSCs mobilization of HSCs and intravenous infusion of LVs; Panel: 6-12: hemophilia A mice treated with intravenous infusion of LVs only; Panel 13-15: hemophilia A mice; and Panel 16-18: normal wild-type mice.

(FIG. 23A) Pictorial overview of scheme being explored through treatment of Hemophilia A via intranasal (IN) delivery of lentiviral vectors encoding Factor VIII, as described in Example 8. (FIG. 23B) Illustration of vectors used in Example 8.

(FIG. 24A) The flow cytometry schematic of GFP+ platelets. (FIG. 24B) GFP expression in platelets was measured by flow cytometer after lentivirus treatment (N=4).

(FIG. 25A-25B) FVIII expression was detected by intracellular staining and ELISA assay in platelets after IN treatment (N=4). (FIG. 25C) The representative schematic of the whole blood clotting by ROTEM in HemA, wild type, and LV-treated mice at 30 days after IN dosing.

FIGS. 26A-26H Lung HSCs transduction by M-GFP-LVs, illustrated with Control Mouse Panels FIG. 26A (Specimen 001_lung control_0003.fcs Lymphocytes 7.19 ES; Comp-Pacific Blue-A, SSC-A subset 52.4), FIG. 26B (Specimen-1_lung control_003.fcs Comp-Pacific Blue-A, SSC-A subset 377146; Com-PerCP-Cy5-5-A, SSC-A subset 45.5), FIG. 26C (Specimen 001_lung control_003.fcs Comp-PerCP-Cy5-5-a, SSC-A subset 171102; Comp-PE-CY7-A, Comp-APC-A subset 1.06), and FIG. 26D (Comp-PE-Cy7-A, Comp-GFP-A subset: mean: comp-GFP-A:10: Specimen 001_lung control_003.fcs Comp-PE-Cy7-A, Comp-APC-A subset 1811; Comp-PE-CY7-A, Comp-TFP-A subset 0.44); and Intranasal Delivery D7 Panels FIG. 26E (Specimen 001_lung MGFP_004.fcs Lymphocytes 9.01 ES, Comp-Pacific Blue-A, SSC-A subset 63.8), FIG. 26F (Specimen_001_lungMgfp_004.fcs Com-Pacific Blue-A, SSC-A subset 5.75 ES; Comp-PerCP-Cy5-5-A, SSC-A subset 60.8), FIG. 26G (Specimen 001_lung mgfp_004.fcs Comp-PerCP-Cy5-5-a, SSC-A subset 349853, Comp-PE-Cy7-A, Comp-APC-A subset 1.06), and FIG. 26H (Specimen 001_lung mefp_004.fcs Comp-PE-Cy7-A, Comp-APC-A subset 3691, Comp-PE-Cy7-A, Comp-APC-A subset 4.69). The X-axis scale on each panel is $-10^3$, 0, $10^3$, $10^4$, $10^5$; the Y-axis scale on each panel is $-10^3$, 0, $10^3$, $10^4$, $10^5$.

DETAILED DESCRIPTION

Figure 1A:
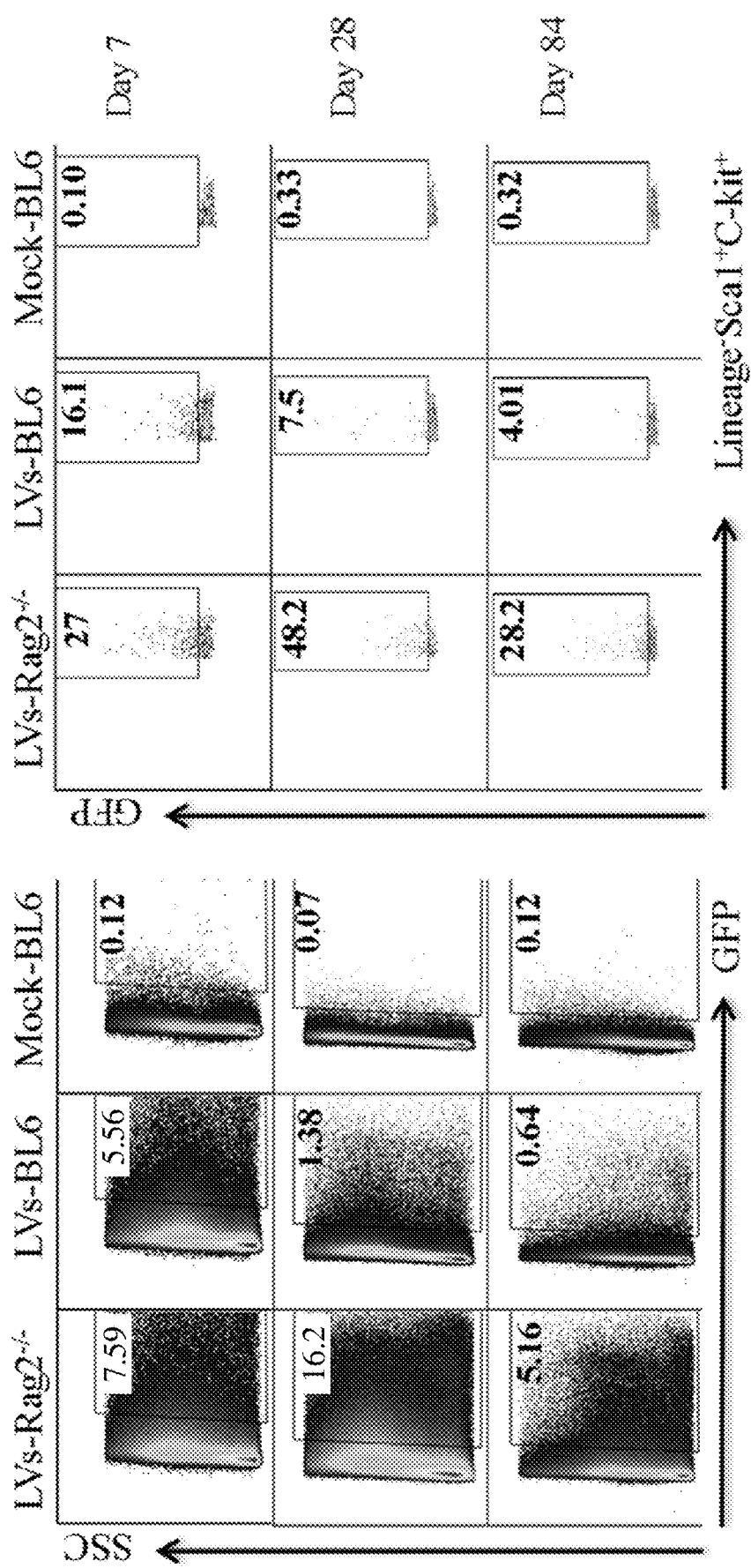
FIGS. 1A-1B: GFP expression in bone marrow cells following IO infusion of M-GFP-LV in immune-competent and immune-deficient mice. Both C57BL/6J (BL6) and B6(Cg)-Rag2$^{tm1.1Cgn}$/J (Rag2$^{-/-}$) mice were intraosseously infused with self-inactivating LV encoding GFP under the control of the modified myeloid proliferative sarcoma virus promoter (MND) (M-GFP-LV) (1.1×10⁸ ifu/animal) or sterile PBS (20 µl/animal, mock) on day 0. The experimental mice were sacrificed on day 7, day 28 and day 84. Then the bone marrow cells were isolated and GFP expression levels in total bone marrow cells (left panels in FIGS. 1A and 1B) and bone marrow hematopoietic stem cells (HSCs, Lin⁻C-Kit⁺Sca1⁺) (right panels in a and b) were detected by flow cytometry. The data were shown as representative flow images (FIG. 1A) and summary plot over time (FIG. 1B). Each symbol represented an individual animal. Data were expressed as mean±SED. Differences were considered significant at $p<0.01()$ and $p<0.001(*)$. Data shown were from two independent experiments.

Hemophilia A (HemA) is a X-linked inherited or acquired genetic disease with defective plasma factor VIII (FVIII), resulting in unstable blood clot formation in HemA patients when internal and/or external bleeding occurs. Described herein are gene therapy protocols to treat hemophilia A and other bleeding disorders by direct infusion of lentiviral vectors (LVs) (or other expression units) carrying an engineered FVIII gene into bone marrow to efficiently transduce hematopoietic stem cells (HSCs).

In example embodiments, FVIII expression is targeted specifically to platelets using a megakaryocyte-specific promoter to drive transgene expression; this results in FVIII-contain platelets circulating in the blood. Expression the platelets prevents or significantly inhibits FVIII secretion into blood, and thus prevents an anti-FVIII immune response in the subjects so treated. Immune response to FVIII disadvantageously leads to neutralization of this factor by anti-FVIII antibodies (so called anti-FVIII inhibitors) in hemophilia patients. Expression inside of platelets maintains the FVIII inside the platelets until they are triggered by the clotting cascade, leading to release of FVIII when bleeding occurs.

Based on results reported here, it is believed that a single gene therapy treatment via in vivo delivery of G-F8-LVs driven by a megakaryocyte-specific promoter directly into bone marrow will benefit HemA patients, especially patents with anti-FVIII inhibitors.

Beneficially, and in contrast to traditional ex vivo gene therapy, the IO in vivo delivery system provided herein avoids the requirement for both ex vivo cell manipulation as well as use of fully or partially myeloablative condition regimens. Such pre-conditioning is usually required for successful ex vivo gene therapy.

In embodiments described herein, it can be beneficial to precisely control the speed (rate) of IO infusion, as this influences the efficiency at which the IO delivered LVs are transduced into cells in the bone marrow (such as HSCs). Low delivery speeds can be used, and may be beneficial in smaller subjects. Relatively low speeds include, but are not limited to 2 μL/min to 15 μL/min, 5 μL/min to 12 μL/min, or at no more than 10 μL/min. One particular relatively low speed is 0.01 mL/min. A relatively higher delivery speed (rate) can be used in larger animals, including humans. By way of example, a relatively higher rate of delivery is carried out at 0.01 mL/min to 0.5 mL/min, 0.05 mL/min to 0.3 mL/min, 0.1 mL/min to 0.25 mL/min, or at no more than 0.4 mL/min. Clearly, a faster rate of delivery will shorten the infusion time, and is therefore considered beneficial so long as it is selected to be such a rate that will still achieve efficient transduction in the specific subject being treated. By way of example, the total volume of the vector bolus used to treat a relatively large subject (such as a dog) may be 2-20 mL or more, and it may be beneficial to the subject to complete infusion in 20-40 mins.

Compared to existing, proposed treatments for hemophilia A or B that rely on recombinant adeno-associated viral (AAV) vectors (rAAV), lentiviral gene therapy as described herein has several advantages. First, AAV persists as episomal, concatemerized vector following in vivo gene transfer. Over time in that situation, transgene expression may decrease and it is expected that repeated dosing will be required. It remains to be shown whether such repeated dosing is feasible, or effect. In contrast, lentiviral vectors are an integrative vector that is incorporated into the genome of the transduced cells. If successfully integrated into long-lived bone marrow HSCs, as taught here, a single treatment of LV-mediated gene therapy may be sufficient for life-long therapeutic benefit. In addition, a significant proportion of human subjects have pre-existing neutralizing antibodies to various AAV serotypes, and nearly all subjects will develop antibodies to the serotype utilized for initial treatment. This will make repeated dosing with the same serotype challenging if not impossible.

AAV is also a poor choice for expression of FVIII cDNA because its transgene capacity is simply too small. Further, LV can efficiently transduce both dividing and no-dividing cells, leading to significant increases in efficiency in targeting primitive HSCs, compared to AAV and traditional gamma-retroviral vectors which can only transduce dividing cells.

Furthermore, recent clinical trials of ex vivo lentiviral gene therapy for several primary deficiency diseases showed significant clinical benefit without adverse effects or aberrant clonal expansion.

Compared to other in vivo LV-mediated gene therapy approaches, IO delivery is unique. Among other benefits (including benefits specifically described elsewhere herein), slow injection of LVs into the bone marrow cavity can avoid (substantially or completely) the inflammation and systemic toxicity caused by systemic intravenous (IV) deliver of AAV and other candidate gene therapy vectors.

In certain embodiments, it can be beneficial to use one or more compounds to facilitate or enhance efficient transduction of the target HSCs. For example, several compounds (such as dexamethasone, anti-CD8 monoclonal antibodies, and staurosporine) can enhance LV transduction of HSCs. Another such compound is rapamycin, and therefore example methods involve the co-administration, for instance via IO, of LV and rapamycin to enhance the rate of transduction. This can be particularly beneficial in instances where the viral titer may be low or below a desired level. Another method to facilitate or enhance LV transduction efficiency is to conjugate the LVs with ligand(s) or antibody fragment(s) that can specially recognize receptors on HSCs, thus targeting the LV to the preferred cell for transduction.

Additional options and embodiments of the disclosure are now described in more detail.

Any composition formulation disclosed herein can advantageously include any other pharmaceutically acceptable carriers which include those that do not produce significantly adverse, allergic, or other untoward reactions that outweigh the benefit of administration, whether for research, prophylactic and/or therapeutic treatments. Exemplary pharmaceutically acceptable carriers and formulations are disclosed in Remington's Pharmaceutical Sciences, 18th Ed. Mack Printing Company, 1990. Moreover, formulations can be prepared to meet sterility, pyrogenicity, general safety and purity standards as required by United States FDA Office of Biological Standards and/or other relevant foreign regulatory agencies.

Exemplary generally used pharmaceutically acceptable carriers include any and all bulking agents or fillers, solvents or co-solvents, dispersion media, coatings, surfactants, antioxidants (e.g., ascorbic acid, methionine, vitamin E), preservatives, isotonic agents, absorption delaying agents, salts, stabilizers, buffering agents, chelating agents (e.g., EDTA), gels, binders, disintegration agents, and/or lubricants.

Exemplary buffering agents include citrate buffers, succinate buffers, tartrate buffers, fumarate buffers, gluconate buffers, oxalate buffers, lactate buffers, acetate buffers, phosphate buffers, histidine buffers and/or trimethylamine salts.

Exemplary preservatives include phenol, benzyl alcohol, meta-cresol, methyl paraben, propyl paraben, octadecyldimethylbenzyl ammonium chloride, benzalkonium halides, hexamethonium chloride, alkyl parabens such as methyl or propyl paraben, catechol, resorcinol, cyclohexanol and 3-pentanol.

Exemplary isotonic agents include polyhydric sugar alcohols including trihydric or higher sugar alcohols, such as glycerin, erythritol, arabitol, xylitol, sorbitol, or mannitol.

Exemplary stabilizers include organic sugars, polyhydric sugar alcohols, polyethylene glycol; sulfur-containing reducing agents, amino acids, low molecular weight polypeptides, proteins, immunoglobulins, hydrophilic polymers, or polysaccharides.

Intranasal administration is a non-invasive route for gene therapy delivery that offers advantages such as ease of administration, rapid onset of action, and avoidance of first pass metabolism, gastric acid and enzymatic degradation (Grassin-Delyle et al, *Pharmacol Ther.* 134:366-379, 2012). Lentiviral vectors can readily be administered intranasally. The GP64-FIV lentiviral vector has been successfully delivered through repeated intranasal administration without significant decline in transgene expression (Podolska et al., *Adv Clin Exp Med.* 21:525-34, 2012). Methods of intranasal delivery include nasal deposition or instillation, direct instillation into the trachea or lower airways using a catheter or bronchoscope, or aerosolization and inhalation (Weiss, *Molecular Therapy* 6:148-152, 2002).

In some embodiments, the lentiviral vector is administered intranasally via nasal deposition, a process wherein the site of deposition may influence the route of absorption and target organ distribution. For example, absorption at the mucosa beyond the nasal valve is more likely to happen through the carotid artery providing a direct route to the brain (Djupesland, *Drug Deliv Transl Res.* 3:42-62, 2013).

In other embodiments, the lentiviral vector is delivered through direct instillation into the trachea or lower airways, for instance using a catheter or bronchoscope. Direct vector instillation can be performed though bronchoscopy administration resulting in heterogenous deposition in parts of the lung, and the use of spray devices directed through the bronchoscope can improve vector distribution and deposition (Weiss, *Molecular Therapy* 6:148-152, 2002).

In some embodiments the lentiviral vector is delivered through aerosolization and inhalation, a clinically convenient approach that can result in a diffused transgene distribution in the lungs. During aerosolization and inhalation, different nebulization equipment and methods can be used to produce homogenously sized aerosol droplet particles that are deposited in bronchiolar and distal airways (Weiss, *Molecular Therapy* 6:148-152, 2002).

In some embodiments, the lentiviral vector is delivered as an aerosol spray from a pressure container or dispenser which contains a suitable propellant (such as carbon dioxide), or a nebulizer (e.g., US 2005/0251872), or by other methods including vapor inhalers, Rhinyle catheters, multi-dose droppers, unit-dose pipettes, squeeze bottles, multi-dose metered-dose spray pumps, single/duo-dose spray pumps, slow spray HFA pMDI's, pulsation membrane nebulizers, powder spray devices and nasal inhalers and insufflators (Djupesland, *Drug Deliv Transl Res.* 3:42-62, 2013).

Lentiviral vectors that carry transgenes also can be delivered intravenously to treat human diseases. See, for instance, US 2000/70190030, US 2005/0251872, CA 2,296,319, US 2007/0190030; Carbonaro et al., *Mol Ther.* 13:1110-1120, 2006. Intravenous (IV) administration refers to the process of administering a compound directly into a patient's or animal's vein using a needle or tube. Intravenous administration is used wherein a rapid onset of action is required or when other delivery routes are not available due to characteristics of the compound or patient factors (Jin et al., *Patient Prefer Adherence.* 9:923-942, 2015). Thus, upon injection, the compound or composition can be rapidly delivered to organs bypassing absorptions barriers, but with the potential to elicit toxic effects (Maddison et al., Small Animal Clinical Pharmacology, Second Edition, Chapter 2, 27-40, 2008).

Intravenous administration offers several advantages, including minimal delay for drug availability, the possibility to achieve constant plasma concentrations at a required level, the avoidance of unexpected side effects by stopping the infusion, an alternative route when compounds are poorly absorbed by the gastrointestinal tract, and the avoidance of pain when other administration routes are painful (Claassen, *Neglected factors in pharmacology and neuroscience research*, Chapter 2, pp 5-22; Huston Ed., 1994).

Most intravenous injections are performed in one of the superficial veins normally used to collect blood, but the choice of vein for intravenous injection depends on several factors (well known to those of skill in the art), including ease of venipuncture, age, whether anesthesia or chronic catheterization is required, and type of composition injected. In some embodiments, the injection of the composition containing a lentiviral vector is made into the jugular, caudal, femoral, lateral marginal, dorsal metatarsal, saphenous, lingual, or dorsal penile vein.

In some embodiments, the technique used to deliver a lentiviral vector can include a clean technique using a sterile syringe and needle, a strict aseptic technique for chronic catheterization, and distal punctures in a peripheral vein when multiple injections are required. In some embodiments, the compound or composition can be delivered by rapid injection into the vein using a syringe, administered intermittently over a specific amount of time using an IV secondary line, or continuously mixed in a main IV solution.

In other embodiments, a lentiviral vector is delivered using one of various different types of catheters, including peripheral IV (PIV), an intravenous catheter inserted by percutaneous venipuncture into a peripheral vein for short-term IV therapy, or a central venous catheter (CVC) that is inserted into a large vein in the central circulation system. In some embodiments, the catheterization method used to deliver the lentiviral vector includes IV infusion, pump infusion, drip infusion, a tunneled catheter, an implanted port, and a peripherally inserted central catheter.

Pharmaceutical compositions suitable for injectable use typically include sterile aqueous solutions, or dispersions and/or sterile powders for the extemporaneous preparation of sterile injectable solutions or dispersions. In some embodiments, suitable carriers for intravenous administration of a lentiviral vector include physiological saline, bacteriostatic water, Cremophor® EL™ (BASF, Parsippany, NJ), or phosphate buffered saline (PBS).

In all cases, the composition should be sterile and should be fluid to the extent that it is easy to inject. In various embodiments, the pharmaceutical formulation is stable under the conditions of manufacture and storage and preserved against the contaminating action of microorganisms, such as bacteria and fungi. In general, the relevant carrier can be a solvent or dispersion medium containing, for example, water, ethanol, polyol (including glycerol, propylene glycol, and liquid polyethylene glycol), and suitable mixtures thereof. The proper fluidity can be maintained by using a coating, such as lecithin, keeping the required particle size (in the case of dispersions), and using surfactants. Prevention of the action of microorganisms can be achieved by various antibacterial and antifungal agents, including parabens, chlorobutanol, phenol, ascorbic acid and thimerosal. In some embodiments, isotonic agents, including sugars and polyalcohols, such as mannitol, sorbitol and sodium chloride, can be added to the composition. Prolonged absorption of the injectable compositions can be brought about by including in the composition an agent which delays absorption, such as aluminum monostearate and gelatin (US 2005/0251872).

Sterile injectable solutions can be prepared by incorporating the active compound (such as a lentiviral vector, or another expression vector) in the required amount in an appropriate solvent with one, or a combination, of the ingredients enumerated above, as required, followed by filtered sterilization. Generally, dispersions are prepared by incorporating the active compound into a sterile vehicle which contains a basic dispersion medium and the required other ingredients from those enumerated above. In the case of sterile powders for the preparation of sterile injectable solutions, the preferred methods of preparation are vacuum drying and freeze-drying which yields a powder of the active ingredient plus any additional desired ingredient from a previously sterile-filtered solution thereof (US 2005/0251872).

Unless otherwise indicated, the practice of the present disclosure can employ conventional techniques of immunology, molecular biology, microbiology, cell biology and recombinant DNA. These methods are described in the following publications. See, e.g., Sambrook, et al. Molecular Cloning: A Laboratory Manual, 2nd Edition (1989); F. M. Ausubel, et al. eds., Current Protocols in Molecular Biology (1987); the series Methods IN Enzymology (Academic Press, Inc.); M. MacPherson, et al., PCR: A Practical Approach, IRL Press at Oxford University Press (1991); MacPherson et al., eds. PCR 2: Practical Approach (1995); Harlow and Lane, eds. Antibodies, A Laboratory Manual (1988); and R. I. Freshney, ed. Animal Cell Culture (1987).

Sequence information provided by public database can be used to identify gene sequences to target and nucleic acid sequences encoding phenotype-altering proteins as disclosed herein. Exemplary sequences are provided herein.

Variants of the sequences disclosed and referenced herein are also included. Variants of proteins can include those having one or more conservative amino acid substitutions. As used herein, a "conservative substitution" involves a substitution found in one of the following conservative substitutions groups: Group 1: Alanine (Ala), Glycine (Gly), Serine (Ser), Threonine (Thr); Group 2: Aspartic acid (Asp), Glutamic acid (Glu); Group 3: Asparagine (Asn), Glutamine (Gln); Group 4: Arginine (Arg), Lysine (Lys), Histidine (His); Group 5: Isoleucine (Ile), Leucine (Leu), Methionine (Met), Valine (Val); and Group 6: Phenylalanine (Phe), Tyrosine (Tyr), Tryptophan (Trp).

Additionally, amino acids can be grouped into conservative substitution groups by similar function or chemical structure or composition (e.g., acidic, basic, aliphatic, aromatic, sulfur-containing). For example, an aliphatic grouping may include, for purposes of substitution, Gly, Ala, Val, Leu, and lie. Other groups containing amino acids that are considered conservative substitutions for one another include: sulfur-containing: Met and Cysteine (Cys); acidic: Asp, Glu, Asn, and Gln; small aliphatic, nonpolar or slightly polar residues: Ala, Ser, Thr, Pro, and Gly; polar, negatively charged residues and their amides: Asp, Asn, Glu, and Gln; polar, positively charged residues: His, Arg, and Lys; large aliphatic, nonpolar residues: Met, Leu, lie, Val, and Cys; and large aromatic residues: Phe, Tyr, and Trp. Additional information is found in Creighton (1984) Proteins, W.H. Freeman and Company.

Variants of gene sequences can include codon optimized variants, sequence polymorphisms, splice variants, and/or mutations that do not affect the function of an encoded product to a statistically-significant degree.

Variants of the protein, nucleic acid, and gene sequences disclosed herein also include sequences with at least 70% sequence identity, 80% sequence identity, 85% sequence, 90% sequence identity, 95% sequence identity, 96% sequence identity, 97% sequence identity, 98% sequence identity, or 99% sequence identity to the protein, nucleic acid, or gene sequences disclosed herein.

"% sequence identity" refers to a relationship between two or more sequences, as determined by comparing the sequences. In the art, "identity" also means the degree of sequence relatedness between protein, nucleic acid, or gene sequences as determined by the match between strings of such sequences. "Identity" (often referred to as "similarity") can be readily calculated by known methods, including (but not limited to) those described in: Computational Molecular Biology (Lesk, A. M., ed.) Oxford University Press, NY (1988); Biocomputing: Informatics and Genome Projects (Smith, D. W., ed.) Academic Press, NY (1994); Computer Analysis of Sequence Data, Part I (Griffin, A. M., and Griffin, H. G., eds.) Humana Press, NJ (1994); Sequence Analysis in Molecular Biology (Von Heijne, G., ed.) Academic Press (1987); and Sequence Analysis Primer (Gribskov, M. and Devereux, J., eds.) Oxford University Press, NY (1992). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR, Inc., Madison, Wisconsin). Multiple alignment of the sequences can also be performed using the Clustal method of alignment (Higgins and Sharp CABIOS, 5, 151-153 (1989) with default parameters (GAP PENALTY=10, GAP LENGTH PENALTY=10). Relevant programs also include the GCG suite of programs (Wisconsin Package Version 9.0, Genetics Computer Group (GCG), Madison, Wisconsin); BLASTP, BLASTN, BLASTX (Altschul et al., *J. Mol. Biol.* 215:403-410 (1990); DNASTAR (DNASTAR, Inc., Madison, Wisconsin); and the FASTA program incorporating the Smith-Waterman algorithm (Pearson, *Comput. Methods Genome Res.*, [Proc. Int. Symp.] (1994), Meeting Date 1992, 111-20. Editor(s): Suhai, Sandor. Publisher: Plenum, New York, NY. Within the context of this disclosure it will be understood that where sequence analysis software is used for analysis, the results of the analysis are based on the "default values" of the program referenced. As used herein "default values" will mean any set of values or parameters, which originally load with the software when first initialized.

Exemplary Embodiments

A first embodiment provides a method of treating a subject in need of plasma Factor VIII, the method involving administering to the subject a therapeutically effective amount of an inflammation suppressor; administering to the subject a therapeutically effective amount of a CD8+ T cell depleting agent; and administering to the subject via intraosseous (IO) infusion a therapeutically effective amount of a composition including a lentiviral vector (LV) including an optimized FVIII expression cassette expressibly linked to a megakaryocyte-specific promoter. It is specifically contemplated that administration of the inflammation suppressor and/or the CD8+ T cell depleting agent may occur before, after, or concurrently with administration of the IO infusion, and may occur at the same or different times.

Notably, examples of such treatment methods do not involve pre-conditioning or myeloablative treatment of the subject.

The inflammation suppressor in examples of such methods is dexamethasone (Dex). By way of nonlimiting example, the inflammation suppressor (such as dexamethasone) is administered in doses of 100 mg/kg at −24 h before, −4 h before, 4 h after, and 24 h after IO infusion of the LV.

The CD8+ T cell depleting agent in examples of the provided methods includes an anti-CD8 antibody, such as an anti-CD8α mAb. For instance, in some cases the anti-CD8α mAb is administered in doses of 4 mg/kg at −1 day before, 4 days after, and 11 days after IO infusion of the LV.

In any of the provided methods, the megakaryocyte-specific promoter may be a GP1b-alpha promoter.

Generally, the IO infusion in provided treatment methods is carried out under a controlled, relatively slow rate in order to facilitate effective transduction by the provided LV of cells in the bone marrow. In specific example methods, the IO infusion is carried out at a rate of 2 µL/min to 15 µL/min, or 5 µL/min to 12 µL/min, or at no more than 10 µL/min. In additional examples, for instance when a relatively large (more than 2 kilograms) subject is being treated, the IO infusion is carried out at a rate of 0.01 mL/min to 0.5 mL/min, 0.05 mL/min to 0.3 mL/min, 0.1 mL/min to 0.25 mL/min, or at no more than 0.4 mL/min. Optimally in some embodiments, IO infusion is carried out over a period of no more than 45 minutes.

Beneficially, the transgenic FVIII expressed from a LV delivered intraosseously using a method provided herein is expressed in platelets at a therapeutically relevant (that is, relatively high) level, and is functional in the subject being treated upon clotting cascade triggering of the expressing platelets. By way of example, the optimized FVIII expression cassette includes the hFVIII variant hF8X10 K12 (SEQ ID NO: 1) or the hFVIII variant hF8/N6K12RH (SEQ ID NO: 2). Though in no way intended to be limiting, the lentiviral vector used in such methods can include SEQ ID NO: 3 or SEQ ID NO: 4 (respectively), or a functional variant thereof which is capable of expressing the variant factor VIII in platelets of the subject.

In any of the provided embodiments, the method of treating a subject in need of plasma Factor VIII may be a method for treating a hemostasis related disorder in the subject, specifically wherein the subject is in need of such treatment. By way of example, the subject receiving treatment with methods described herein include subjects that have hemophilia A (hemA), hemophilia B (hemB), von Willebrand disease, bleeding associated with trauma or injury, thrombosis, thrombocytopenia, stroke, coagulopathy, disseminated vascular coagulation (DIC), or over-anticoagulation treatment disorder.

Specifically encompassed herein are treatment methods where the subject is a HemA subject with preexisting anti-FVIII inhibitory antibodies. The platelet-limited hFVIII expression offered by Applicant's methods are particularly beneficial to such subjects, as the expressed FVIII variant is not exposed and circulating in the blood and therefore does not elicit an immune response from circulating anti-FVIII inhibitory antibodies.

The Exemplary Embodiments and Examples below are included to illustrate particular embodiments of the disclosure. Those of ordinary skill in the art will recognize in light of the present disclosure that many changes can be made to the specific embodiments disclosed herein and still obtain like or similar results without departing from the spirit and scope of the disclosure.

Exemplary Embodiments

1. A method of treating a subject in need of plasma Factor VIII, including: administering to the subject a therapeutically effective amount of an inflammation suppressor; administering to the subject a therapeutically effective amount of a CD8+ T cell depleting agent; and administering to the subject a therapeutically effective amount of a composition including a lentiviral vector including an optimized FVIII expression cassette expressibly linked to a megakaryocyte-specific promoter, wherein administration is via intraosseous (IO) infusion; intravenous (IV) delivery; or intranasal (IN) or inhaled delivery.

2. The method of embodiment 1, wherein the inflammation suppressor includes dexamethasone (Dex).

3. The method of embodiment 2, wherein the dexamethasone is administered in doses of 100 mg/kg at −24 h before, −4 h before, 4 h after, and 24 h after administration of the LV.

4. The method of embodiment 1, wherein the CD8+ T cell depleting agent includes an anti-CD8 antibody.

5. The method of embodiment 4, wherein the CD8+ T cell depleting agent is an anti-CD8α mAb administered in doses of 4 mg/kg at −1 day before, 4 days after, and 11 days after delivery of the LV.

6. The method of embodiment 1, wherein the megakaryocyte-specific promoter is a GP1b-alpha promoter.

7. The method of embodiment 1, which method does not include pre-conditioning or myeloablative treatment of the subject.

8. The method of embodiment 1, wherein the IO infusion is carried out at a rate of 2 μL/min to 15 μL/min, 5 μL/min to 12 μL/min, or at no more than 10 μL/min.

9. The method of embodiment 1, wherein the IO infusion is carried out at a rate of 0.01 mL/min to 0.5 mL/min, 0.05 mL/min to 0.3 mL/min, 0.1 mL/min to 0.25 mL/min, or at no more than 0.4 mL/min.

10. The method of embodiment 1, wherein the IO infusion is carried out over a period of no more than 45 minutes.

11. The method of embodiment 1, wherein the optimized FVIII expression cassette includes hF8X10 K12 (SEQ ID NO: 1) or hF8/N6K12RH (SEQ ID NO: 2).

12. The method of embodiment 1, wherein the lentiviral vector includes SEQ ID NO: 3 or SEQ ID NO: 4, or a functional variant thereof.

13. The method of any one of the previous embodiments, which is a method for treating a hemostasis related disorder in the subject, and the subject is in need of such treatment.

14. The method of any one of the previous embodiments, wherein the subject has hemophilia A (hemA), von Willebrand disease, bleeding associated with trauma or injury, thrombosis, thrombocytopenia, stroke, coagulopathy, disseminated vascular coagulation (DIC), or over-anticoagulation treatment disorder.

15. The method of any one of the previous embodiments, wherein the subject is a HemA subject with preexisting anti-FVIII inhibitory antibodies.

16. A method of treating a subject in need of plasma Factor VIII, essentially as described herein.

Example 1. Enhancing Therapeutic Efficacy of In Vivo Platelet-Targeted Gene Therapy of Hemophilia A Previously described in vivo hematopoietic stem cell (HSC)-based, platelet-targeted gene therapy protocols partially corrected the bleeding phenotype in hemophilia A (HemA) mice for over five months. In that protocol, lentiviral vectors (LVs) carrying a factor III (FVIII) transgene (G-F8/N6-LV), driven by a megakaryocyte-specific promoter (Gp1bα), were delivered via intraosseous (IO) infusion to transduce HSCs. Maturation of transduced HSCs down the megakaryocyte-lineage led to ectopic FVIII production in platelets. However, an effective and clinically feasible protocol was still required to improve LV transduction efficiency and increase platelet-FVIII functionality.

To enhance LV transduction, this example describes a combined drug regimen of dexamethasone and anti-CD8α monoclonal antibody, followed by IO infusion of LVs in mice. In M-GFP-LV-treated (M=MND: ubiquitous promoter) C57BL/6 mice, a 2-fold increase in GFP+ bone marrow cell numbers was observed on day 7 and up to 14% of GFP+HSCs on day 160. In G-F8/N6-LV treated HemA mice, significant improvement in phenotypic correction was seen on day 84.

In addition, to improve platelet-FVIII functionality, F8X10K12 (with increased expression and bioactivity compared to F8/N6) was incorporated into the LVs. Treatment with G-F8X10K12-LV in HemA mice produced a higher level of platelet-FVIII, however induced high-titer anti-FVIII inhibitors. This example also shows incorporation of F8/N6K12RH with enhanced bioactivity only to LVs. Following treatment with combined drugs and IO infusion of G-F8K12RH-LV, HemA mice showed significant phenotypic correction without anti-FVIII inhibitor formation. This protocol may provide a readily translatable treatment for hemophilia.

Thus, here, an effective and clinically feasible protocol was developed by improving LV transduction efficiency and increasing platelet-FVIII functionality. To enhance LV transduction, a combined drug regimen of dexamethasone and anti-CD8α monoclonal antibody was administered, followed by IO infusion of LVs. In M-GFP-LV-treated (M=MND: ubiquitous promoter) C57BL/6 mice. A 2-fold increase in GFP+ bone marrow cell numbers was observed on day 7 and up to 14% of GFP+HSCs on day 160. In G-F8/N6-LV treated HemA mice, significant improvement in phenotypic correction was seen on day 84. To improve platelet-FVIII functionality, F8X10K12 with increased expression and bioactivity compared to F8/N6, was incorporated into the LVs. Treatment with G-F8X10K12-LV in HemA mice produced a higher level of platelet-FVIII, however induced high-titer anti-FVIII inhibitors. Further, following treatment with combined drugs and IO infusion of G-F8K12RH-LV (which has enhanced bioactivity), HemA mice showed significant phenotypic correction without anti-FVIII inhibitor formation. This protocol may provide a readily translatable treatment for hemophilia.

INTRODUCTION

Inhibitory antibody formation against human factor VIII (FVIII) is a significant complication in treatment of hemophilia A (HemA) patients. Ectopic expression of FVIII in platelets could be an effective approach for treating HemA. Unlike circulating plasma FVIII, FVIII stored in α-granules of platelets is protected from being processed by antigen presenting cells, therefore significantly reducing the chance to induce anti-FVIII immune responses. Moreover, platelet FVIII is not neutralized by preexisting anti-FVIII inhibitory antibodies (inhibitors), which will benefit HemA patients who already developed inhibitors. During bleeding, the activated platelets locally excrete FVIII that can directly participate in the coagulation cascade and promote clot formation. It has recently been demonstrated that low levels of platelet FVIII can partially correct hemophilia phenotype in animal models.

One approach to direct FVIII long-term expression in platelets is intraosseous (IO) infusion of lentiviral vectors (LVs) carrying a FVIII transgene controlled by a megakaryocyte specific promoter Gp1bα (Gp1bα-F8-LVs) (Wang et al., Mol Therapy 23:617-626, 2015). In this in vivo gene therapy protocol of HemA, hematopoietic stem cells (HSCs) was efficiently transduced by LVs in situ, followed by FVIII transgene expression in the late stage of megakaryocyte differentiation, and finally storage of FVIII protein in α-granules of platelets. Previous work showed that a single IO infusion of Gp1bα-F8-LV resulted in over 3% platelets containing hFVIII, leading to partial phenotype correction in immune competent HemA mice with and without pre-existing inhibitors.

Furthermore, in vivo delivery of LVs can avoid many difficulties and potential toxicities encountered by ex vivo gene therapy including loss of stem cell properties and engraftment potential after cell transfer, negative effects of ex vivo cytokine stimulation and pre-conditioning of the subject. However, one potential limitation of in vivo gene therapy protocols is the induction of LV-specific immune responses, which may decrease LV transduction efficiency and eliminate LV transduced cells. It has been shown that dexamethasone (Dex) can suppress inflammatory responses after intravenous delivery of LVs into the immune competent mice and increase LV transduction efficiency. It has also been shown that Rapamycin (Rapa) can enhance LV transduction efficiency for both in vivo and ex vivo gene therapy.

An optimized transgene for effective in vivo gene therapy of hemophilia would confer a higher gene expression level and a transgene product with enhanced biological activity. Since the size of a full-length human FVIII cDNA is quite large (>7 kbp), it cannot be easily packaged in viral vectors, often resulting in low titers of viruses. Therefore shorter cDNAs coding for FVIII variants were used in gene therapy preclinical research. Importantly, a B-domain deleted FVIII (BDD-FVIII) variant exhibits similar functional activity as the full-length FVIII (Pittman et al., Blood 81:2925-2935, 1993). Additional mutations were also incorporated into the gene coding for the BDD-FVIII to increase its secretion, such as, F8/N6 with a 226 aa B-domain variant sequence (Miao et al., Blood 103:3412-3419, 2004), codon optimized BDD-FVIII and F8/N6 (Ward et al., Blood 117:798-807, 2011), F8-V3 (McIntosh et al., Blood 121:3335-3344, 2013) with a 17-aa peptide coding sequence replacing the 226 aa/N6 in F8/N6, and F8-RH encoding a BDD-FVIII variant with R1645H (Siner et al., Blood 121:4396-4403, 2013). Some FVIII variants, like FVIII-RH and furin-cleavage site deleted BDD-FVIII variants (Nguyen et al., J Thromb Haemostas. 15:110-121, 2017), exhibit an increase in biological activity compared with BDD-FVIII, likely due to its slower dissociation of the A2-domain upon thrombin activation.

In this example, the therapeutic efficacy of HemA gene therapy was improve using IO infusion of LVs targeting FVIII expression in platelets. Immune competent mice were pretreated with Dex to suppress inflammatory responses and anti-CD8α monoclonal antibody (mAb) to inhibit cytotoxicity by transient depletion of CD8+ T cells. The pharmacologic intervention with combined Dex and anti-CD8 mAb treatment improved LV transduction efficiency and increased long-term transgene expression levels in mice. Furthermore, two new human FVIII (hFVIII) variants with higher expression and enhanced biological activity were also tested in immune competent HemA mice. The results demonstrated that combined drug treatment plus IO infusion of LVs containing the FVIII variant gene with enhanced biological activity significantly improved hemophilia phenotype correction.

Materials and Methods.

Animals: All mice were kept in a specific pathogen-free environment at Seattle Children's Research Institute (SCRI) according to National Institutes of Health guidelines for animal care and the guidelines of SCRI. The protocols were approved by the Institutional Animal Care and Use Committee at SCRI. HemA mice (factor VIII exon 16 knockout) with C57BL/6 (BL/6) genetic background were generated by crossing the mixed background HemA mice (SV129/BL6) with BL/6 mice for eight generations (Miao et al., Blood 114:4034-4044, 2009). BL/6 mice were purchased from the Jackson Laboratory. Only male HemA mice were used in this study.

Human factor VIII cDNA variants: Three human factor VIII cDNA variants were incorporated into the LVs, including B-domain variant of human factor VIII (hF8/N6) (Pipe, Haemophilia 15:1187-1195, 2009), hF8X10K12 (complete lentiviral construct: SEQ ID NO: 3), and hF8/N6K12RH (complete lentiviral construct: SEQ ID NO: 4). The sequences of the hF8X10K12 and hF8/N6K12RH inserts are provided in SEQ ID NOs: 1 and 2, respectively. Human F8 cDNA variants: Three human F8 cDNA variants were incorporated into the LVs, including B-domain variant of hFVIII (hF8/N6)22, hF8X10K1223,24 and hF8/N6K12RH19,24 (FIG. 1a).

Intraosseous infusion of lentiviral vectors: Lentiviral vectors were delivered into the mice by IO infusion as in previous studies (Wang et al., Mol Therapy 23:617-626, 2015; Wang et al., Blood 124:913-923, 2014; both incorporated herein by reference). Detailed information about the construction and production of lentiviral vectors and IO infusion of lentiviral vectors is provided below.

Immunosuppression treatment: Dex (MWIVet) and anti-CD8α mAb (BioXcell; clone YTS169.4) were used to transiently deplete innate immune responses and cytotoxicity, respectively. LVs were infused into the mice on day 0. Single drug pretreated mice were given Dex (100 mg/kg, −24 h, −4 h, 4 h and 24 h) or anti-CD8α mAb (4 mg/kg, day −1, 4 and 11) by intraperitoneal injection. Combined drugs pretreated mice were administrated with Dex (100 mg/kg, −24 h, −4 h, 4 h and 24 h) and anti-CD8α mAb (4 mg/kg, day −1, 4, 11, 16 and 21).

Figure 7A:
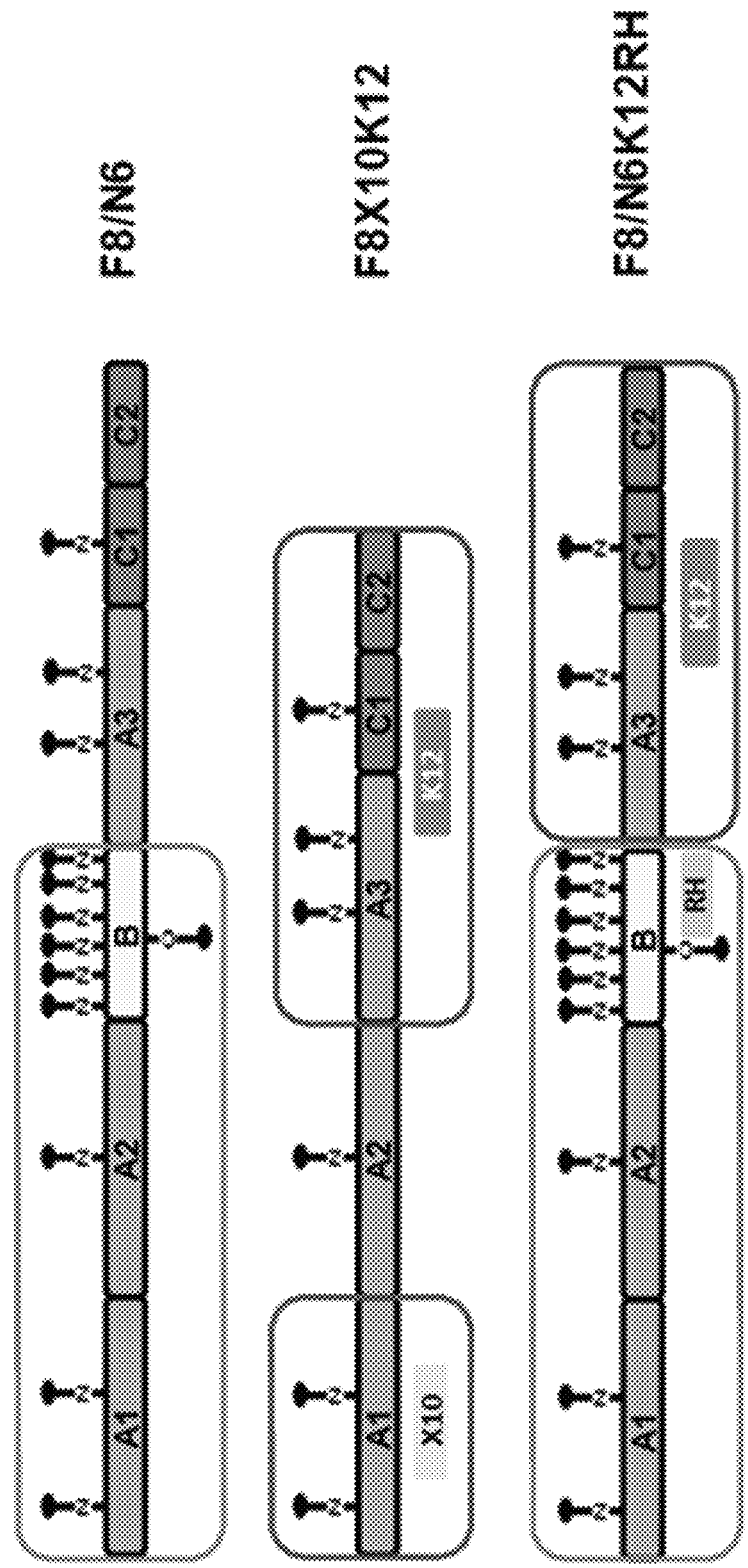
FIGS. 7A-7B are schematics of hFVIII variants and LVs incorporating cDNAs encoding GFP or hFVIII variants.
Figure 7B:
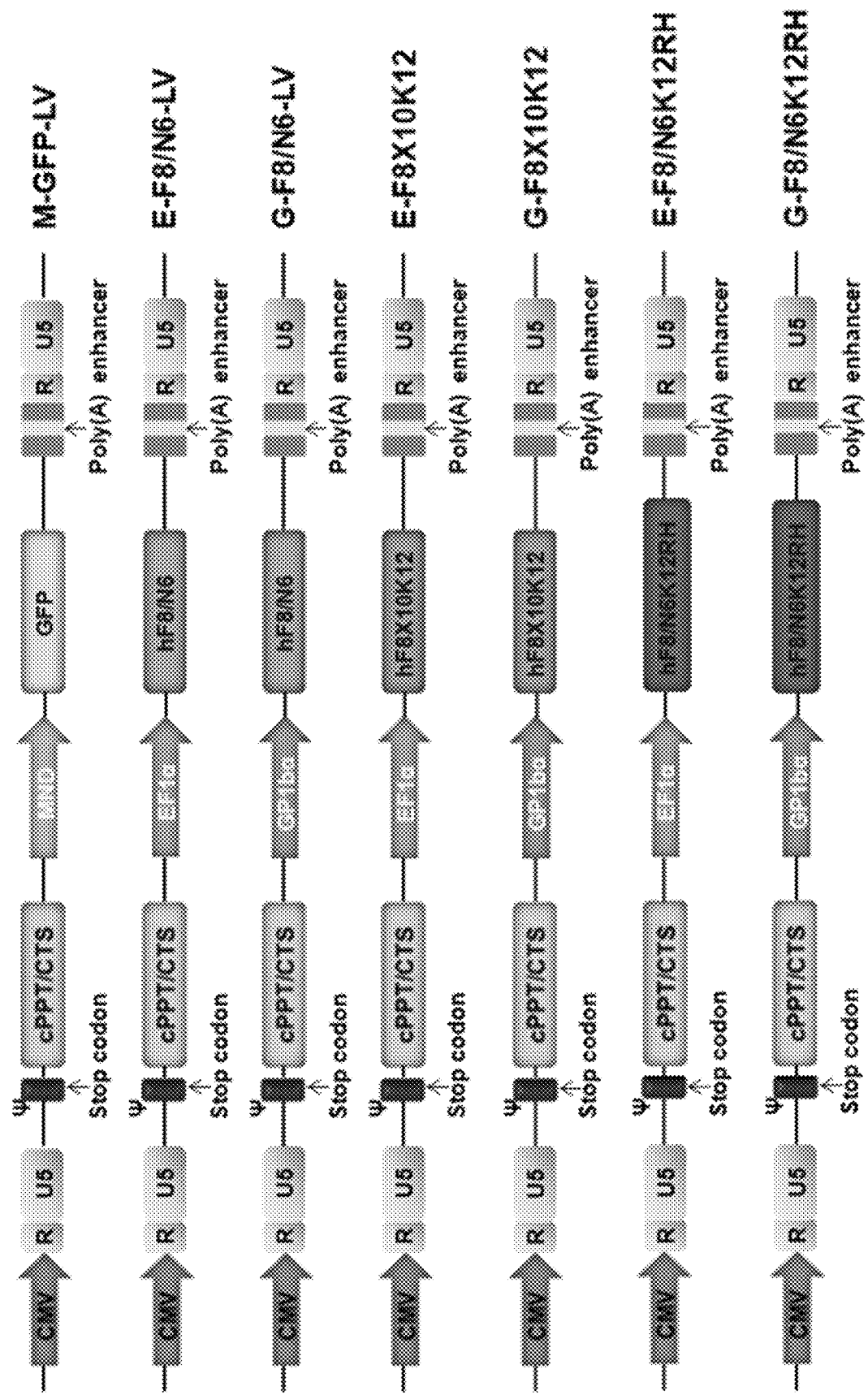

Characterization of transgene GFP/hFVIII expression: For M-GFP-LV treated mice, GFP expression in bone marrow cells of M-GFP-LV3 (LV carrying a GFP gene driven by the modified myeloid proliferative sarcoma virus (MND) promoter (Astrakhan et al., Blood 119:4395-4407, 2012; Challita et al., J. Virol. 69:748-755, 1995); FIG. 7B) treated BL6 mice and hFVIII expression in F8-LV transduced 293T cells were detected by flow cytometry. Flow cytometric analysis was conducted using a FACS LSRII (BD Biosciences) and the data were analyzed using FlowJo software (version 8.8.1; Tree Star). hFVIII expression in platelets of F8-LV-treated HemA mice was measured by ELISA, as previously described (Wang et al., *Mol Therapy* 23:617-626, 2015). The detailed process to isolate bone marrow cells, white blood cells and platelets and the detailed information about the antibodies used in this study are provided below.

Assays for measuring hFVIII activities and anti-hFVIII antibodies: Plasma samples were isolated from the peripheral blood in experimental mice, which was obtained by retro-orbital bleeding. hFVIII activities were analyzed using a modified activated partial thromboplastin time assay (aPTT), and anti-hFVIII antibodies were measured by hFVIII Bethesda inhibitor assay as previously described (Miao et al., *Blood* 114:4034-4044, 2009; Kasper & Aronson, *Thromb Diath Haemorrp* 34:612, 1975).

Assays to characterize phenotypic correction in HemA mice: Correction of the bleeding phenotype of G-F8-LV treated HemA mice was evaluated using a modified tail clip assay, as previously described (Wang et al., *Mol Therapy* 23:617-626, 2015). The function of platelet-stored hFVIII in LV treated HemA mice was evaluated by Thrombin generation assay (TGA) using a TECHNOTHROMBIN® TGA Kit (Technoclone GmbH, Austria) and rotational thromboelastometry (ROTEM®) assay. The blood flow rate of the right carotid artery in G-F8-LV treated HemA mice after local damage was measured in a ferric chloride ($FeCl_3$)-induced thrombosis model. The detailed procedures of TGA, ROTEM, the $FeCl_3$ injury model are described below.

Statistical analysis: Data were expressed as mean±the standard error of the mean (SEM). The statistical significance of the difference between means was determined using two-sample assuming unequal variances t test. Differences were considered significant at P less than 0.05.

Antibodies: Mouse hematopoietic lineage flow cocktail (Lineage) eFluor® 450, allophycocyanin (APC) anti-mouse CD117 (C-Kit) and Phycoerythrin-Cy7 (PE-Cy7) anti-mouse Ly-6A/E (Sca-1) were purchased from eBioscience. A polyclonal sheep anti-human factor VIII (SAF8C) was from Affinity Biologicals INC. A rabbit anti-sheep IgG antibody horseradish peroxidase (HRP) was from Bio-Rad Laboratories. Mouse anti-human factor VIII monoclonal antibody ESH-8 and GMA-012 were obtained from American Diagnostica Inc. and Green Mountain Antibodies, respectively. Goat anti-mouse Ig FITC was from BD Biosciences PharMingen.

Lentiviral vector construction, production and titration: Both pRRL·SIN·Gp1bα·hF8/N6·WPRE (pGp1bα·F8/N6) and pRRL·SIN·EF1α·hF8/N6·WPRE (pEF1α·F8/N6) were cloned in previous work (Wang et al., *Mol Therapy* 23:617-626, 2015). Then hF8/N6 in pGp1bα·F8/N6 and pEF1α·F8/N6 was replaced by hF8X10K12 and hF8/N6K12RH to create pRRL·SIN·Gp1bα·hF8X10K12·WPRE (pGp1bα-F8X10K12) and pRRL·SIN·Gp1bα·hF8X/N6K12RH·WPRE (pGp1bα-F8/N6K12RH), and pRRL·SIN·EF1α·hF8X10K12·WPRE (pEF1α-F8X10K12) and pRRL·SIN·EF1α·hF8X/N6K12RH·WPRE (pEF1α-F8/N6K12RH), respectively. pRRL·SIN·MND·eGFP·WPRE was obtained from the virus core at SCRI. All the reagents for cloning and isolating plasmids were purchased from Qiagen. The LVs (G-F8/N6-LV, G-F8X10K12-LV, G-F8/N6K12RH-LV, E-F8/N6-LV, E-F8X10K12-LV, and M-GFP-LV) were produced by the transient transfection of human embryonic kidney (HEK) 293T cells using polyethylenimine (PEI) and three plasmids including one transgene-LV construct, pMD2.G and pAX2G. Viral titers (ifu/ml) were determined by real-time quantitative PCR (qPCR) as described in previous studies (Wang et al., *Mol Therapy* 23:617-626, 2015; Auti et al., *Embo Mol Med.* 9:737-740, 2017).

HEK 293T cell transduction: HEK 293T cells were maintained in DMEM (Corning Cellgro) with 10% fetal bovine serum (FBS, Atlantic Biologicals), 2 mM L-glutamine (Corning Cellgro), 10 mM HEPES (Corning Cellgro) and 100 IU/ml Penicillin/100 μg/ml Streptomycin (Corning Cellgro). $5 \times 10^4$ cells were cultured in 200 μL medium and transduced with E-F8/N6-LV (MOI=100) and E-F8X10K12-LV (MOI=100) overnight with 4 μg/ml polybrene. After 24 h, 200 μL of culture medium was added. Cells were cultured for another 96 h, and collected to check FVIII expression via a flow cytometer (LSRII, BD Biosciences).

Intraosseous infusion of lentiviral vectors: The detailed intraosseous (IO) infusion procedure was described in the previous study (Wang et al., *Mol Therapy* 23:617-626, 2015). Briefly, the mouse was anesthetized with 2.5% isoflurane, and the hair around the right knee was shaved and the skin was sterilized and excised to expose the muscle layer. After twisting and carefully inserting a sterile 27-gauge needle fixed with an insulin syringe into the right tibia through the joint, 20 μL LVs was infused into the tibia at a speed of 10 μL/min via a new sterile 27-gauge needle connected with a microliter syringe (Hamilton). The infusion speed and volume were precisely controlled by a pump (NE-1010, New Era Pump Systems). The cut site was sutured after infusion.

Detailed methods of isolating bone marrow cells, white blood cells and platelets: Bone marrow cells were collected by flushing both femur and tibia of the mice with 5 ml of RPMI 1640. After lysing red blood cells with Ammonium-Chloride-Potassium (ACK) lysing buffer (0.15 M $NH_4Cl$, 10 mM $KHCO_3$, 1 mM EDTA, pH 8.1), other cells were obtained after filtering the medium through a filter with the pore size of 0.45 μm (Fisher Scientific). White blood cells and platelets were isolated from heparinized blood, which was collected by retro-orbital bleeding. White blood cells were collected after lysing red blood cells with ACK buffer. For platelets, 140 μL of heparinized blood was added with 200 μL of RPMI 1640, and the mixture was carefully transferred to the top of 300 μL of Fico/Lite™_Platelets (Atlanta Biologicals) and spin at 100 g for 10 min. Then carefully removed the clear upper solution and collected the cloudy middle layer to spin at 1,000 rpm for 5 min. Small white platelet pellets were washed by FACS buffer (PBS, 5% bovine serum albumin) twice.

Real-time qPCR: Real-time qPCR was performed on genomic DNA (gDNA), which was extracted from the isolated white blood cells and bone marrow cells in experimental mice using DNeasy Blood & Tissue Kit from Qiagen. gDNA was subject to real-time qPCR using two primer/probe sets (one for integrated lentiviral vector sequence and one for murine housekeeping β-actin sequence) and TaqMan Universal PCR Master Kit (Applied Biosystems) and run on Step One Plus real-time PCR System (Applied Biosystems). Murine copy number was determined by threshold cycle, which was compared to standard curves generated using gDNA isolated from single lentiviral copy A20 cell clones.

Detailed methods of thrombin generation assay: Firstly, both the protocol for Calibration Curve measurement and the protocol for sample measurement were created in PerkinElmer® Wallac Manger. Then the whole blood was drawn from the inferior vena cava (IVC) of the anesthetized mice into 3.8% sodium-citrate solution. Platelet-rich plasma (PRP) was obtained by centrifuging for 5 minutes at 100×g and carefully pipetting the top layer. Platelet-poor plasma (PPP) from untreated HemA mice was collected by centrifuging PRP for 10 minutes at 1,500 g. Platelet concentration in PRP was measured by a qNaono (iZON Science). 30 μL of PRP samples mixed with 10 μL of HemA PPP was added into black NUNC Maxisorp (Fisher). The plate was read immediately in a Victor 3 instrument (Perkin-Elmer) after adding 50 μL of TGA substrate (SUB). In a separate calibration measurement, 40 μL of thrombin calibrator at four different dilutions (1:2, 1:4, 1:20, 1:200) were combined with 50 μL TGA SUB and thrombin generation was detected for 10 min in 30 sec intervals at 37° C. Lag phase time, peak thrombin, and the area under the curve (AUC) were obtained using the evaluation software provided by Technoclone.

Blood flow rate measurement: The experimental mice were anesthetized by 2.5% isoflurane. An incision was made with a scalpel directly over the right common carotid artery, and a segment of the artery was exposed using blunt dissection. A miniature Doppler flow probe (Model 0.5 VB, Transonic System Inc., Ithaca, NY, USA) was attached to the carotid artery to monitor blood flow. Blood vessel damage was induced by applying two pieces of filter paper (1×2 mm) saturated with 20% Ferric chloride ($FeCl_3$) solutions. The pieces of filter paper were placed on the top of carotid artery in contact with the adventitial surface of the vessel. After 2-min exposure, the filter paper was removed and the vessel was washed with sterile normal saline. Carotid blood flow was continuously monitored for 30 min after $FeCl_3$ application. Wild-type C57BL/6J mice and HemA mice were used as positive and negative controls, respectively. Average blood flow rate over 30 minutes after $FeCl_3$ treatment was used to evaluate the extent of protection from occlusion. The mice were sacrificed after measurement.

Results.

Comparison of GFP expression in immunocompetent and deficient mice following IO delivery of M-GFP-LV To evaluate if immune responses impact transgene expression, M-GFP-LV ($1.1 \times 10^8$ infectious units (ifu)/animal) was intraosseously delivered into immune deficient $Rag2^{-/-}$ mice and immune competent BL6 mice. 7 days after infusion, GFP expression levels in total bone marrow cells and HSCs in $Rag2^{-/-}$ mice were similar to that in BL6 mice (FIGS. 1A and B). Subsequently, GFP levels were increased in $Rag2^{-/-}$ mice but decreased in BL6 mice from day 7 to 28. In the long term, 84 days after infusion, the GFP levels in both total bone marrow cells and HSCs of $Rag2^{-/-}$ mice were significantly higher than those in BL6 mice (FIGS. 1A and B). Overall, following M-GFP-LV transduction in bone marrow, GFP expression maintained relatively stable at high levels in $Rag2^{-/-}$ mice, whereas GFP expression levels gradually decreased over time in immune competent BL6 mice. These results suggest that immune responses elicited by LVs, likely including cytotoxic lymphocytes (CTLs), may reduce the number of transduced cells over time.

Figure 2A:
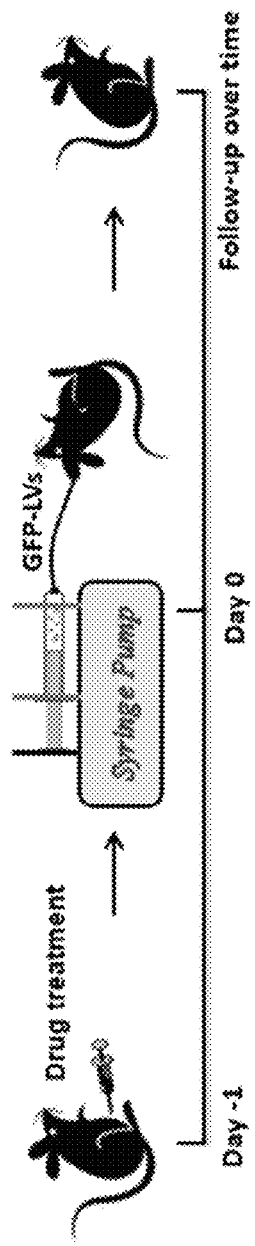
FIGS. 2A-2E: Transient immune suppression to enhance in situ transduction efficiency of bone marrow cells following IO infusion of M-GFP-LVs.
Figure 2B:
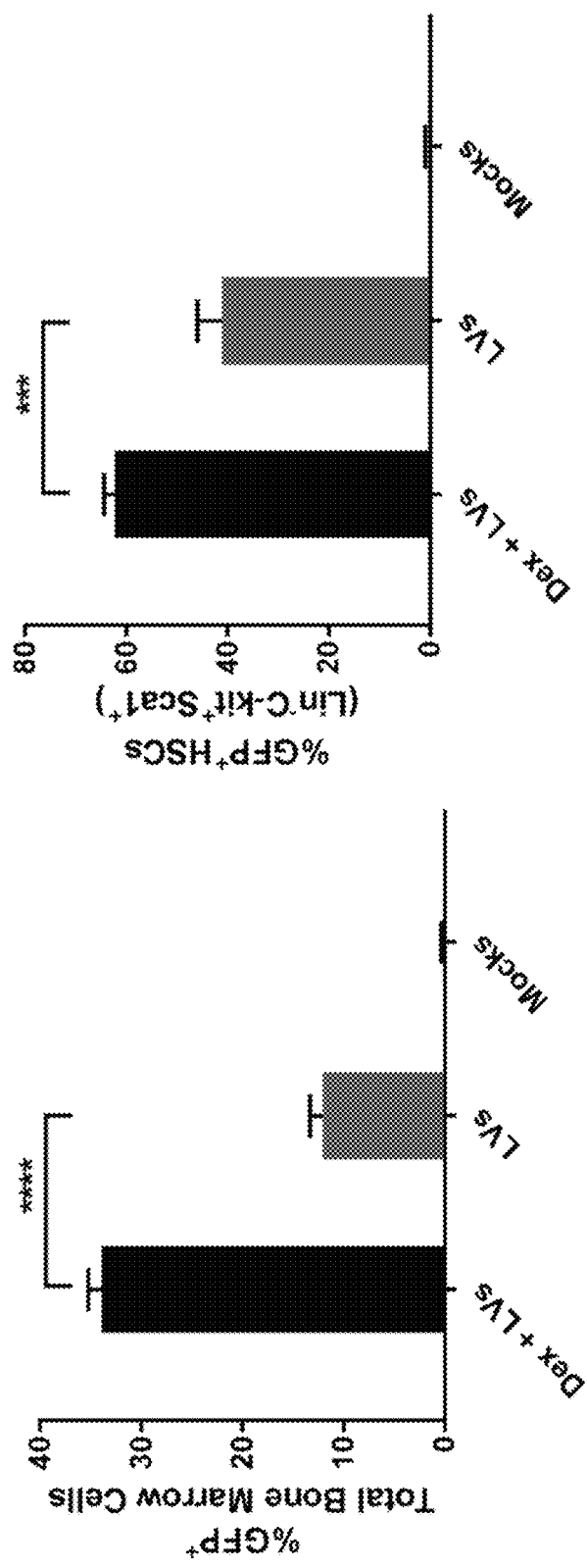

Pharmacological approach to enhance GFP expression in immune competent mice following with IO delivery of M-GFP-LV Based on the results obtained from LV-treated immune-competent and deficient mice, whether pharmacological agents designed to non-specifically or specifically block these immune responses will limit clearance of transduced cells, leading to more persistent and higher levels of sustained transgene expression, was explored. Firstly, BL6 mice were treated Dex with (100 mg/kg, −24 h, −4 h, 4 h and 24 h) before and after IO infusion of M-GFP-LV ($8.8 \times 10^8$ ifu/animal, day 0). 7 days after LV infusion, the Dex+LVs treated mice produced significantly higher GFP expression levels in both total bone marrow cells and HSCs than those in LVs only treated mice (FIG. 2B), indicating that Dex could efficiently inhibit early immune responses and enhance GFP expression. Moreover, successful LV transduction was indicated by LV copy numbers in total bone marrow cells of Dex+LVs and LVs only treated mice to be 0.90 and 0.80, respectively.

Figure 2C:
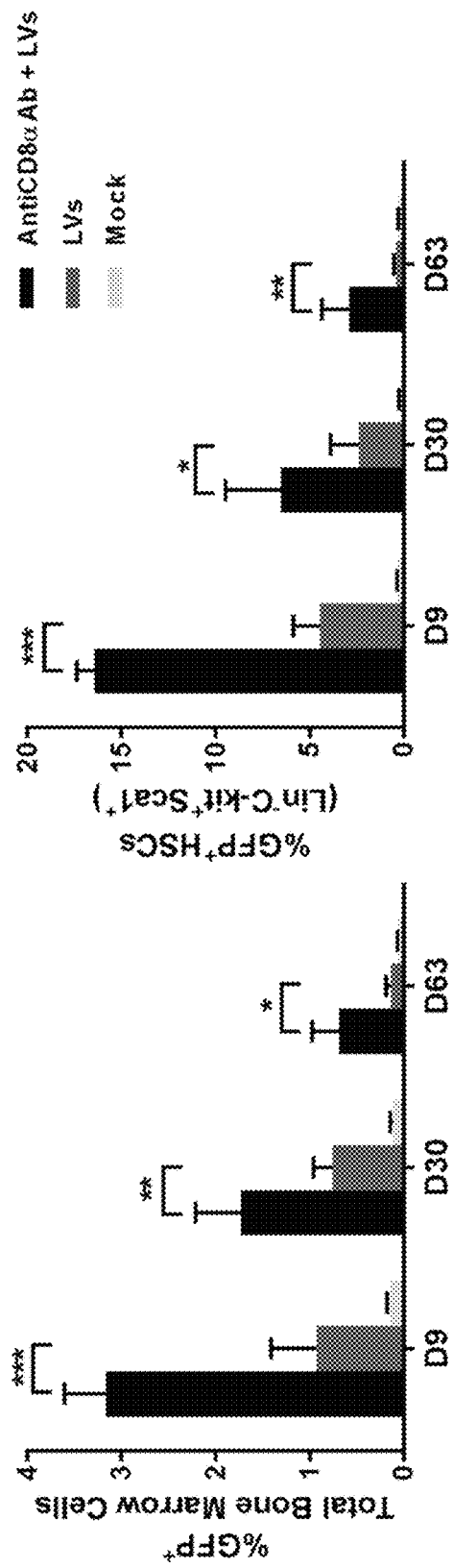
Figure 8A:
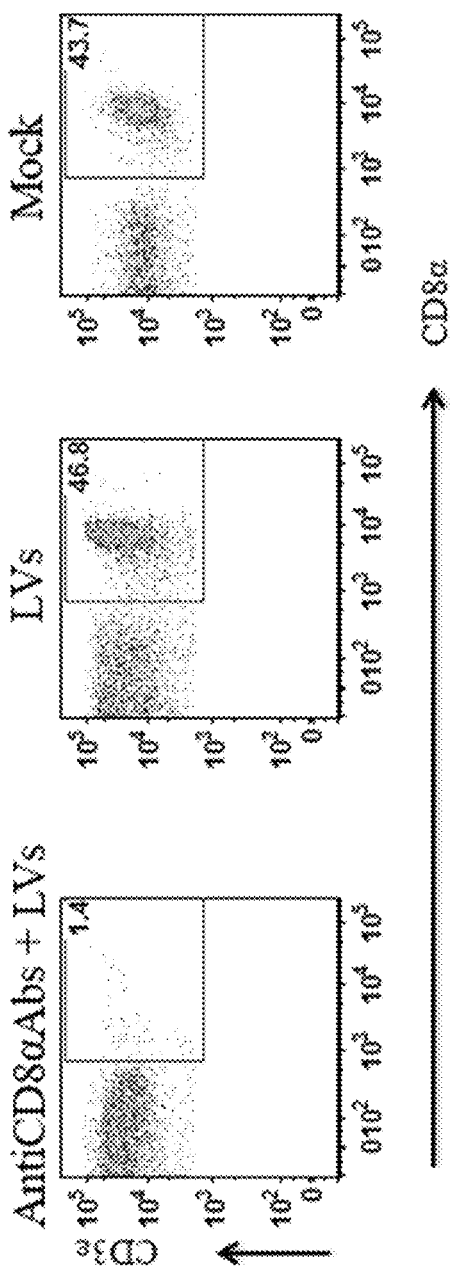
FIGS. 8A-8B. Characterization of $CD8\alpha^+CD3\epsilon^+$ cells in blood and bone marrow of BL6 mice after anti-CD8α monoclonal antibody treatment.
Figure 8B:
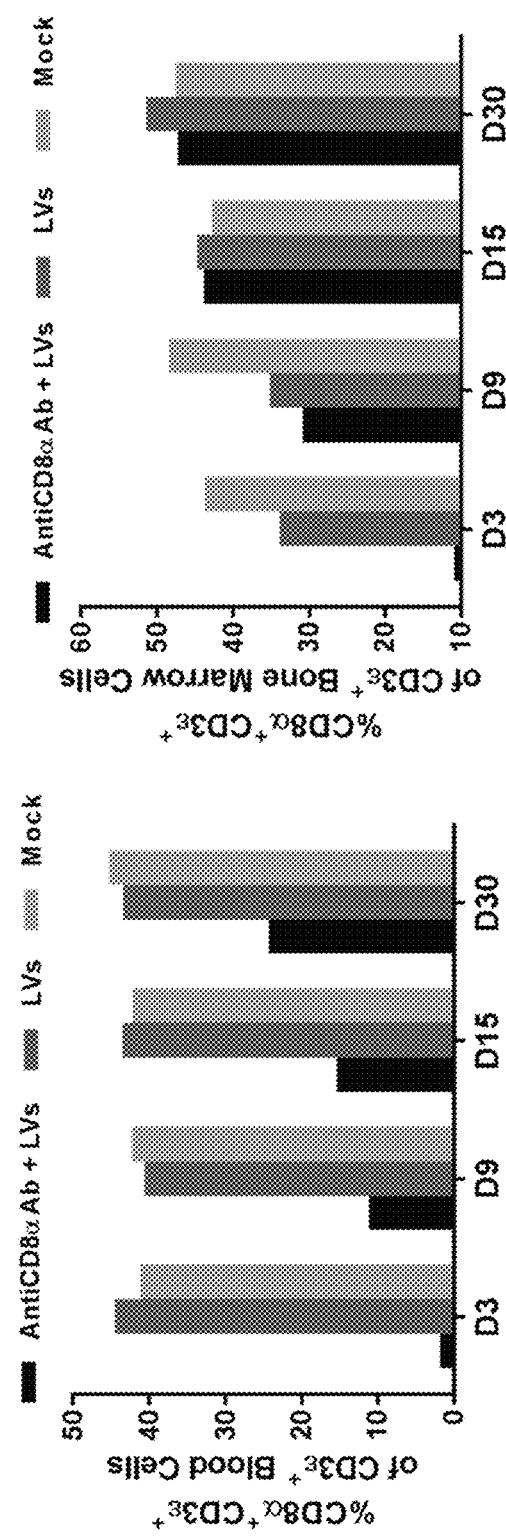
Figure 9A:
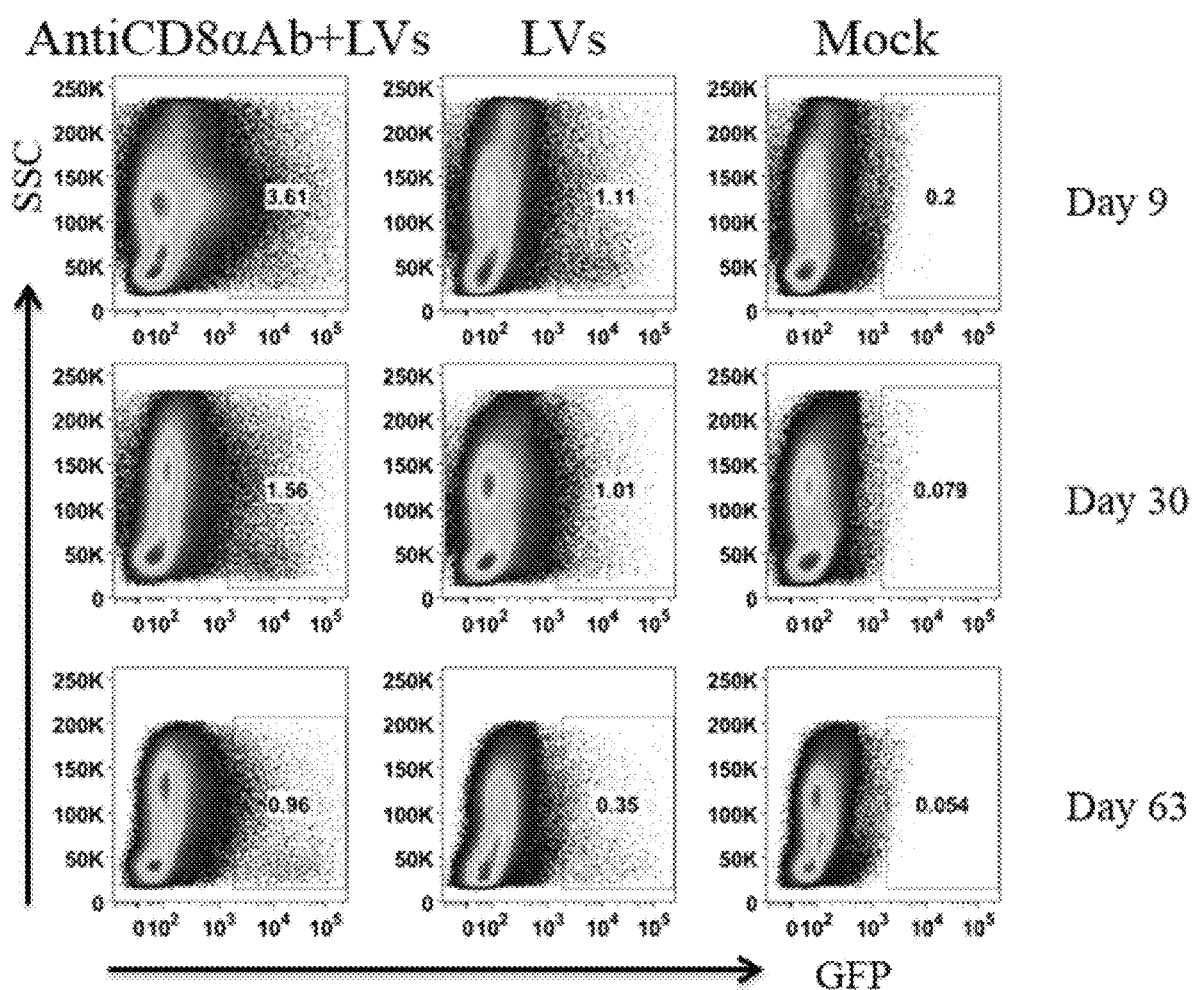
FIGS. 9A-9B. Representative flow images of GFP expression in total bone marrow cells (FIG. 9A) and bone marrow hematopoietic stem cells (HSCs, $Lin^-C-Kit^+Sca1^+$) (FIG. 9B) in FIG. 2C.
Figure 9B:
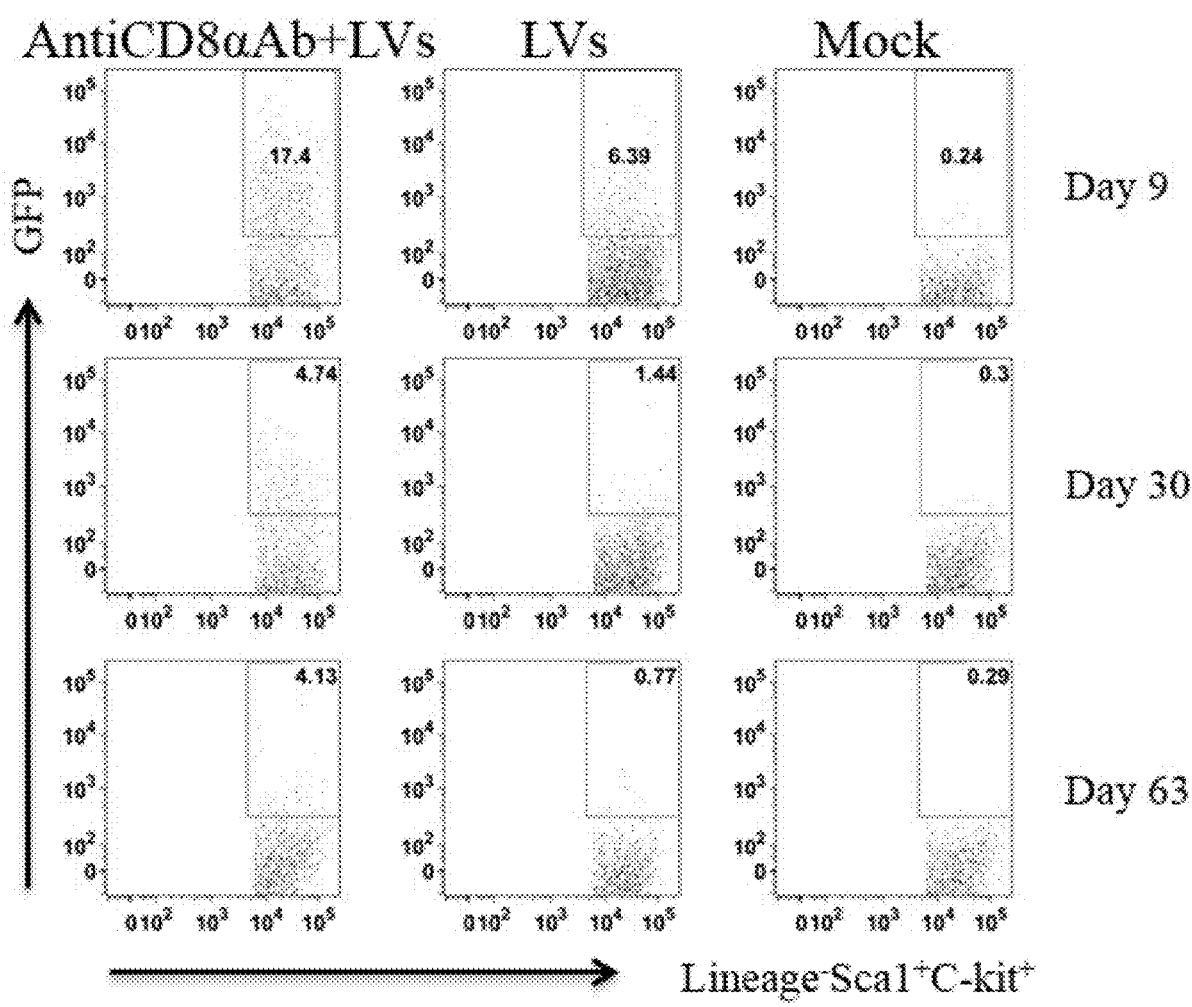

Secondly, $CD8^+CD3^+$ T cells were transiently depleted by IP injection of anti-CD8α mAb to suppress cytotoxic function (FIG. 8A). The mice were treated with anti-CD8α mAb (4 mg/kg, day −1, 4 and 11) before and after IO infusion of M-GFP-LV ($1.1 \times 10^8$ ifu/animal). 9 days after IO infusion, GFP expression levels in total bone marrow cells and HSCs in anti-CD8α mAb+LVs treated mice were significantly higher than those in LVs only treated mice (FIG. 2C). 30 and 63 days later, although GFP expression levels decreased over time, the levels in anti-CD8α mAb+LVs treated mice were higher than that in LVs only treated mice (FIG. 2C and FIGS. 9A and 9B). $CD8α^+CD3ε^+$ T cells were totally depleted in blood and bone marrow in treated mice 4 days after anti-CD8α mAb treatment (day 3 after IO infusion), then recovered gradually to normal levels (FIG. 8B). Thus, GFP expression in anti-CD8α mAb+LVs treated mice was partially rescued by transient depletion of $CD8α^+CD3ε^+$ T.

Figure 2D:
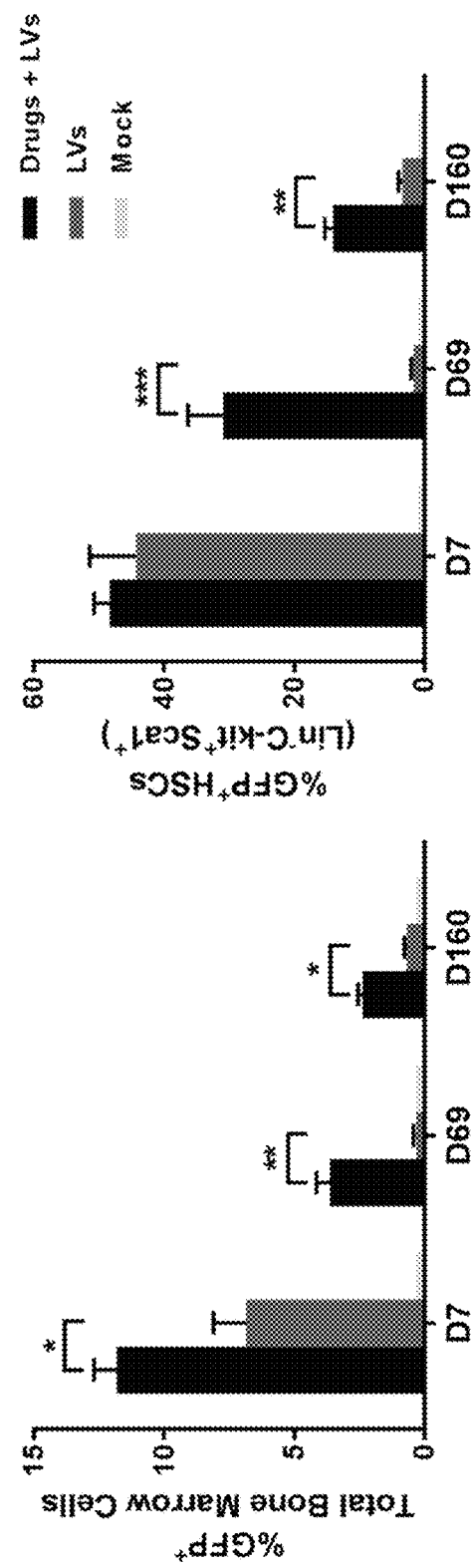
Figure 2E:
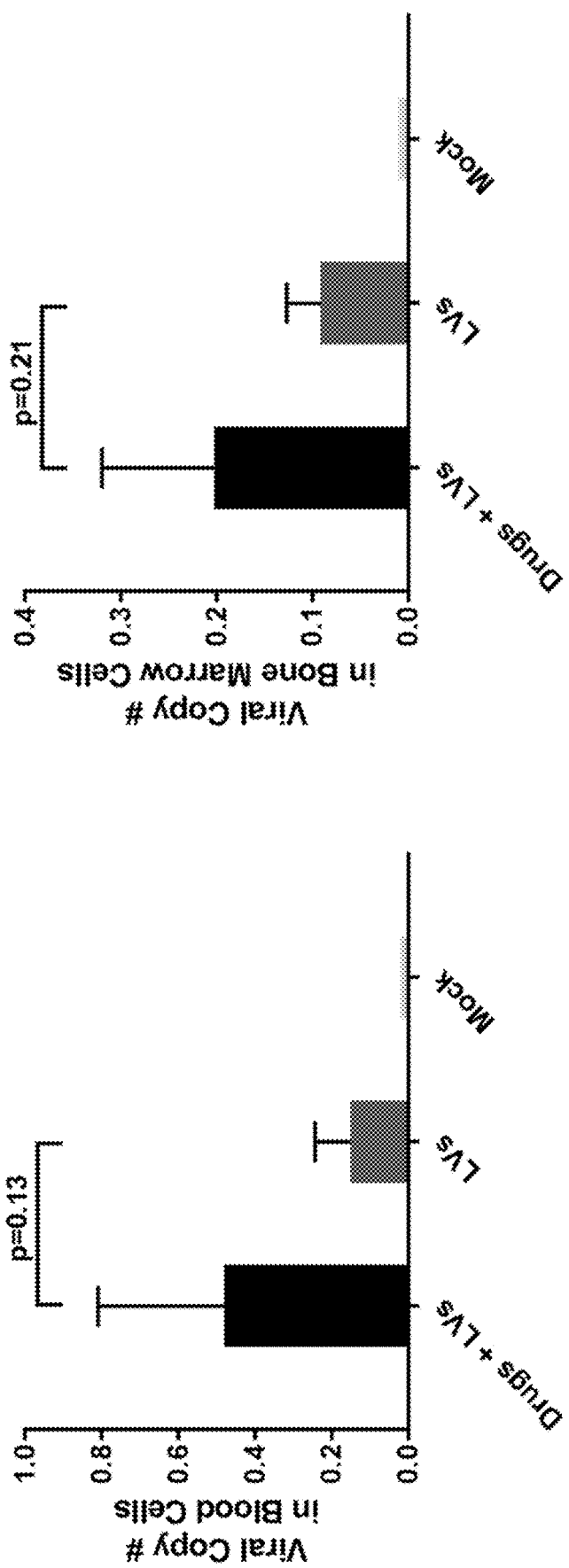
Figure 10A:
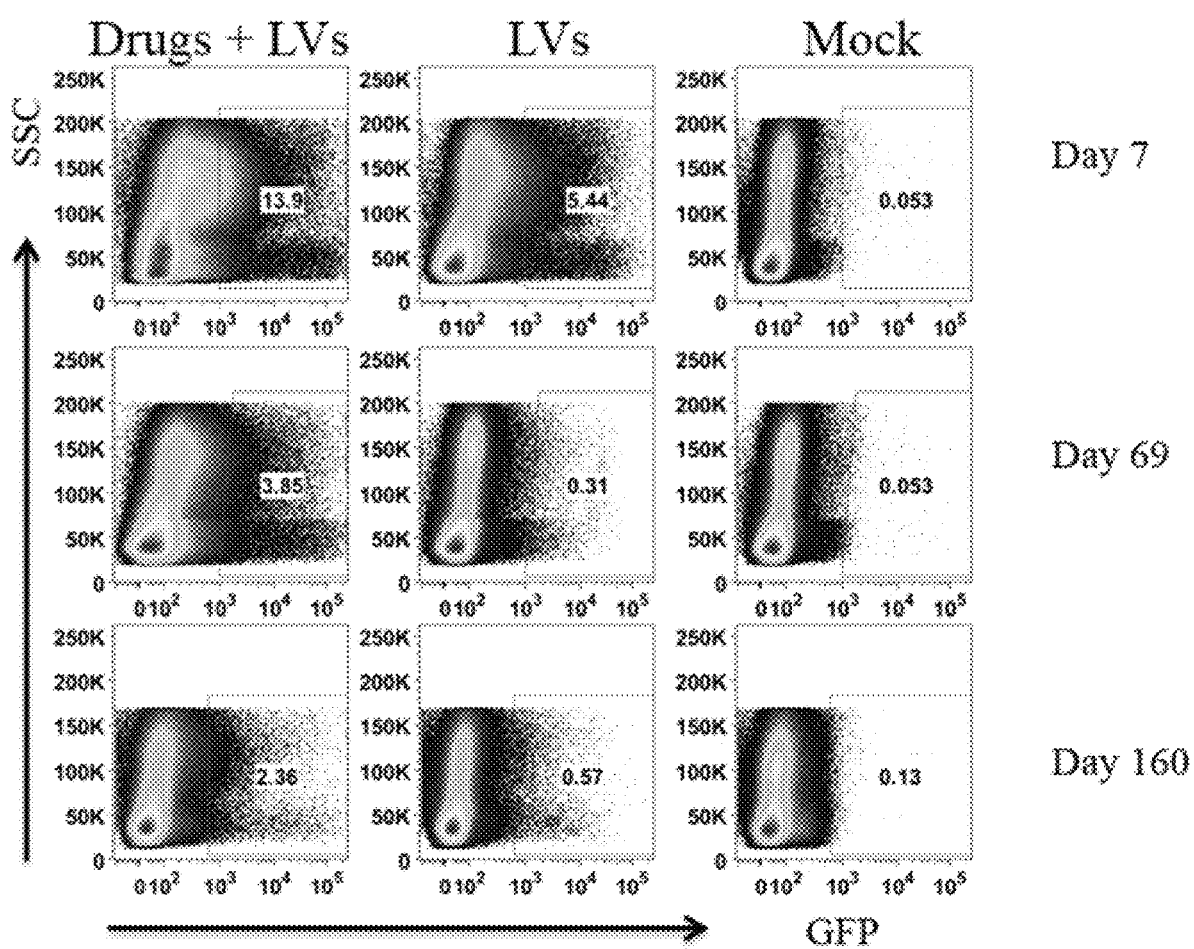
FIGS. 10A-10B. Representative flow images of GFP expression in total bone marrow cells (FIG. 10A) and bone marrow hematopoietic stem cells (HSCs, $Lin^-C-Kit^+Sca1^+$) (FIG. 10B) in FIG. 2D.
Figure 10B:
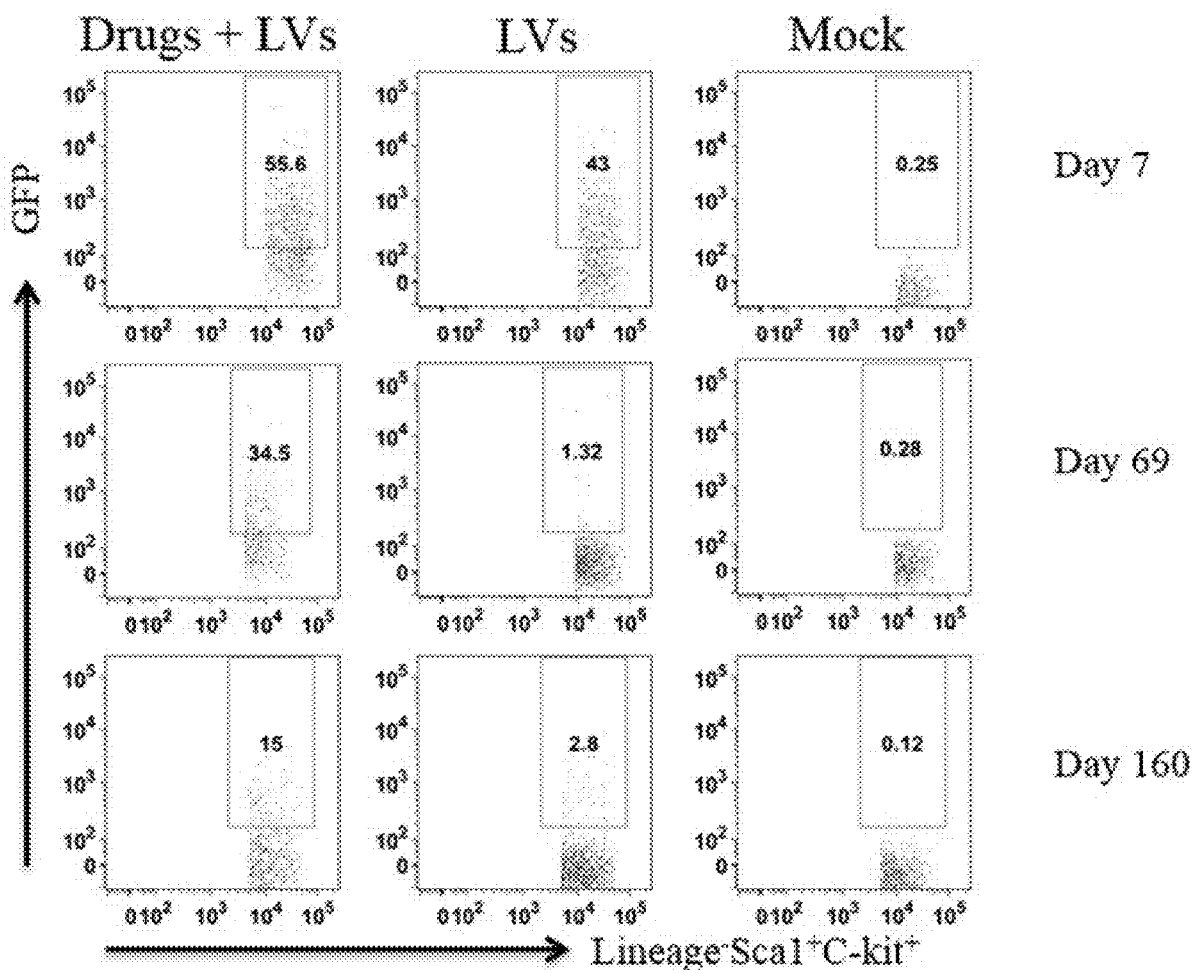

In order to increase LV transduction and preserve survival of transduced cells, a short course of combination drug treatment with Dex (100 mg/kg, −24 h, −4 h, 4 h and 24 h), and anti-CD8α mAb (4 mg/kg, day −1, 4, 11, 16 and 21) before and after IO infusion of M-GFP-LV ($3.6 \times 10^8$ ifu/animal) was administered. 7 days after IO infusion, GFP expression levels in total bone marrow cells in drugs+LVs treated mice was significantly higher than that in LVs only mice. Whereas, GFP expression level in HSCs was similar in these two groups of mice probably because HSC transduction reached saturation with relatively high dose of LVs. In the long term, GFP expression levels in both total bone marrow cells and HSCs in Drugs+LVs treated mice were significantly higher than that in LVs only treated mice (FIG. 2D and FIGS. 10A and 10B). Furthermore, lentiviral copy numbers in blood cells and total bone marrow cells were detectable in both groups of mice with slightly higher number in drugs+LVs treated mice than that in LVs treated mice on day 160 (FIG. 2E). These results indicated that transient administration of combined drugs partially suppressed immune responses and over 10% of GFP+HSCs were achieved over five months after IO infusion of M-GFP-LV.

Figure 3A:
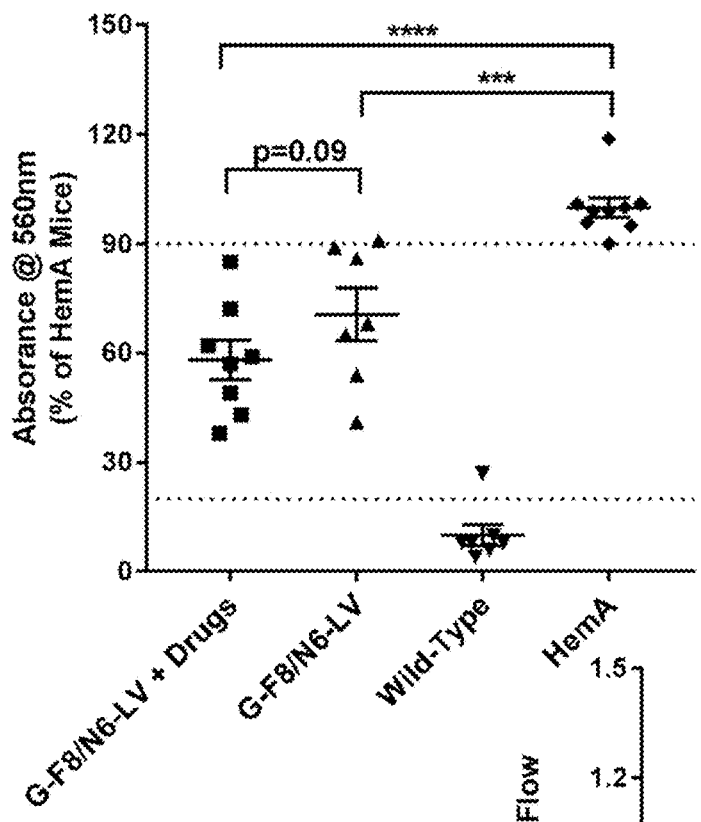
FIGS. 3A-3C: Transient immune suppression to enhance phenotype correction in hemophilia A mice following IO infusion of G-F8/N6-LVs. HemA mice were pretreated with combined drugs (Dex 4×+Anti-CD8α mAb 5×) and then given IO infusion of self-inactivating LVs encoding hFVIII variant with the proximal 226 amino acid region of the B-domain (F8/N6) under the control of Gp1bα promoter (G-F8/N6-LV, 2.2×10⁶ ifu/animal) on day 0.
Figure 3B:
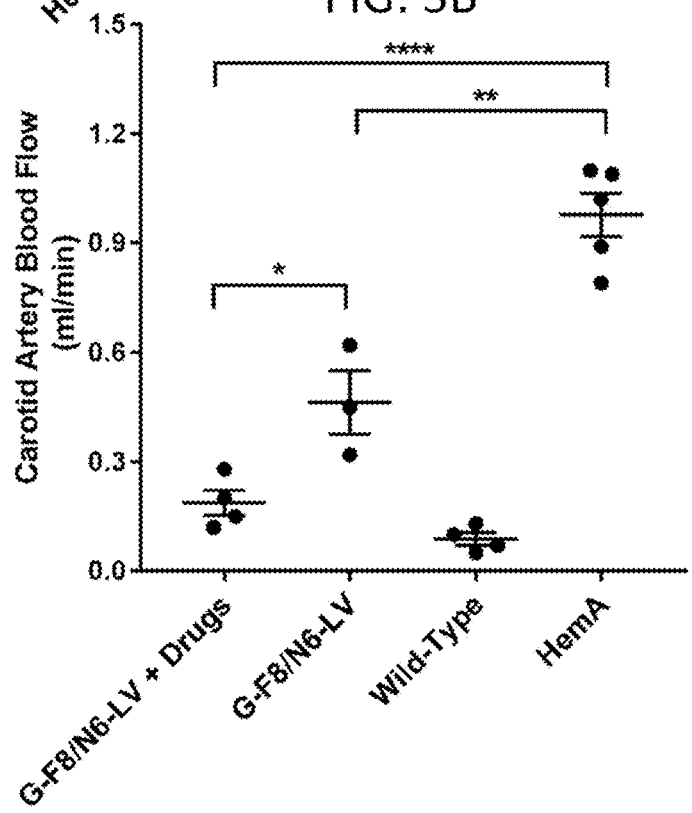
Figure 3C:
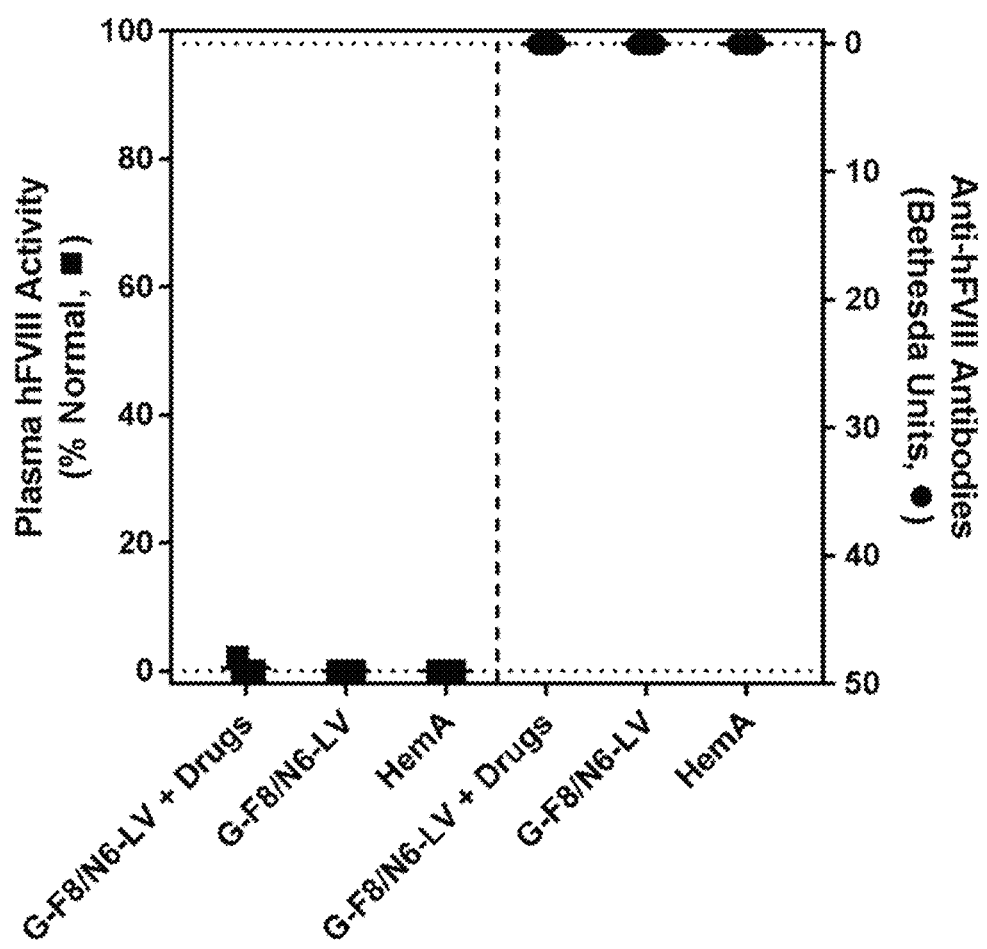

Pharmacological approach to improve phenotype correction in immune competent HemA mice with IO delivery of G-F8/N6-LV. Next, the same pharmacological approach was applied to improve the therapeutic effects of IO infusion of G-F8/N6-LV in HemA mice. HemA mice were given with the combined drug treatment (Dex+anti-CD8α mAb) plus IO infusion of G-F8/N6-LV ($2.2 \times 10^6$ ifu/animal). 10 weeks after IO infusion, hemophilia phenotype correction was evaluated with two injury mouse models: tail clipping and $FeCl_3$-induced thrombosis. In the tail clipping assay, the LVs only or drugs+LVs treated mice had significantly reduced blood loss than HemA control mice (FIG. 3A). In the $FeCl_3$-induced carotid artery injury model, the average blood flow rates in the LVs only or Drugs+LVs treated mice were significantly slower than that in HemA control mice (FIG. 3B), confirming that IO infusion of G-F8/N6-LV into HemA mice can enhance their blood clotting function. Furthermore, the drugs+LVs treated mice lost noticeably less blood than the LVs only treated mice in tail clipping assay (FIG. 3A). Consistent with that, the average blood flow rate in Drugs+LVs treated mice was slower than that in LVs only treated mice (FIG. 3B). These results indicated that combined drug treatment with Dex and anti-CD8α Ab could significantly enhance the therapeutic efficiency of IO infusion of G-F8/N6-LV in HemA mice. In addition, there was neither detectable plasma FVIII activity nor anti-FVIII inhibitors in blood (FIG. 3C), indicating that no detectable FVIII secretion into blood.

Figure 4A:
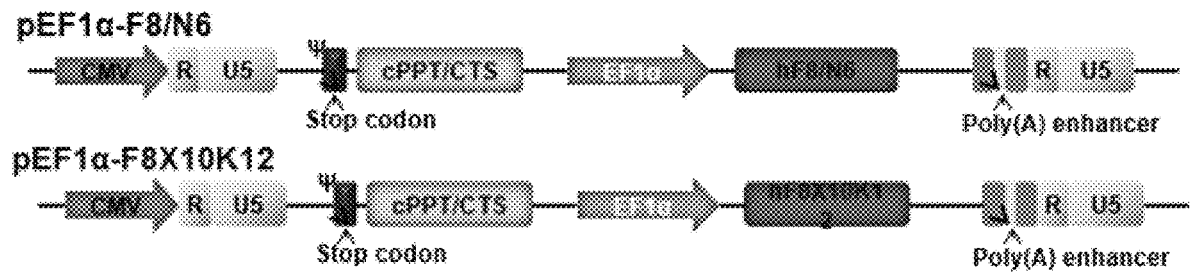
FIGS. 4A-4C: BDDF8X10K12 Generated Higher Expression Levels.
Figure 4B:
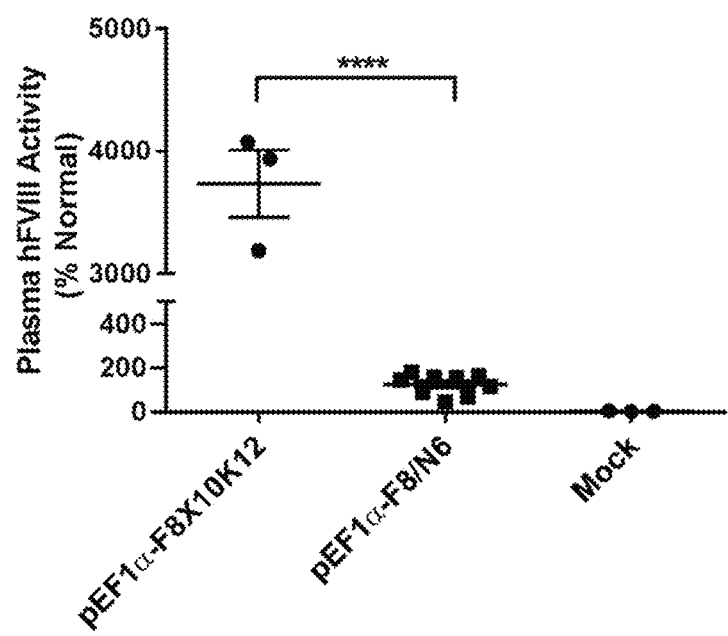

F8X10K12 with higher expression and higher functional activity combined with drug treatment improved hemophilia A phenotypic correction. To improve therapeutic effects of in vivo gene therapy of HemA mice, cDNAs encoding FVIII variants with high expression and functional activity were next incorporated. F8X10K12 was a novel human FVIII cDNA variant with a deleted B-domain, mutations in AI domain to enhance secretion (X10), and mutations in C1 and C2 domains to increase functional activity (K12) (FIG. 4A). Its expression was tested by hydrodynamic injection of the plasmid, pEF1α-F8X10K12, into HemA mice. Compared with pEF1α-F8/N6, pEF1α-F8X10K12 produced a dramatically high levels of FVIII in treated mouse plasma on day 4 (FIG. 4B). E-F8X10K12-LV was also made to transduce 293T cells (MOI=100). Higher percentage and MFI of FVIII gene expression were detected in E-F8X10K12-LV transduced 293T cells than in E-F8/N6-LV transduced cells on day 4 (FIG. 4C), confirming that F8X10K12 enhanced FVIII production following LV transduction.

Figure 5A:
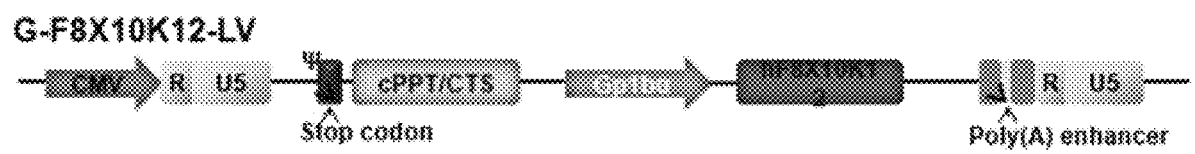
Figure 5D:
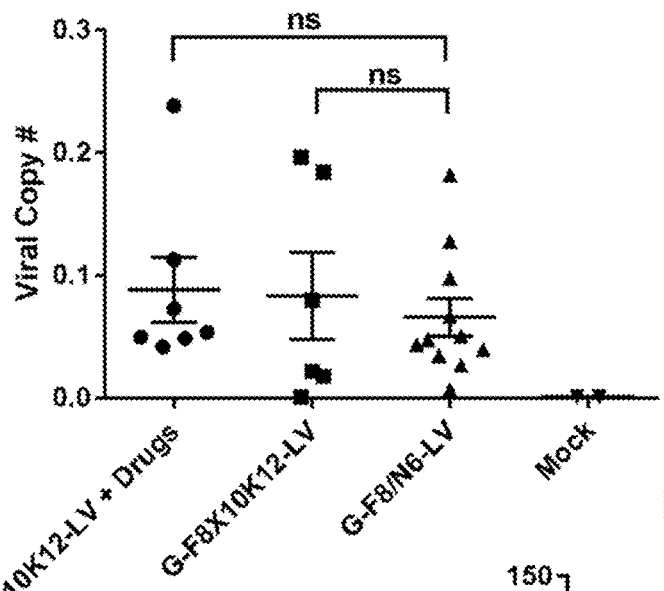

Next, G-F8X10K12-LVs (FIG. 5A) was generated and delivered into HemA mice with combined drug treatment. The average platelet-hFVIII antigen levels in G-F8X10K12-LV+drugs and G-F8X10K12-LV only treated mice were significantly higher than that in G-F8/N6-LV treated mice on day 90 (FIG. 5B), suggesting that F8X10K12 produced higher platelet-FVIII levels. No anti-FVIII antibody was detected in G-F8/N6-LV treated mice and 8 of 11 G-F8X10K12-LV+drugs treated mice (FIG. 5C), whereas all G-F8X10K12-LV only treated mice (n=9) and 3 of 11 G-F8X10K12-LV+drugs-treated mice generated anti-hFVIII antibodies (FIG. 5C). Judging from the fact that the average platelet-hFVIII antigen levels in G-F8X10K12-LV+drugs or G-F8X10K12-LV only treated mice were similar, it was suspected that significant portions of the FVIII produced in G-F8X10K12-LV treated mice were secreted into the plasma due to the enhanced expression and secretion of F8X10K12 protein, thus facilitating the generation of anti-FVIII antibodies. These results also suggested that combined drug treatment could suppress anti-FVIII humoral immune responses in G-F8X10K12-LV+drugs treated mice. Viral copy number was detected in blood cells of all treated mice on day 120 (FIG. 5D), indicating that LVs successfully transduced primitive HSCs.

Figure 5E:
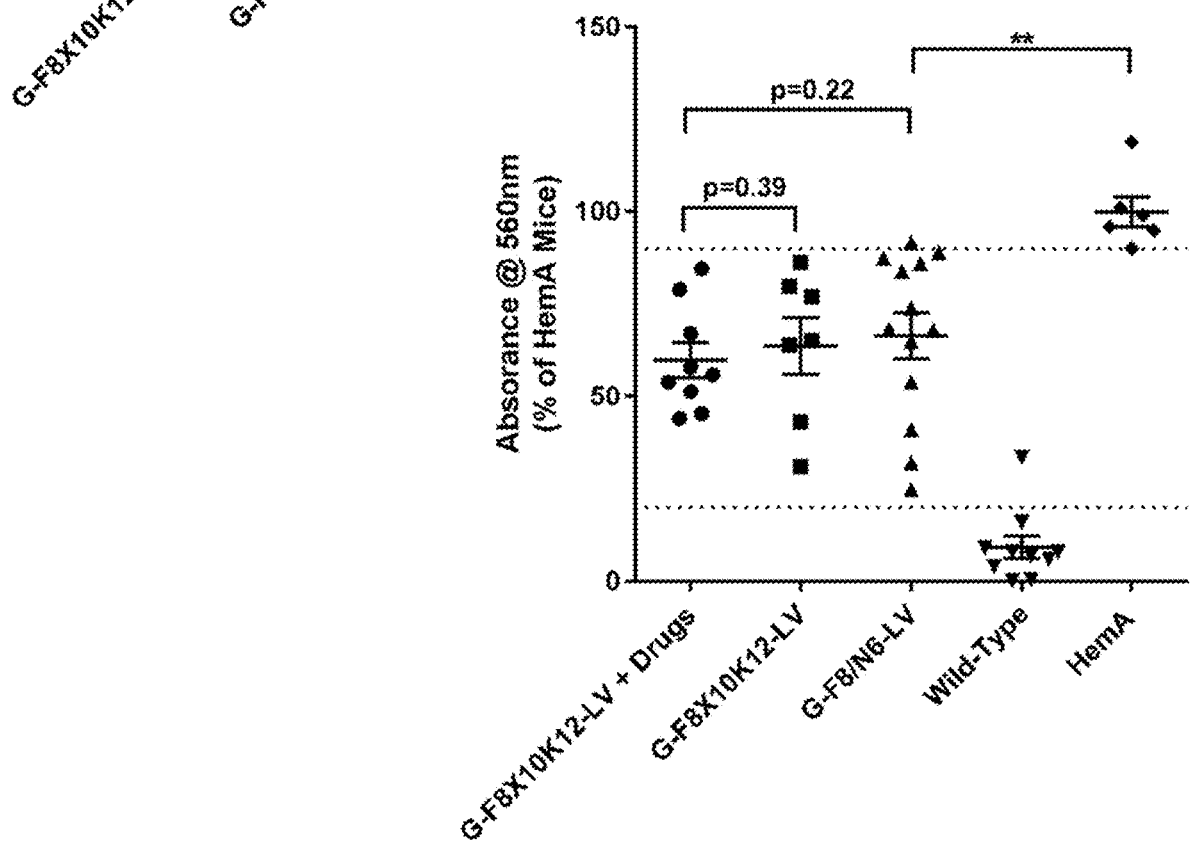

The long-term therapeutic efficiency of combined drugs+ LVs in HemA mice was evaluated by a tail clipping assay. On day 120 after IO infusion of LVs, all three groups of mice treated with F8X10K12-LV+drugs, or G-F8X10K12-LV only, or G-F8/N6-LV only, showed significantly reduced blood loss compared with HemA control mice (FIG. 5E), indicating that IO infusion of all three vectors can correct bleeding phenotype in HemA mice. Furthermore, minor differences were detected in the blood loss within these three groups with the trend of G-F8X10K12-LV+drugs <G-F8X10K12-LV only <G-F8/N6-LV only treated mice (FIG. 5E).

Figure 5F:
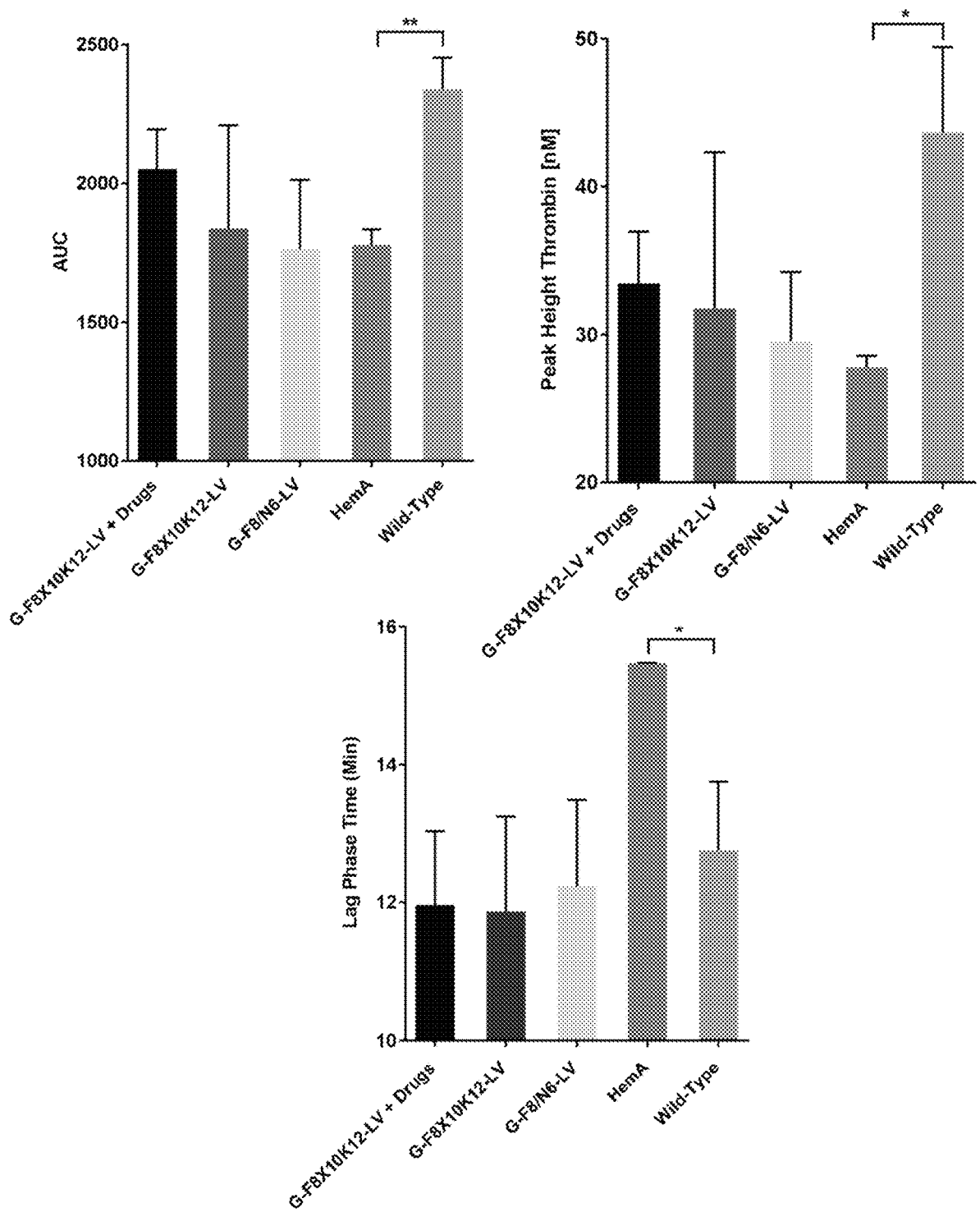

The functional activity of platelet-FVIII was also evaluated in vitro by thrombin generation assay using PRP isolated from HemA mice. Although platelets play a major role in the burst of thrombin generation in clotting cascade, FVIII stored in platelets enhances this process to promote fibrin clot formation. Compared to HemA controls, wild-type controls had shorter lag phase time, higher peak height thrombin and higher total generated thrombin (area under the curve (AUC) (FIG. 5F). The average lag phase time of all PRP samples from the treated mice on day 200 after IO infusion of LVs was shorter than that of HemA controls, which confirmed that platelet-FVIII played an important role in the early stage of clot formation. In addition, the average peak height thrombin and total generated thrombin of samples from G-F8X10K12-LV+drugs treated mice were relatively higher than that from G-F8/N6-LV only treated mice, indicating that the mice treated with immune suppressive drugs and F8X10K12-LV generated more thrombin to enhance clot formation.

Figure 6A:
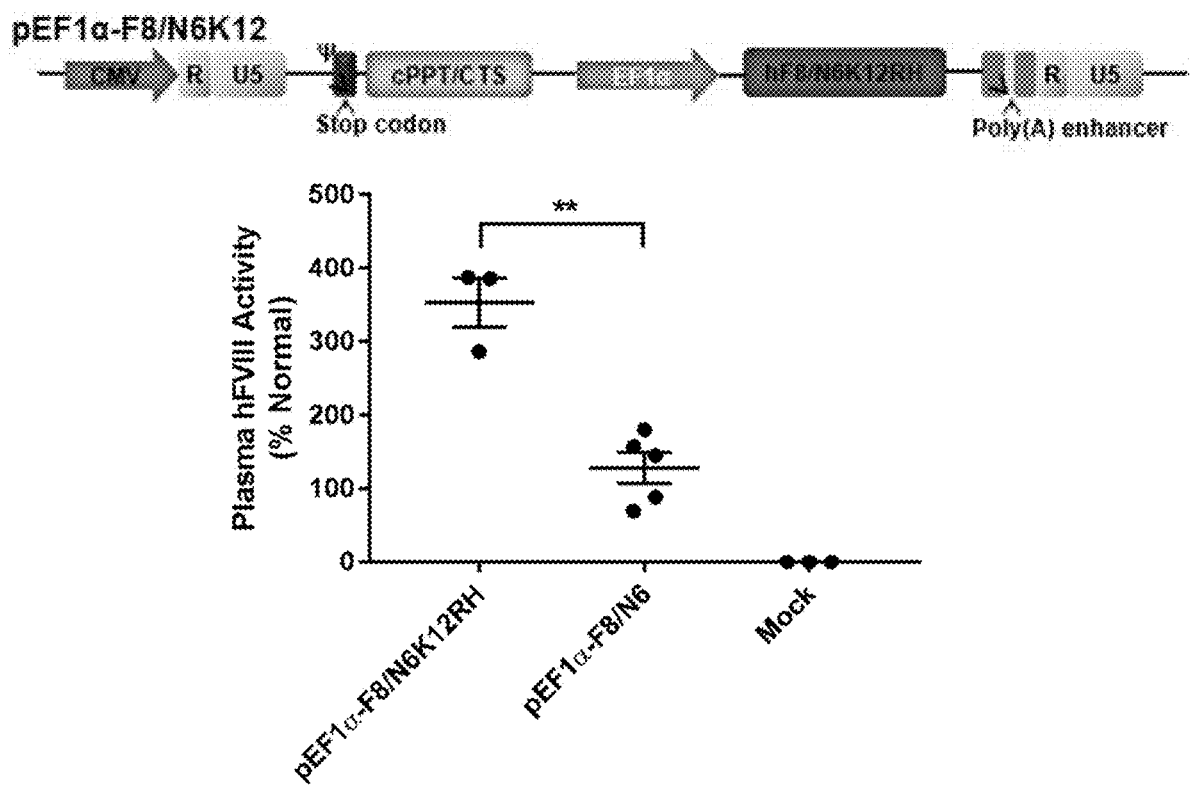

F8/N6K12RH with higher functional activity combined with drug treatment significantly enhanced hemophilia A phenotyping correction Even though relatively higher platelet-FVIII level in G-F8X10K12-LV treated HemA mice enhanced blood clotting, high-titer inhibitory antibodies were induced due to secretion of FVIII into the circulation. Thus F8/N6RHK12 (FIG. 6A) was cloned into the LV to decrease secretion and maintain higher functional activity and stability of FVIII protein. As shown in earlier sections, F8/N6 is a B-domain deleted FVIII variant that can enhance FVIII gene expression without induction of inhibitory anti-FVIII antibodies (FIGS. 3 & 5). RH in F8/N6RHK12 denotes R1645H mutation (Siner et al., Blood 121:4396-4403, 2013) for generating a more stable FVIII single chain molecule and together with K12 mutations can significantly enhance the biological activity of FVIII compared with BDD-FVIII. As expected, the mice treated with hydrodynamic injection of pEF1α-F8/N6RHK12 produced significantly higher plasma FVIII activity than the mice treated with pEF1α-F8/N6 (FIG. 6A).

G-F8/N6K12RH-LV was generated and delivered into HemA mice with combined drug treatment. As expected, the average platelet-FVIII antigen levels in G-F8/N6K12RH-LV-only and G-F8/N6-LV-only treated mice were similar. However, the platelet-FVIII levels in G-F8/N6K12RH-LV+ drugs-treated mice were significantly higher than that in G-F8/N6K12RH-LV-only and G-F8/N6-LV-only treated mice on day 84 (FIG. 6C), suggesting that the combined drug treatment enhanced the production and maintenance of higher platelet-FVIII levels. There was neither detectable plasma FVIII activity nor anti-FVIII inhibitors in blood of the treated mice on day 84 (FIG. 6C). Phenotype correction in the treated mice was next evaluated by the blood flow rate change in the $FeCl_3$-induced carotid artery injury mouse model. The average flow rates were compared in five mouse groups: untreated wild-type s G-F8/N6K12RH-LV+drugs <G-F8/N6K12RH-LV only <G-F8/N6-LV only treated <untreated HemA mice on day 84 (FIG. 6D) with several of G-F8/N6K12RH-LV+drugs-treated mice exhibiting the same flow rates as observed in wild-type mice. The function of platelet FVIII in these five groups of mice was also evaluated using ROTEM assay. The results were consistent with the flow rate data. Interestingly, the maximum clot firmness (MCF) was easily corrected by platelet FVIII, whereas it is more difficult to correct the clotting time (CT).

HemA phenotype correction of G-F8/N6-LV only or G-F8/N6K12RH-LV+drugs treated mice was also evaluated by measuring carotid artery blood flow rate on day 84 (FIG. 6D). Phenotype correction in the treated mice was next evaluated by the blood flow rate change in the $FeCl_3$-induced carotid artery injury mouse model. The average flow rates were compared in five mouse groups: untreated wild-type s G-F8/N6K12RH-LV+drugs <G-F8/N6K12RH- LV only <G-F8/N6-LV only treated <untreated HemA mice on day 84 (FIG. 6D) with several of G-F8/N6K12RH-LV+ drugs-treated mice exhibiting the same flow rates as observed in wild-type mice. The function of platelet FVIII in these five groups of mice was also evaluated using ROTEM assay. The results were consistent with the flow rate data (Table 1). Interestingly, the maximum clot firmness (MCF) was easily corrected by platelet FVIII, whereas it is more difficult to correct the clotting time (CT).

TABLE 1

|  | CT (s) | CFT (s) | α (degree) | MCF (mm) |
|---|---|---|---|---|
| G-F8/N6K12RH-LV + Drugs | 146 ± 4* | 104 ± 21 | 70 ± 4** | 66 ± 4 |
| G-F8/N6K12RH-LV | 388 ± 193 | 165 ± 123 | 62 ± 15* | 61 ±7 |
| G-F8/N6-LV | 564 ± 367 | 261 ± 182 | 43 ± 13 | 62 ± 6 |
| Wild-Type | 164 ± 49* | 57 ± 10* | 79 ± 2** | 63 ± 1 |
| HemA | 956 ± 185* | 2370 ± 1150* | 4 ± 6*** | 26 ± 19* |

The whole blood samples were collected on day 140 to evaluate the platelet FVIII function using a ROTEM assay. Each assay was carried out for 1 hr to obtain values of clotting time (CT), clot formation time (CFT), α-angle, and max clot firmness (MCF). Statistical significance was analyzed based on the relevance to the G-F8/N6-LV treated mouse group. *<0.05, <0.01, *<0.001.

Discussion Current clinical trials for hemophilia A or B gene therapy using recombinant adeno-associated viral (AAV) vectors (rAAV) have shown very promising results. However, lentiviral gene therapy is superior in several aspects. First, AAV persists as episomal, concatemerized vector following in vivo gene transfer. Overtime, transgene expression may decrease, and repeated dosing will be required. It remains to be shown whether repeated dosing is feasible, or effective. In contrast, lentiviral vectors are an integrating vector that is incorporated into the genome of transduced cells. If successfully integrated into long-lived bone marrow HSCs, a single treatment of LV-mediated gene therapy may be sufficient for life-long therapeutic benefit. In addition, In contrast to AAV which has a transgene capacity of 4.5 kb, LV can easily accommodate much larger genes such as FVIII cDNA. LV can efficiently transduce both dividing and non-dividing cells, leading to efficient transduction of primitive HSCs. Furthermore, recent clinical trials of ex vivo HSC gene therapy have shown remarkable therapeutic benefits and safety records for patients with severe genetic diseases including X-linked severe combined immunodeficiency, Wiskott-Aldrich syndrome, spinal muscular atrophy, and sickle cell disease Most significantly, genotoxicity by clonal dominance or significant clonal expansions from vector integration were not observed in these patients.

In the current study, the developed gene therapy protocol for HemA aims to treat HemA patients by IO infusion of LVs containing FVIII cDNA under expression control by a megakaryocyte-specific promoter, which leads to expression of the gene in the platelets. This gene therapy protocol has several advantages over existing protocols that include the ex vivo gene therapy protocol targeting HSC transduction or the in vivo gene therapy protocol targeting FVIII expression in hepatocytes. Compared with ex vivo gene therapy, IO infusion could efficiently in situ transduce HSCs to avoid the lengthy and complicated procedures of cell manipulation and transplantation. Significantly, the herein described approach avoids the requirement for use of fully or partially myeloablative conditioning regimens required for successful ex vivo gene therapy.

Compared to other in vivo LV-mediated gene therapy approaches, IO delivery is unique. Slow injection (e.g., at a rate of 2 μL/min to 13 μL/, or at 10 μL/) of LVs into bone marrow cavity can minimize or even avoid the systemic toxicity caused by intravenous delivery of LV, AAV and other candidate gene therapy vectors. In addition, compared with hepatocyte-targeted LV gene transfer which induced high risk of antibody formation after FVIII is secreted from hepatocytes into circulation, the platelet-targeted FVIII gene therapy generated FVIII stored in platelets and protected from processing by antigen presenting cells and neutralization by anti-FVIII inhibitors. During bleeding, FVIII was released by activated platelets on-site to efficiently enhance clot formation. Bleeding phenotype is partially corrected in HemA mice with or without pre-existing anti-FVIII inhibitors. Additionally, targeting factor VIII expression to platelets for HemA gene therapy did not increase thrombotic risks but promoted immune tolerance in HemA mice. Therefore, the described strategy of IO LV delivery targeting FVIII expression in platelets is highly promising to treat HemA patients with or without inhibitors.

Figure 1B:
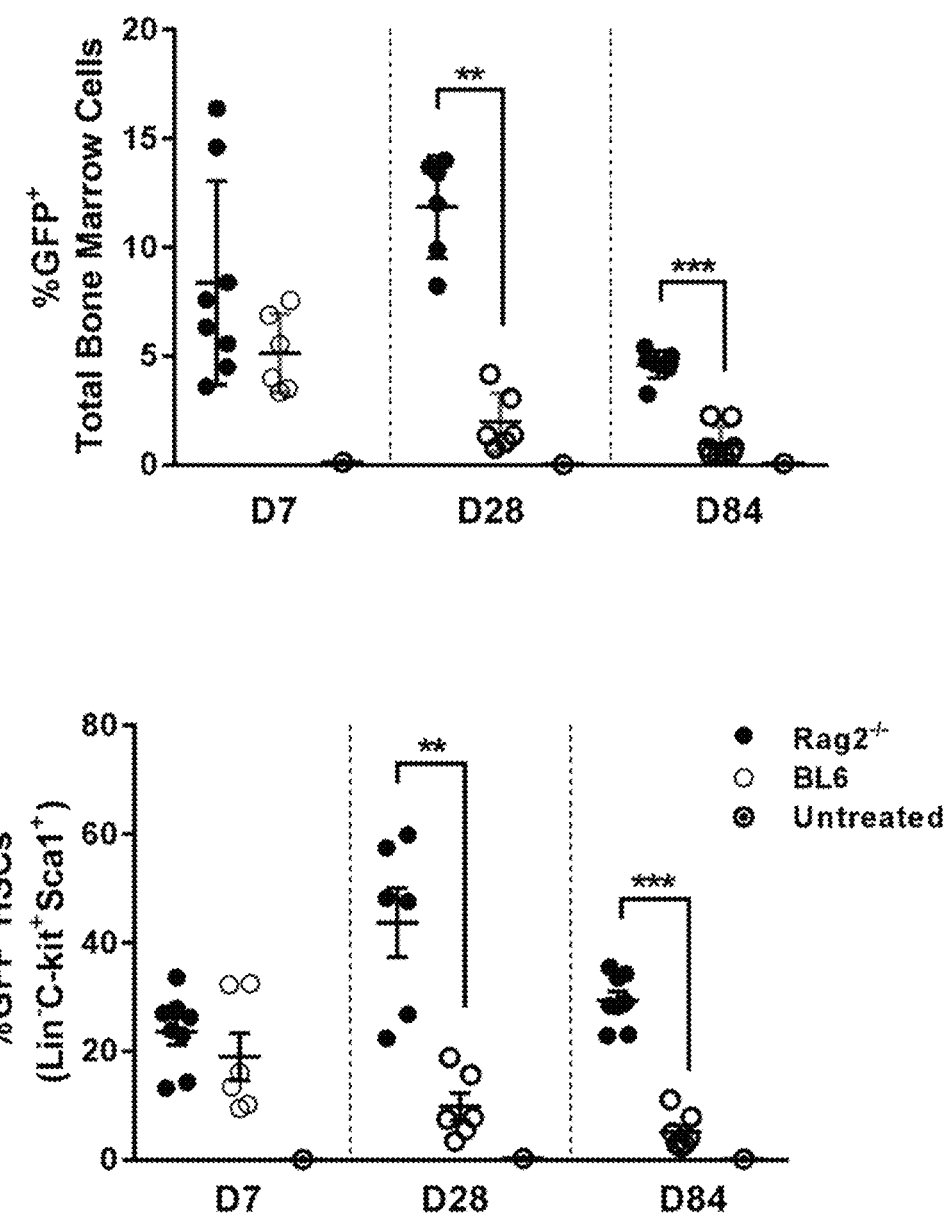

However, in vivo LV gene therapy brought associated immune responses that may decrease LV transduction efficiency and eliminate LV transduced cells. In immune competent mice given IO infusion of MND-GFP-LV, the percentage of GFP+HSCs decreased over time (FIG. 1B). When the immune competent mice were given Dex before and after IO delivery of LVs, the average percentage of GFP+BM cells was 3-fold of that in control mice (FIG. 2B), which agreed with the finding that Dex treatment could effectively suppress inflammatory cytokine production after intravenous infusion of LVs (Agudo et al., Mol. Ther. 20:2257-2267, 2012). Transient depletion of CD8+ T cells by anti-CD8α mAbs in immune competent mice (FIGS. 8A, 8B) also produced higher percentage of GFP+HSCs over 7 weeks after LVs infusion compared with control mice (FIG. 2C). More importantly, combined drug treatment with Dex and anti-CD8α mAbs in the immune competent mice achieved up to 14% GFP+HSCs in bone marrow more than 5 months after viral infusion (FIG. 2D). Furthermore, in HemA mice given IO infusion of G-F8/N6-LV, combined drug treatment improved hemophilia phenotype correction, especially evaluated by blood flow rate assay (FIG. 3B). These agents in combination synergistically augmented LV transduction. However, gradual decrease of GFP+HSCs was still observed in combined drug treated mice over a long period of time, suggesting that other immunomodulation regimens can potentially further enhance the persistence of transgene expression following IO delivery of LVs.

Figure 4C:
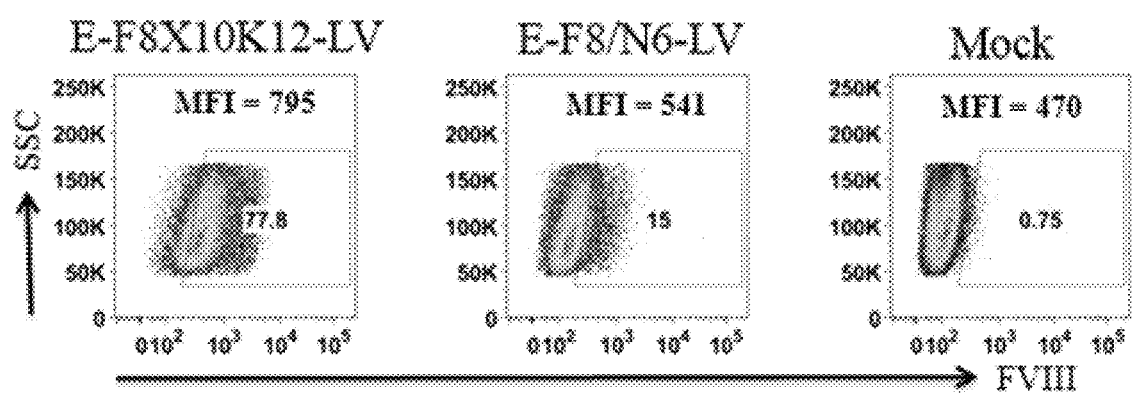

A modified FVIII cDNA producing FVIII protein with higher expression level, enhanced bioactivity and longer half-life would be desirable for successful gene therapy of hemophilia A. Compared with human FVIII, canine FVIII is functionally more active and porcine FVIII expresses at higher levels. Novel recombinant FVIII cDNAs are thus designed with mutations at specific sits replacing with porcine- or canine-corresponding amino acids to increase secretion and functionality on the basic frame of human VIII sequence. Compared with F8/N6, F8X10K12 directed by a ubiquitous promoter produced a 25-fold increase of FVIII activity in HemA mice following hydrodynamic injection (FIG. 4B) and expressed higher levels of FVIII in LV-transduced 293T cells (FIG. 4C). Compared with mice treated with IO delivery of G-F8/N6-LV directed by a platelet-specific promoter, G-F8X10K12-LV treated mice produced higher FVIII expression levels in platelets (FIG. 5B). However, anti-FVIII antibodies were induced likely due to higher levels of FVIII secretion into the circulation (FIG. 5E).

Figure 6B:
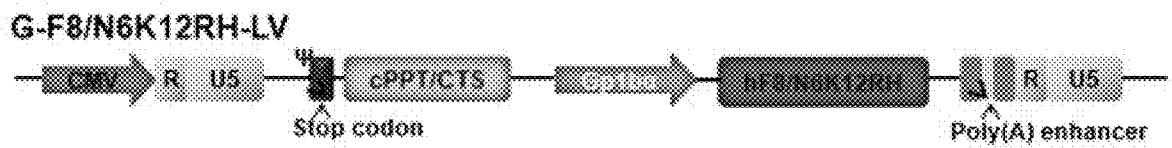

It has been reported by that high levels of FVIII expression in platelets could induce platelet apoptosis. Thus, the described platelet-targeted gene therapy of hemophilia A focused further on enhancing bioactivity rather than expression levels. The cDNA of a FVIII variant, F8/N6K12RH with higher activity contributed by a R1645H mutation (Siner et al., *Blood* 121:4396-4403, 2013) and K12 mutations in light chain, was incorporated into the LV construct. Compared with F8/N6, F8/N6K12RH directed by a ubiquitous promoter produced a 2.7-fold increase of FVIII activity in HemA mice (FIG. 6A). Importantly, hemophilia phenotype correction in G-F8/N6K12RH-LV plus combined drug treated mice was significantly improved compared with G-F8/N6-LV treated mice, without the generation of anti-FVIII inhibitors (FIGS. 6B and 6C)

FVIII ectopic expression in platelets provides an effective pathway for gene therapy of HemA patients, especially for patients with pre-existing anti-FVIII inhibitors as a result of frequent intravenous infusion of FVIII. FVIII stored in platelets is not only protected from being neutralized by inhibitors in peripheral blood, but also significantly improves the bleeding phenotype even with as low as 1%-5% of peripheral blood platelets containing FVIII. The therapeutic effects of platelet-FVIII was characterized by several FVIII function assays including in vitro assays such as chromogenic assay (Shi et al., *Mol Gen Metabol.* 79:25-33, 2003; Baumgartner et al., *J Thromb & Haemostas.* 13:2210-2219, 2015) and thrombin generation assay (Monroe et al., *Arterios Thromb Vas Biol.* 22:1381-1389, 2002), and in vivo assays such as tail clipping assay (Wang et al., *Mol Therapy* 23:617-626, 2015; Shi et al., J Clin Invest 116:1974-1982, 2006) and $FeCl_3$ carotid artery thrombosis assay (Yarovoi et al., *Blood* 105:4674-4676, 2005; Yarovoi et al., *Blood* 102:4006-4013, 2003). FVIII-containing platelets were isolated for use in in vitro assays. Isolated FVIII-containing platelets were lysed, and released FVIII functional activity was detected by a chromogenic assay using a Coatest FVIII:C/4 kit. However, results from the chromogenic assay could not accurately predict therapeutic efficacy because of the very low level of platelet-FVIII even in transgenic mice (the highest platelet-FVIII level of 11 mU/$10^8$ platelets in LV18$^{/g++}$ mice, described in Baumgartner et al., *J Thromb & Haemostas.* 13:2210-2219, 2015). In place of the chromogenic assay, the thrombin generation assay was used where FVIII-containing platelets were directly added into HemA PRP and function was expressed as three parameters (lag phase time, peak height thrombin and total generated thrombin). LV treated mice had shorter lag phase time compared to HemA controls, suggesting that FVIII-containing platelets played an important role in the early stage of clot formation by accelerating thrombin generation. The tail clip assay of treated mice revealed IO infusion of LVs significantly corrected bleeding phenotype compared to HemA control mice. However, therapeutic effects between a combined drug regimen+LVs treatment and LVs only treatment could not be distinguished with this assay. Therefore, the $FeCl_3$ carotid artery thrombosis assay, where blood flow rate was monitored after local damage to the carotid artery, was used. Compared with the modified tail clipping assay, $FeCl_3$ induced carotid thrombosis appears to be more sensitive to monitor the role of platelet-FVIII in enhancing local blood clot formation in arteries, and capable of distinguishing therapeutic differences in the two treatment groups. Results from this assay showed that platelet-FVIII was effective in arterial clotting and that a combination drug regimen with new FVIII variant, F8/N6RHK12, achieved phenotypic correction of HemA in mice.

In conclusion, persistent FVIII gene expression in platelets was achieved by IO infusion of G-F8/N6K12RH-LV into HemA mice pretreated with a combination of Dexamethasone and anti-CD8α monoclonal antibody. Transient suppression of immune responses to LVs and LV-transduced cells increased LV transduction efficiency and produced long-term stable transgene expression. F8/N6K12RH with an enhanced bioactivity effectively improved the therapeutic effect of FVIII containing platelets in phenotype correction assay. The function of platelet-FVIII isolated from LV-treated mice was confirmed using a thrombin generation assay. Phenotypic correction of hemophilia was demonstrated using blood clotting assays with tail clip and carotid artery injury models. This approach may provide a readily translatable treatment for hemophilia in large animals and clinical trials.

Example 2. Intraosseous Delivery of Lentiviral Virus Acts as a Therapeutic Strategy for In Vivo Gene Therapy of Hemophilia As discussed above, lentiviral vectors (LVs) delivered by intraosseous (IO) infusion at a precisely controlled speed can efficiently transduce bone marrow hematopoietic stem cells (HSCs) in mice. IO infusion of LV carrying a human FVIII/N6 transgene driven by a platelet-specific Gp1bα promoter into hemophilia A (HemA) mice produced FVIII stored in platelet α-granules. These platelet FVIII partially corrected the bleeding phenotype over five months in HemA mice with or without pre-existing anti-FVIII inhibitors.

In the current example, IO delivery of LVs was applied in humanized NSG mice to establish a translational research model for in vivo gene therapy of hemophilia. Firstly, whether high level transgene expression could be achieved in human megakaryocytes (Megs) was examined. Human CD34$^+$ cells were transduced with Cocal-MND-GFP-LV (M-GFP-LV, MOI=25) or Cocal-Gp1bα-GFP-LV (G-GFP-LV, MOI=25) and then cultured with Megakaryocyte Expansion Supplement (MES). 14 days after LV transduction, high level of GFP expression (36%) was detected in both M-GFP-LV transduced Megs (CD41$^+$ cells) and non-Megs (CD41$^-$ cells). Furthermore, in G-GFP-LV-transduced human cells, GFP specifically expressed in Megs, but not in other types of cells derived from HSCs.

Next, FVIII specific expression in human Megs was evaluated in Cocal-GP1bα-F8/N6-LV (G-F8/N6-LV) transduced human CD34+ cells. FVIII expression level in G-F8/N6-LV transduced human cells increased from 7% to 28% when the LV doses increased from MOI=10 to 50 on day 21 after LV transduction. These results indicated that platelet-specific promoter, Gp1bα, could specifically guide high level transgene expression in human Megs.

Transgene expression in humanized NSG mice following IO delivery of LVs was also investigated. Humanized NSG mice were created by I.V. infusion of 1×10⁶ human CD34+ cells into 6-week female NSG mice. After 8 weeks, G-GFP-LV, G-F8/N6-LV and Cocal-GP1bα-F8X10-LV (G-F8X10-LV) were delivered into the humanized mice by IO infusion and transgene (GFP or human FVIII) expression was evaluated in human platelets. However, human platelets in blood of humanized mice rapidly decreased to undetectable levels following human cells engraftment, possibly due to recognition and destruction by murine macrophage cells.

In order to examine transgene expression in human platelets, the mice were given a series of clodronate liposome treatments (CLT) (0.7 mg/animal, Day 0, 2, 7, 13), which was reported to transiently deplete murine macrophage cells. CLT treatment induced recovery of human platelets from an undetectable level to the level comparable to the percentage of engrafted human cells in total PBMCs. In addition, similar level of GFP expression was detected in both human and murine platelets of CLT+G-GFP-LV treated mice. Most importantly, higher platelet FVIII level was found in CLT+G-F8/N6-LV or G-F8X10-LV treated mice than G-F8/N6-LV or G-F8X10-LV only treated mice. Over 10% of the human cells expressed FVIII when human CD34+ cells were isolated from the G-F8/N6-LV-treated humanized mice and cultured with MES for 6 days. Next, LV integration sites in isolated human cells were examined by LAM-PCR.

Based on the described studies, IO infusion of LVs can be a valuable strategy for in vivo gene therapy of hemophilia A and other blood clotting disorders that would benefit from the expression of FVIII.

Example 3. Intraosseous Delivery of Lentiviral Virus Produces Human Platelet-Specific Factor VIII in Humanized NSG Mice This example establishes proof-of-principle research models in humanized NSG mice for translational applications of this novel strategy in human clinics.

Hemophilia A (HemA) with a deficiency of functional plasma factor VIII (FVIII) is an ideal disease candidate for gene therapy to attain long-term therapeutic FVIII levels. Described herein is a new clinically translatable strategy for treating HemA. In this strategy, self-inactivating lentiviral vector (LV) carrying FVIII transgene driven by a platelet-specific promoter Gp1bα (G) (G-FVIII-LV) was delivered into HemA mice without preconditioning via intraosseous (IO) administration. G-FVIII-LV can effectively transduce hematopoietic stem cells (HSCs). Then, FVIII specially expressed and stored in platelet α-granules can partially correct bleeding phenotype over five months in immune-competent HemA mice with or without pre-existing anti-FVIII inhibitors (Wang et al., *Mol. Ther.*, 23(4):617-626, 2015).

Figure 12A:
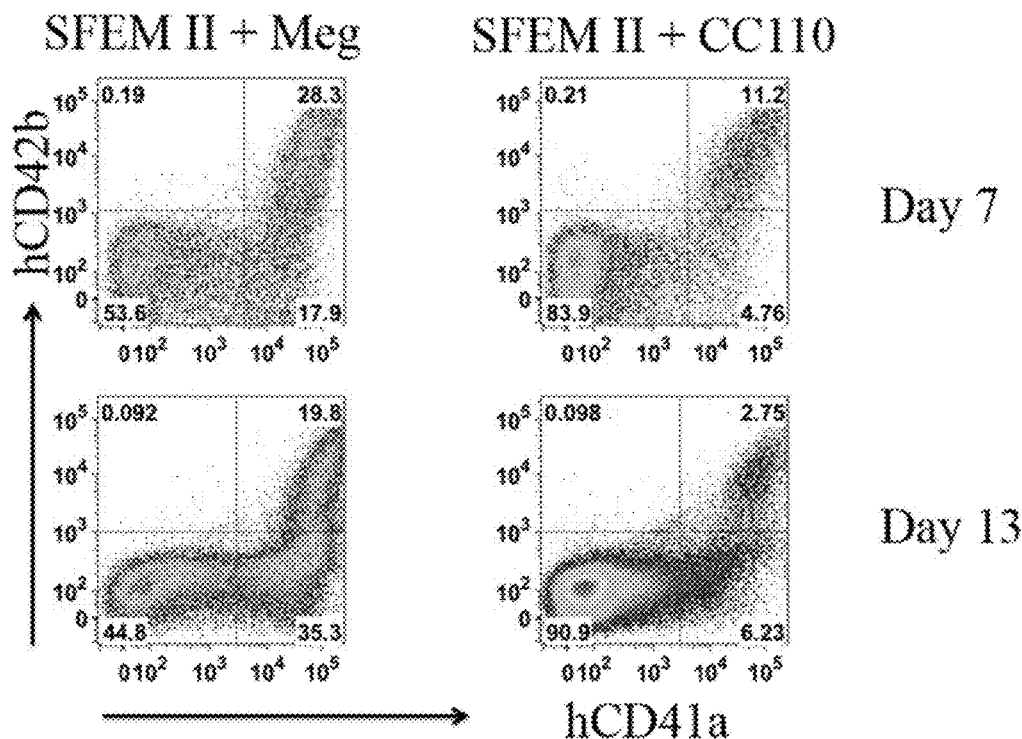
FIGS. 12A-12B. Human CD34+ cells were cultured in SFEM II supplemented with cytokine cocktail for expansion of human hematopoietic cells (CC110), or serum-free culture supplement for expansion of human megakaryocytes (Meg) for 7 and 13 days (FIG. 12A). Human CD34+ cells cultured in SFEM II+Meg were transduced with M-GFP-LV or G-GFP-LV (FIG. 12B). Megakaryocytes and GFP expression on day 7 were detected by flow cytometry.
Figure 12B:
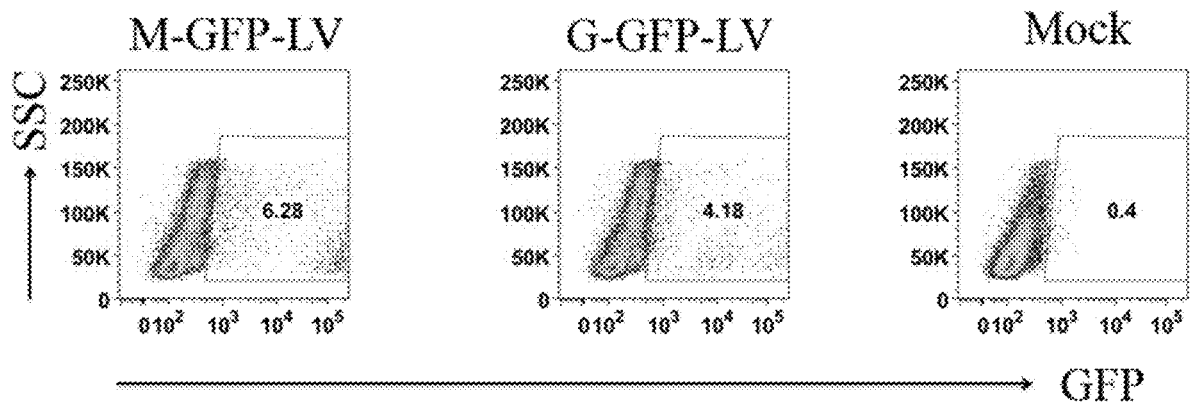

Human CD34+ cells were cultured in SFEM II supplemented with cytokine cocktail for expansion of human hematopoietic cells (CC110), or serum-free culture supplement for expansion of human megakaryocytes (Meg) for 7 and 13 days (FIG. 12A). Human CD34+ cells cultured in SFEM II+Meg were transduced with M-GFP-LV or G-GFP-LV (FIG. 12B). Megakaryocytes and GFP expression on day 7 were detected by flow cytometry.

6-week NSG mice were retro-orbitally injected with 1×10⁶ human CD34+ cells one day after preconditioning with busulphan (25 mg/kg). After 13 weeks, bone marrow (FIG. 13A), spleen (FIG. 13B), and blood (FIG. 13C) were collected. Human CD34+ cells in bone marrow, and human CD45+ cells and murine CD45+ cells in bone marrow, spleen and blood were detected by flow cytometry.

Figure 14A:
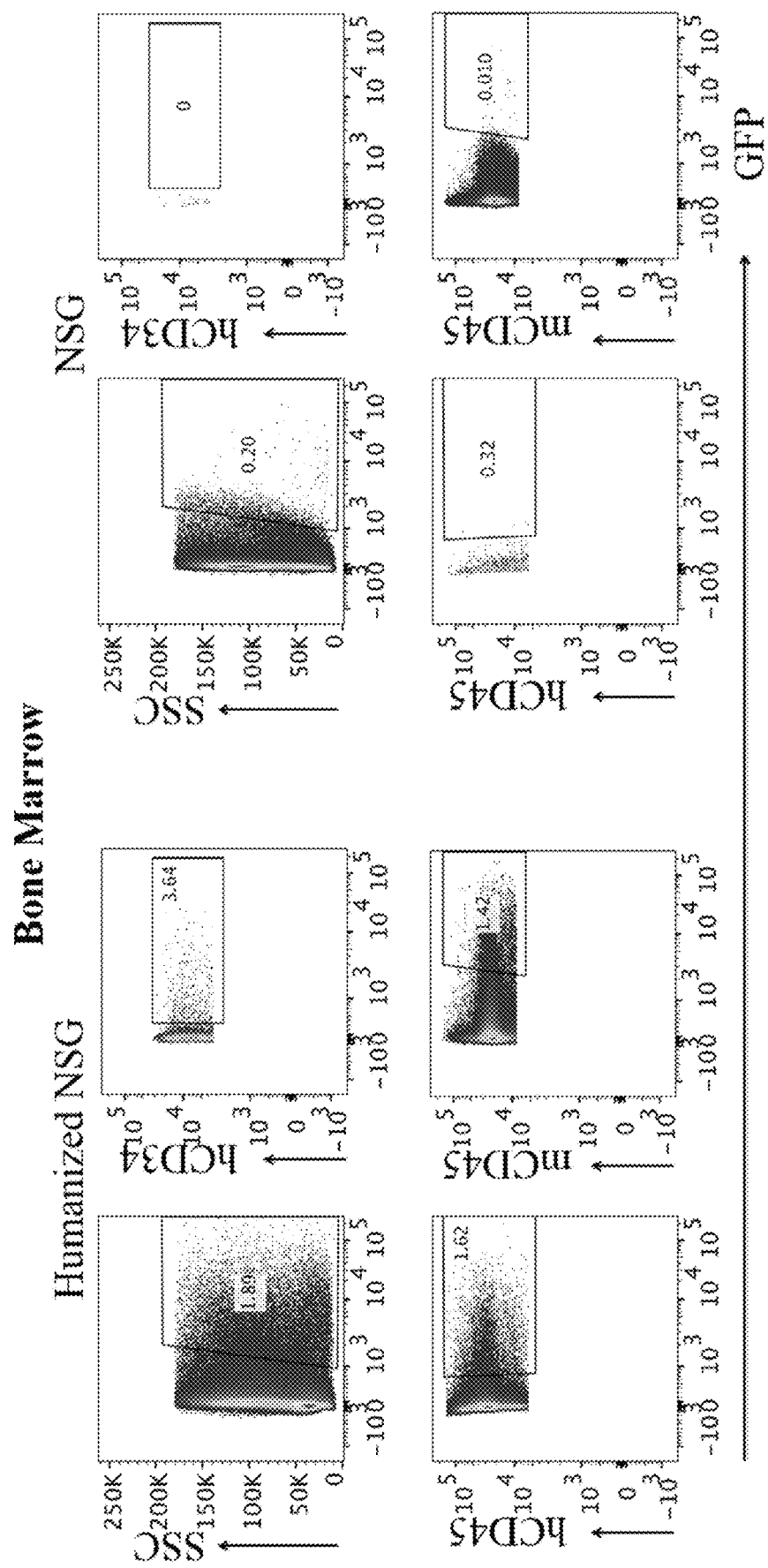
FIGS. 14A-14B. M-GFP-LV was intraosseously infused into humanized NSG mice, which were generated by retro-orbital injection of human CD34+ cells 9 weeks ago. Four weeks later, the mice were sacrificed and bone marrow and spleen were isolated. GFP expression in total cells, human CD45+ and murine CD45+ cells in bone marrow (FIG. 14A) and spleen (FIG. 14B) was detected by flow cytometry.
Figure 14B:
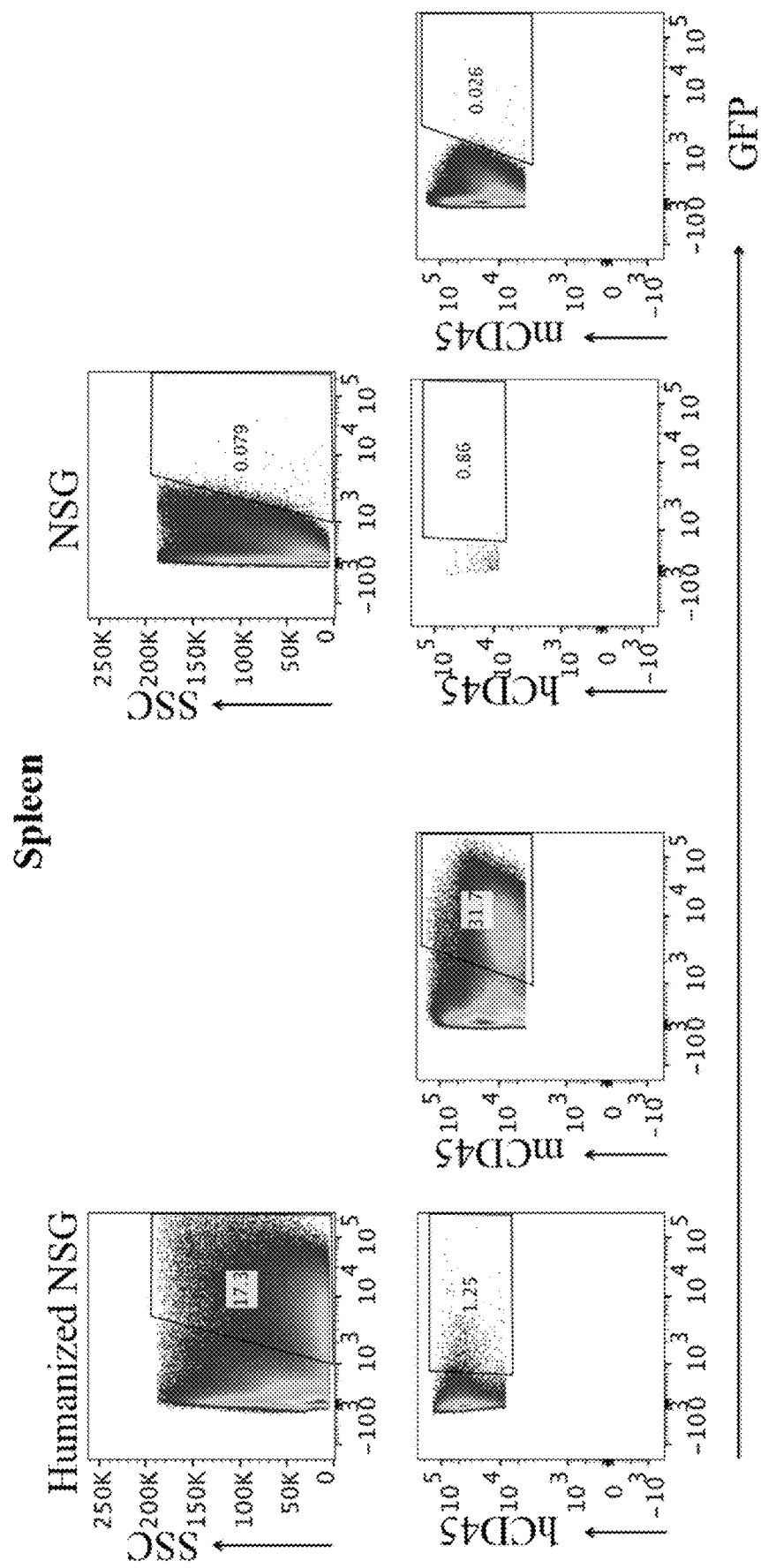

M-GFP-LV was intraosseously infused into humanized NSG mice, which were generated by retro-orbital injection of human CD34+ cells 9 weeks ago. Four weeks later, the mice were sacrificed and bone marrow and spleen were isolated. GFP expression in total cells, human CD45+ and murine CD45+ cells in bone marrow (FIG. 14A) and spleen (FIG. 14B) was detected by flow cytometry.

CONCLUSIONS

G-CSF mobilized human CD34+ PBSCs cultured with SFEM II+Meg successfully differentiated into megakaryocytes in vitro, and transgene expressed in human cells after LV transduction.

Humanized mice were generated by retro-orbital injection of G-CSF mobilized human CD34+ PBSCs into preconditioned NSG mice. In the long term, human CD34+ cells successfully renewed and differentiated into hematopoietic lineage cells in vivo.

GFP expressed in human cells of humanized NSG mice after intraosseous infusion of LVs. Next, humanized NSG mice will be treated with intraosseous delivery of FVIII-LVs.

The IO delivery of LVs technology was applied in humanized NSG mice to establish a translational research model for in vivo gene therapy of hemophilia. Efficient transduction of human CD34+ cells to produce megakaryocyte-specific FVIII expression by G-F8-LV was demonstrated. In addition, it was demonstrated that following IO delivery of G-F8/N6-LV into humanized NSG mice, human CD34⁺ cells isolated from the treated mice showed significant FVIII expression. LV integration sites in isolated human cells can be examined by LAM-PCR, confirming the safety of this strategy. These results further confirm that IO infusion of LVs could be a valuable strategy for in vivo gene therapy of hemophilia A.

Example 4: Evaluation of the Efficacy and Safety of Intraosseous Delivery of Platelet-Specific Factor VIII-Lentiviral Vectors as an In Vivo Gene Therapy for Hemophilia in Humanized NSG Mice Hemophilia A is a genetic disorder resulting in a deficiency in functional factor VIII (FVIII) secreted in plasma and presents as an ideal disease model for gene therapy. As described above, an in vivo intraosseous injection (IO) therapy has successfully developed to deliver FVIII/N6 lentivirus (G-F8VIII-LV) driven by the platelet-specific Gp1bα promoter. Viral transduction of hematopoietic stem cells (HSCs) ensures long-term continued maintenance of the gene therapy. FVIII is then produced and stored in the α-granules of platelets, avoiding detection by the immune system, making this therapy accessible to patients who have already developed inhibitory antibodies to FVIII. IO delivery of G-F8-LV partially corrected the hemophilia phenotype in mice for at least 5 months. The aim of the current study was to assess the safety and efficacy of IO delivery of G-FVIII-LV in humanized mice to assure the feasibility of translating this therapy to clinical models.

In vitro studies were first conducted to confirm successful transduction and appropriate expression of G-F8-LV and G-GFP-LV in human CD34+ cells isolated from G-CSF mobilized donors. Cells were cultured in StemSpan™ Serum-Free Expansion Medium (SFEM) supplemented either with cytokine cocktail (CC110) to expand hematopoietic stem cells or with Megakaryocyte expansion supplement (MEG) following transduction to promote differentiation into megakaryocytes. After 7 days of growth, cells cultured in MEG had a higher percentage of both CD41a+ and late-stage differentiated CD41a+CD42b+ megakaryocytes than those cultured in CC110, indicating preferential differentiation into megakaryocytes in this media. Higher FVIII and GFP expression was also observed in MEG cultured cells, suggesting successful megakaryocyte-specific expression, as directed by the Gp1bα promoter.

These LVs were then tested in vivo in humanized NSG mice. NSG mice with and without the W-41 mutation in the c-Kit gene were preconditioned with busulfan (25 mg/kg) 24 hours before the transplantation of hCD34+ cells via retro-orbital (RO) injection. Eight weeks later, higher engraftment of hCD34+ cells was observed in the W-41 NSG cohort compared with NSG mice, averaging greater than 80% engraftment in bone marrow. Human platelet count was also higher in the W-41 NSG mice.

IO delivery of LVs was next performed in cohorts of transplanted mice. Clodronate liposome treatments increased human platelet counts, allowing for detection of notable FVIII expression in platelets isolated from PBMCs of mice treated with G-FVIII-LV. Bone marrow was isolated several weeks after the IO injection, and engrafted human HSCs were isolated using the AutoMACS CD34 MicroBead Kit. The isolated cells were subsequently cultured in MEG and expressed significant levels of FVIII and GFP after 14 days.

The genomic DNA (gDNA) of hCD34+ cells transduced by G-GFP-LV and G-F8-LV respectively was isolated at various MOIs and the bone marrow of two groups of mice that had undergone IO injections with these two viral vectors respectively was analyzed, and marking number was assessed by qPCR.

Using LAM-PCR, integration sites of the lentivirus are being analyzed to assess safety of this therapy. It is expected that there will be no clonal expansion. The integration sites are predicted to be random and polyclonal.

Given its efficacy in humanized mouse models, IO delivery of platelet-specific FVIII presents as a promising in vivo gene therapy for correcting the hemophilia phenotype.

Example 5. Correction of Canine Hemophilia a Via Intraosseous Delivery of a Platelet-Specific Factor VIII-Lentiviral Vector This example describes development of a preclinical protocol of treatment of HemA dogs using interosseous (IO) delivery of lentiviral vectors (LVs).

Background: Hemophilia A (HemA) results from a factor VIII (FVIII) deficiency. Traditional protein infusion to treat HemA is costly, inconvenient, and short-term. Intraosseous (IO) gene therapy via delivery of lentiviral vectors (LVs) into bone marrow targeting FVIII expression in platelets successfully treated HemA mice with or without inhibitors. To facilitate the translation of this novel strategy to clinical application, treatment of HemA dogs via IO gene therapy was investigated.

Methods: The VSVG-pseudotyped G-cFVIII-LV incorporating a platelet-specific promoter Gp1bα and canine FVIII gene at either $2.51*10^8$ ifu/kg or $1.34*10^9$ ifu/kg was injected into tibia bones of HemA dogs M80 and R04 separately. The injection volume of LV was 4.5 ml for each dog. Gene expression of cFVIII was examined in platelets and plasma isolated from LV-treated dogs by ELISA and aPTT assays. The correction of HemA phenotype was evaluated by whole blood clotting time (WBCT) and Thromboelastography (TEG) testing.

Figure 15:
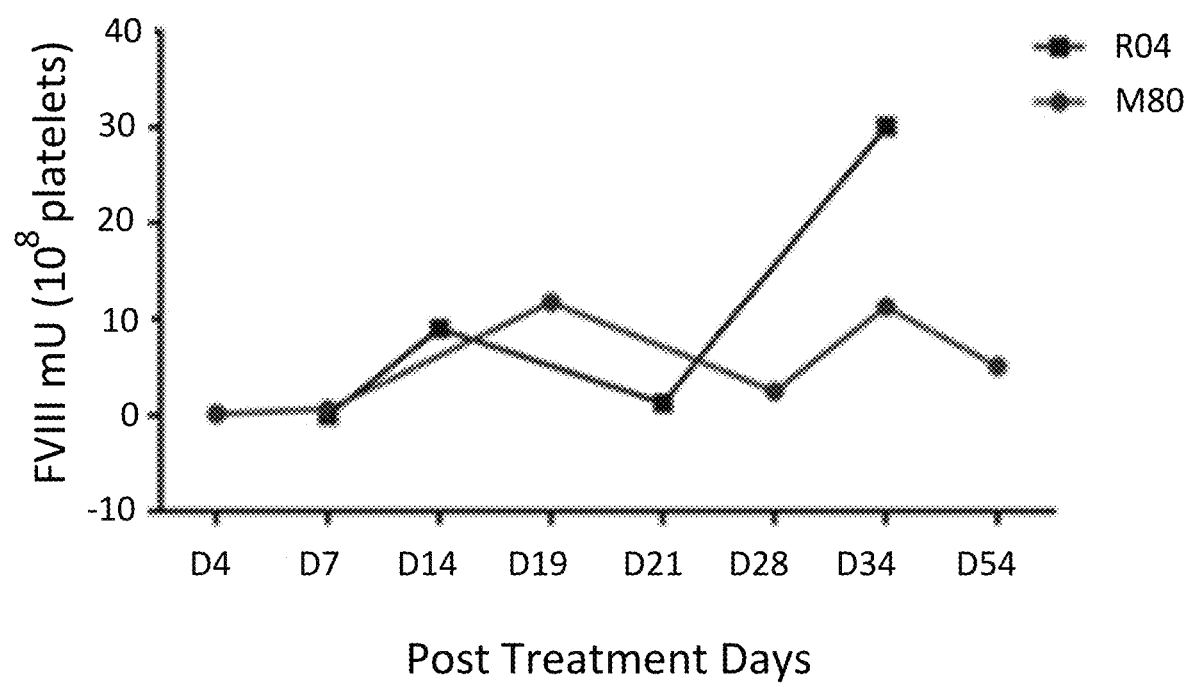
FIG. 15. FVIII gene expression in canine platelets was evaluated by ELISA following IO gene therapy.
Figure 16A:
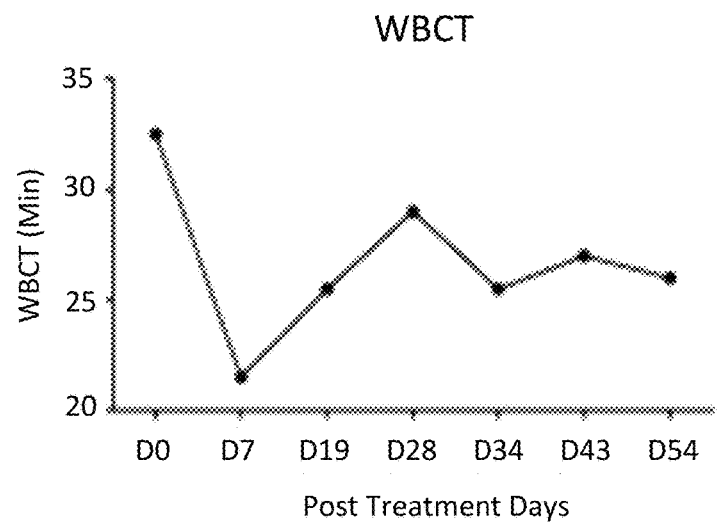
FIG. 16A-16B. HemA phenotype correction was examined by (FIG. 16A) WBCT and (FIG. 16B) TEG in M80 after IO Injection.
Figure 16B:
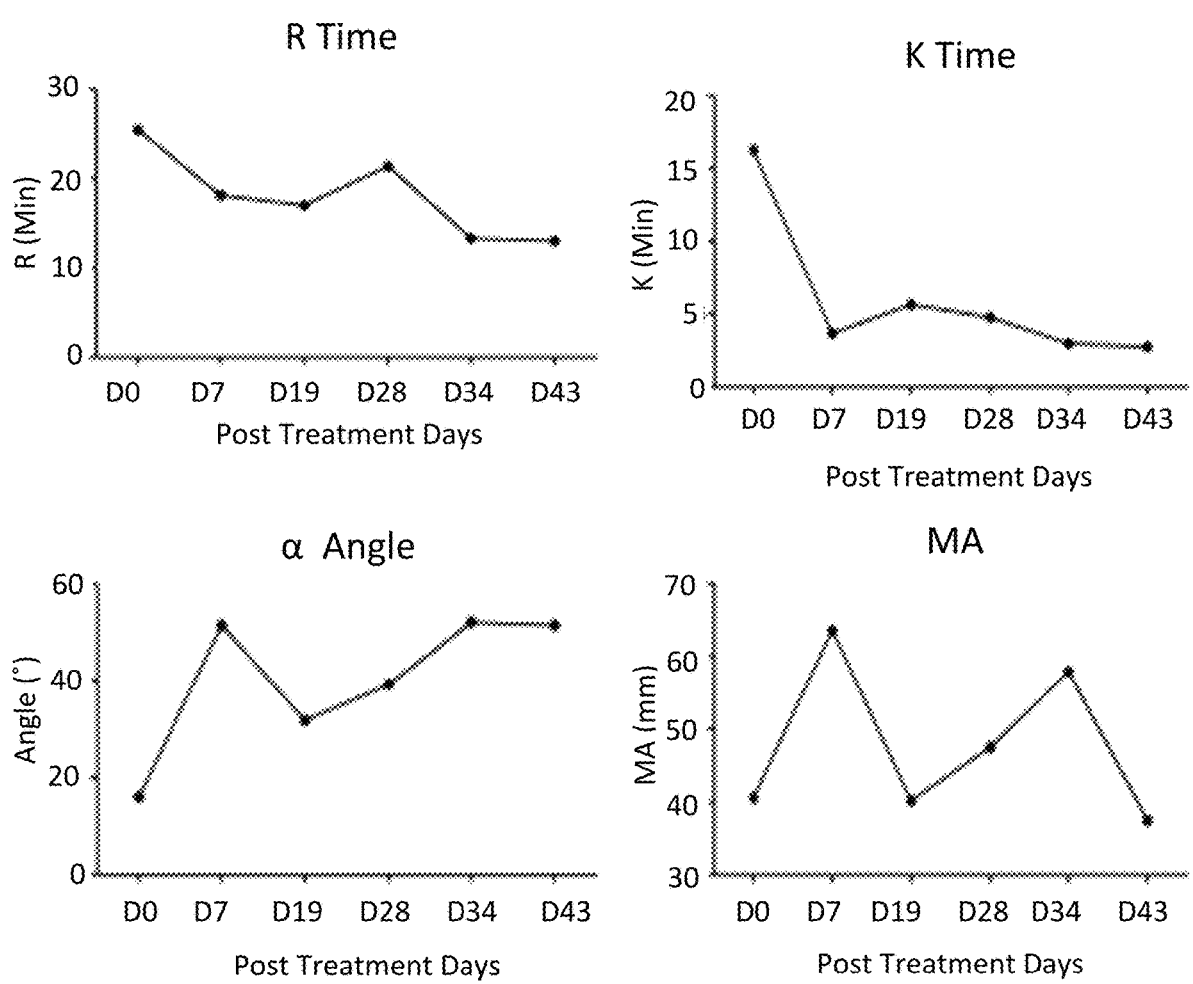

Results: Canine FVIII can be detected in platelets with the highest expression at 30 mU/108 platelets (FIG. 15). No FVIII expression was detected in the dog plasma. WBCTs were shortened in multiple time points shortly after IO gene therapy (FIG. 16A). Similarly, all four parameters (R time, K time, a angle and MA) examined by TEG indicated partial correction of blood clotting (FIG. 16B). Furthermore, the IO gene therapy was well tolerated and didn't produce any toxicity in treated dogs as evaluated by CBC and blood chemistry analysis.

Conclusion: This example establishes a representative IO gene therapy protocol to treat HemA mammals (exemplified by dogs) successfully. This study provides a strategy for safe and effective application of gene therapy in vivo for treating HemA patients.

Example 6: Intravenous Delivery of Lentiviral Vectors to Treat Hemophilia a in a HSCs Mobilization Mouse Model This Example describes development of a novel in vivo approach to genetically modify hematopoietic stem cells (HSCs) in peripheral blood by lentiviral vectors (LVs) for the treatment of Hemophilia A.

Primitive HSCs entering peripheral blood from bone marrow (BM) were first mobilized by administering a combination of G-CSF and AMD3100 in mice, which was followed by intravenous injection (IV) of lentiviral vectors carrying FVIII gene (LVs). Gene delivery efficiency was then investigated by using four types of Lentivirus Vehicles (LVs) encoding the GFP or FVIII gene, either driven by ubiquitous promoters or by a megakaryocyte specific glycoprotein-1 bα (Gp1bα) promoter (MND-GFP-LV, G-GFP-LV, EF-FVIII-LV, G-FVIII-LV). The results show that a single IV injection of LVs could significantly increase transduced HSCs in bone marrow of HSCs mobilized mice. Meaningfully, IV delivery of G-FVIII-LVs achieved long-term FVIII expression in platelets and corrected the hemophilia A phenotype partially without signs of inhibition of FVIII expression. Therefore, the in vivo lentivirus delivery strategy has high potentials for an effective treatment of FVIII deficiency in patients.

Introduction: Hemophilia A with deficiency of FVIII is a rare disease as defined by World Health Organization. Hemophilia A (HemA) is a serious bleeding disorder caused by deficiency in Factor VIII gene. Individuals with hemophilia A suffer from repeated bleeding episodes, which can cause chronic joint disease. After expensive treatment with the recombinant active FVIII, 30% of individuals develop an immunogenic response in the form of neutralizing antibodies against FVIII (Miao, *Thrombosis Journal* 14:41, 2016).

Gene therapy is a good strategy to treat HemA (Roth et al., *New England Journal Med* 344:1735-1742, 2001; White, *Thrombosis and Haemostasis* 86:172-177, 2001; Naldini, *Nature* 526:351-360, 2015; Yarovoi et al., *Blood* 102:4006-4013, 2003). Recently, clinical trials by biotechnology companies show very promising results. AAV vectors are used to delivery FVIII, hybrid liver-specific promoter (HLP) specifically driving its expression in liver for restoring FVIII in plasma (Pasi et al., *Haemophilia* 22:151-152, 2016). However, there is a risk of triggering immune responses to generate anti-FVIII inhibitory antibody, which eventually results in reducing/eliminating of the FVIII in plasma (Ertl et al., *Human Gene Therapy* 28:328-337, 2017; Doering et al., *Molecular Therapy: J Amer Soc Gene Therapy* 15:1093-1099, 2007). In addition, quite many patients have developed inhibitors against AAV vectors, thus that such gene therapy method will not work.

Specific expression of FVIII in platelets is a decent gene therapy method for the treatment of HemA. Wang et al delivered lentivirus construct containing the Gp1bα-FVIII via intraosseous infusion (*Molecular Therapy: J Amer Soc Gene Therapy* 23:617-626, 2015). Blood clotting can be partially corrected by the treatment with platelets specific expression of the FVIII. There are also other investigators who employ Gp2bα promoter to drive FVIII expressions. Both of the methods resulted in FVIII storing in platelets. However, the mice with LVs intraosseous delivery or transplantation of transduced HSCs didn't show FVIII inhibitors.

Using G-CSF and AMD3100 to mobilize primitive progenitor cells is an efficiency method of enforcing the HSCs in bone marrow into peripheral blood. Many studies confirmed that mobilized HSCs can be transduced by an integrating adenovirus vectors in vivo. Additionally, some preclinical studies use the mobilization to enhance gene therapy efficacy. For example, others employed immune reconstitution in mobilized dogs with X-linked severe combined immunodeficiency disease in mobilization dogs. Combination mobilization and IV delivery lentivirus vectors is a good strategy. Therefore, the hypothesis of this study is that mobilized HSCs from bone marrow to peripheral blood could be transduced by lentivirus carrying GFP or FVIII gene. Furthermore, platelets-specific promotor driving FVIII expression in platelets could avoid the development of FVIII inhibitors.

Materials and Methods

Animals and Cells: All in vivo studies and HemA breeding have been approved by the Institutional Animal Care and Use Committee (IACUC) of Seattle Children's Hospital, under IACUC Protocol No. 130001330. All animal procedures and animal care were performed according to institutional animal research guidelines and were also in compliance with Seattle Children's Hospital Animal Management Regulations. HEK293T cells were obtained from the ATCC. Cells were cultured in relevant cell culture medium supplemented with 10% (vol/vol) FBS, 1% (vol/vol) P/S, 1% (vol/vol) Glutamine and 1% (vol/vol) HEPES. Testing for potential *mycoplasma* contamination was done by ELISA.

Figure 22A:
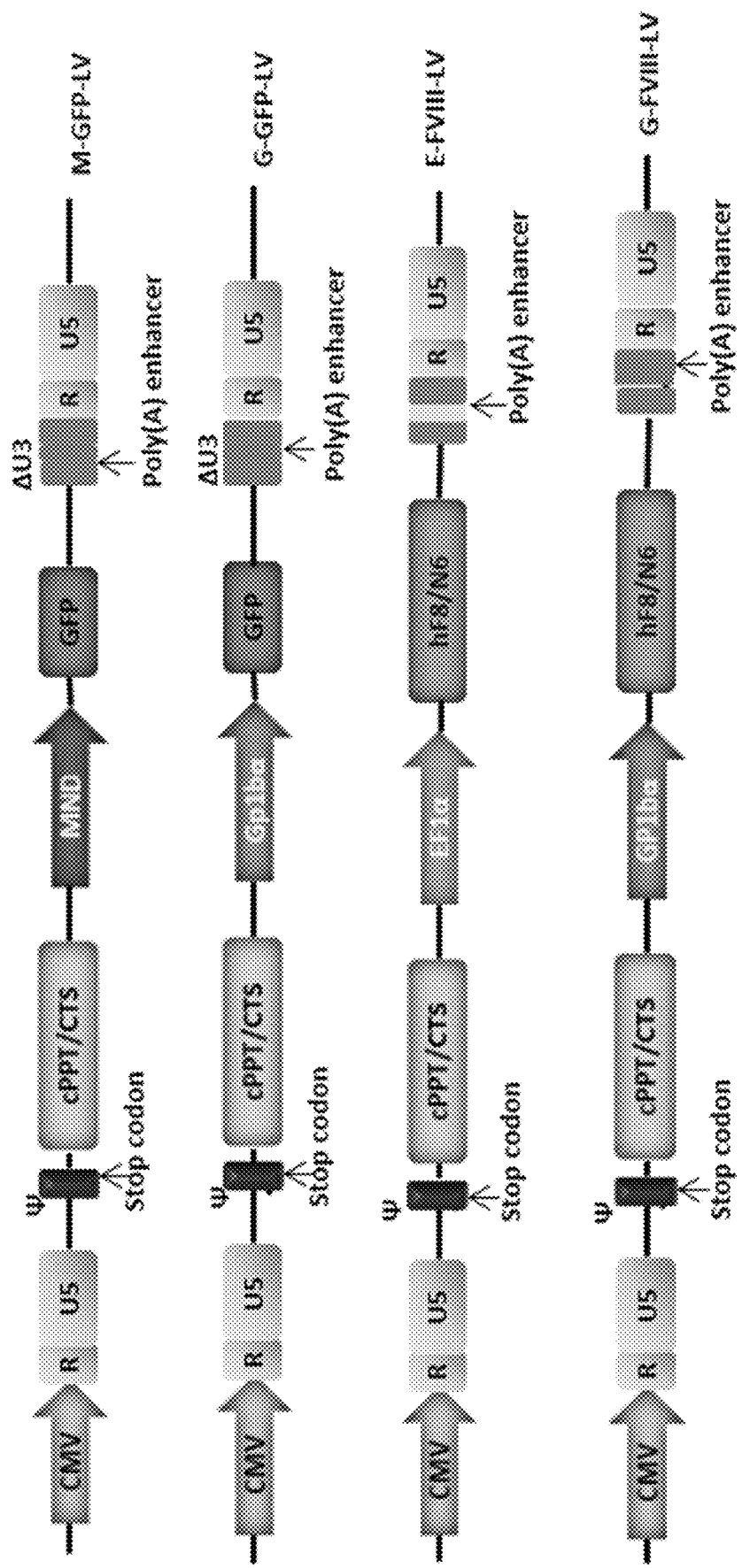
Figure 22B:
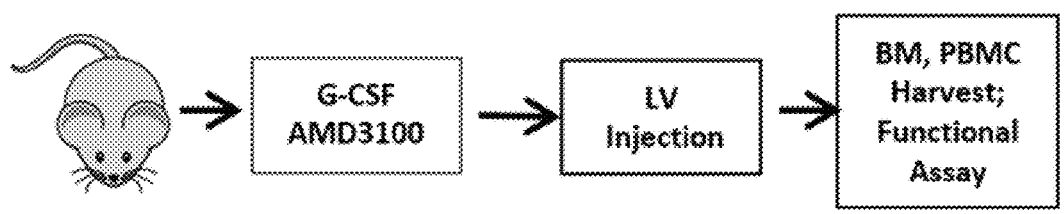
Figure 22C:
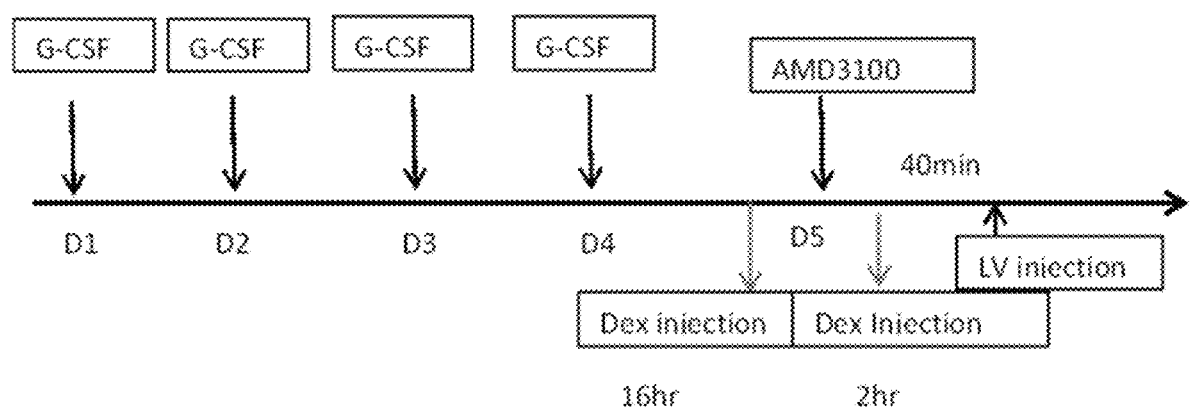
Figure 22D:
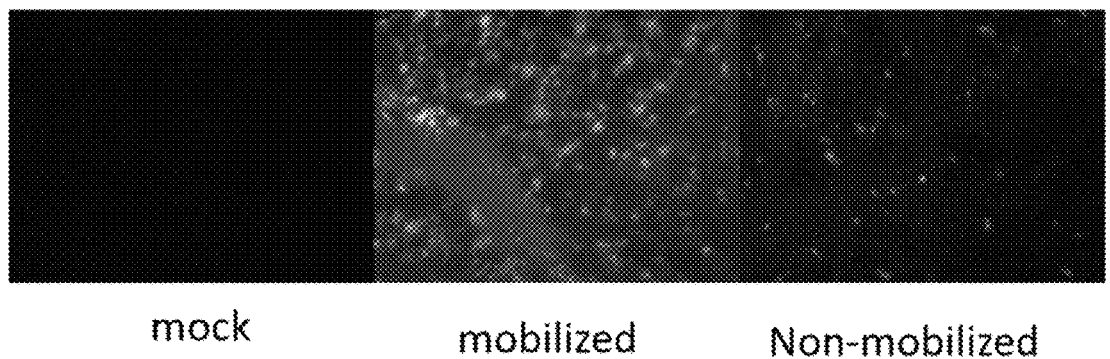

Mice mobilization and in vivo transduction: Male black/6 mice or male HemA mice (6-8 weeks) are subjected to mobilization procedure. C-GSF was subcutaneous injected 50 ng/mouse for 4 days. At the fifth day, AMD3100 was injected in mice (5 mg/kg) via SC. Lentivirus infused at the fifth day after AMD3100 injection 30 minutes. Dexamethasone was dosed to mice intraperitoneally 16 hours and 2 hours before lentivirus injection. See FIGS. 22B and 22C for additional details.

Lentivirus production: Lentiviral vectors (LVs) were produced as described previously (Wang et al., Mol Ther 23(4)617-626, 2015); briefly 12 μg Transgenes (pRRL-SIN-MND-eGFP-WPRE, pRRL-SIN-Gp1bα-eGFP-WPRE, pRRL-SIN-EF-1α-hFVIII/N6-WPRE, and pRRL-SIN-Gp1bα-hFVIII/N6-WPRE), 6 μg viral package plasmid (ps-PAX2), 3 μg of viral envelop plasmid (pMD2-G) were transfected HEK293T cells with 33 μg of polyethyleneimine (linear, MW~40,000, Polysciences, Inc, Warrington, PA). LV-containing supernatants were concentrated ~2000-fold by low-speed (8000 g) centrifugation for 16-18 hr at 4° C. Infectious vector stocks were stored at −80° C. Viral titers were determined by real-time quantitative PCR (qPCR) as described previously (Kerns et al., Blood 115:2146-2155, 2010). Briefly, $2\times10^5$ Nalm-6 pre-B cells were transduced with serial dilutions of concentrated virus. Cells were harvested 7 days later, washed twice with PBS and used for genomic DNA (gDNA) extraction. Viral titers (ifu/ml) were calculated from the transduction rate determined by gDNA qPCR. Average titers were $2.2\times10^9$ ifu/ml, $2.5\times10^9$ ifu/ml, $2.5\times10^9$ ifu/ml, and $1.1\times10^9$ ifu/ml for M-GFP-LV, E-F8-LV, G-GFP-LV, and G-F8-LV, respectively.

Flow cytometers: HSCs or LSKs were stained and gated by lineage−ckit+scal+ in BM cells or PBMCs. Platelets were isolated from PBMCs by centrifuging method. The platelets were separated by isolation buffer Fico/Lite™-Platelets (Atlanta Biologicals) after 90 g/min, 8 min spinning. The isolated platelets were stained by CD42d. B, T, and myeloid cells were stained by surface maker B220, CD3, and CD11 b (eBioscience San Diego, CA). For FVIII expression in platelets, after surface staining, platelets were fixed by fix and perm buffer (BD). Mouse anti-hFVIII monoclonal antibody (ESH8, American Diagnostica, Seabrook, TX) was used for primary antibody, followed by second antibody secondary goat anti-mouse Ig FITC (BDBiosciences). Flow cytometric analysis was conducted using LSRII (BD Bioscience) and the data were analyzed using FlowJo (Ashland, OR).

FVIII activities and FVIII antibody assays in Plasma: hFVIII activities in mouse plasma were analyzed using aPTT, and anti-hFVIII antibodies were measured by hFVIII Bethesda inhibitor assay as previously described (Miao et al., *Blood* 114:4034-4044, 2009; Kasper et al., *Thromb Diath Haemorrh* 34:612, 1975).

Clotting functional assay: Rotation thromboelastometry (ROTEM®) functional clotting assay was employed to characterize the blood clotting function, using a computerized ROTEM® four-channel device (Instrumentation Laboratory, USA). Mice blood was collected via chin bleeding and thoroughly mixed with 10% sodium citrate. ROTEM® assays were performed under Intem program by the mini cup protocol. The blood collected from control and gene therapy groups were subjected to run for one hour to investigate coagulation time (CT), clot formation time (CFT), α-angle, and max clot firmness (MCF) on ROTEM®.

Copy number detection: Genomic DNA was isolated in BM cells by Qiagen DNA mini Kit. One copy Nalm-6 cell gDNA was diluted as a standard. GAG primers and Probe were synthesized by Invitrogen. Forward Sequence: GGAGCTAGAACGATTCGCAGTTA (SEQ ID NO: 5); Reverse Sequence: GGTTGTAGCTGTCCCAGTAT-TTGTC (SEQ ID NO: 6). Probe: ACAGCCTTCT-GATGTTTCTAACAGGCCAGG (SEQ ID NO: 7)

Quantitation of hFVIII mRNA in mouse liver, spleen and lung was performed by qRT-PCR using Power SYBR Green PCR Master Mix (Applied biosystem, Warrington, UK) according to the manufacturer's instructions. Firstly, total RNA was extracted from hydrodynamically (HD) injected (pBS—HCRHPI-FVIIIA48) mouse livers, and IO treated (G-F8-LV) or naive mouse livers, spleens and lungs using TRlzol® Reagent (Life technologies, Grand Island, NY). Then cDNA was generated using cDNA synthesis kit (Invitrogen, Carlsbad, CA). hFVIII specific primers (Forward Sequence: CCAGAGTTCCAAGCCTCCAACA (SEQ ID NO: 8); Reverse Sequence: GGAAGTCAGTCTGTGCTC-CAATG (SEQ ID NO: 9)) for evaluating the FVIII transcripts and Rp119 primers (Forward Sequence: GCATCCT-CATGGAGCACAT (SEQ ID NO: 10); Reverse Sequence: CTGGTCAGCCAGGAGCTT (SEQ ID NO: 11)) for assessing the control housekeeping gene transcripts were used in qRT-PCR experiments. The hFVIII mRNA expression in HD mouse livers was used as the positive control (RQ=1) to calibrate the hFVIII mRNA expression levels in IO treated or naive mouse livers, spleens and lungs.

Results

Figure 17A:
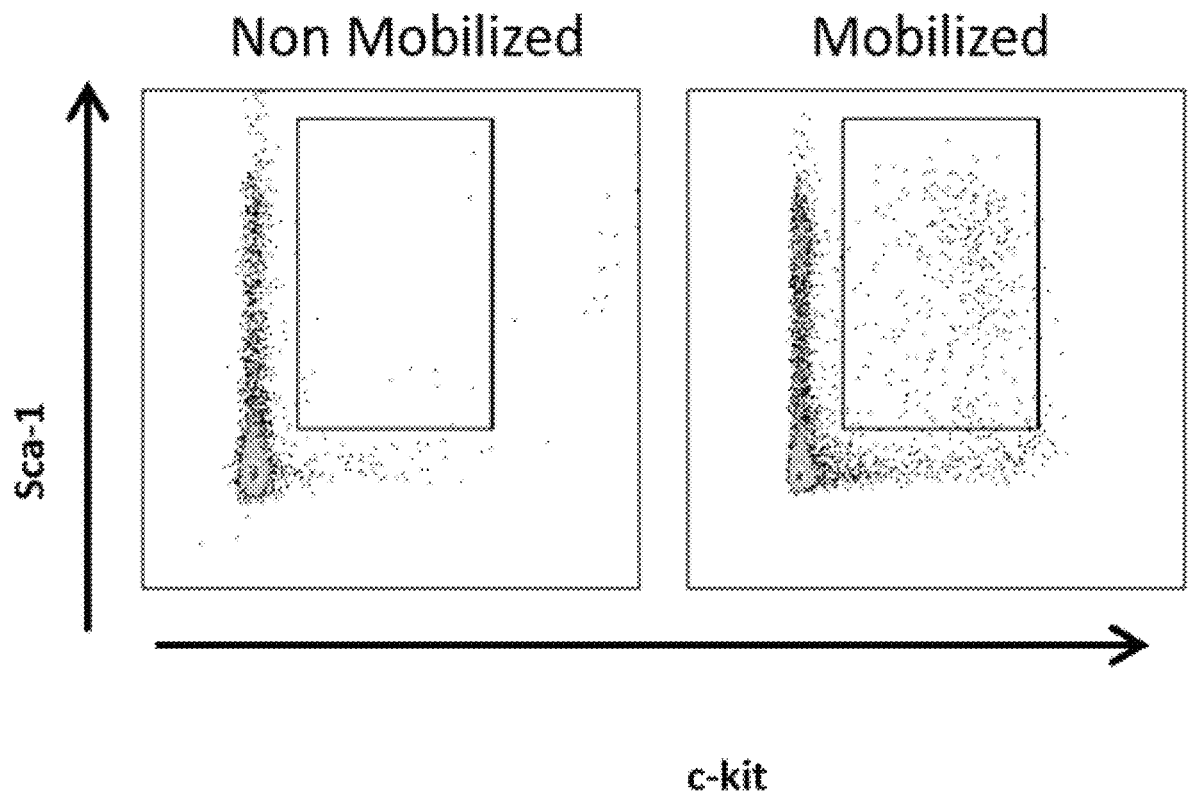
FIGS. 17A-17H. GFP expression in BM cells following IV delivery of MND-GFP-LVs.
Figure 17B:
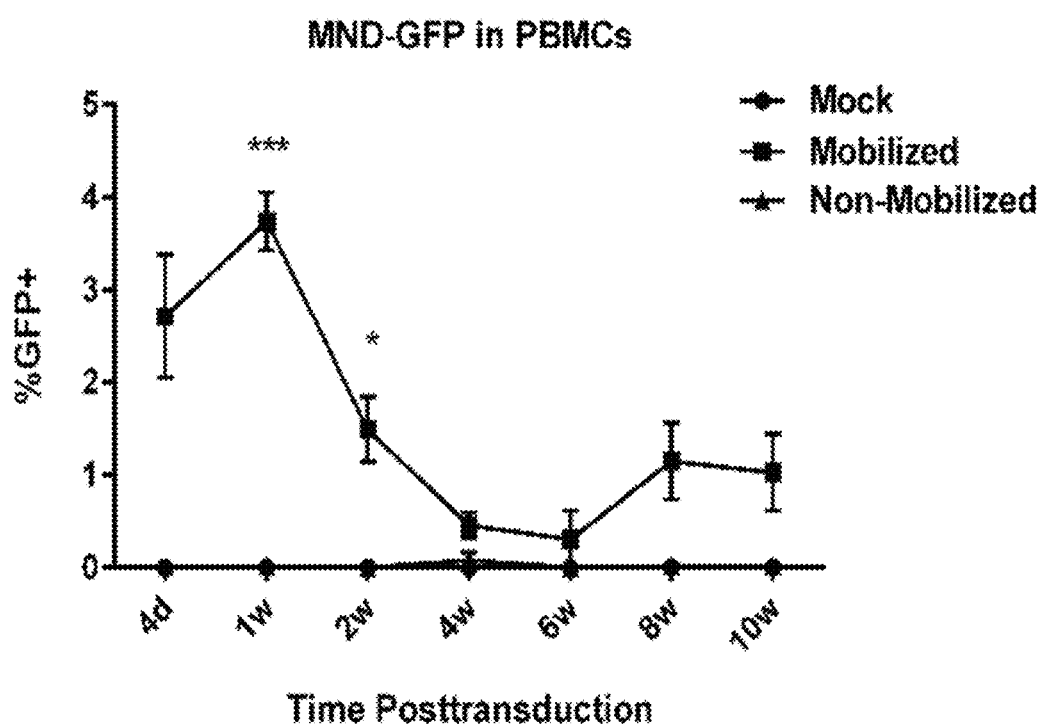
Figure 17C:
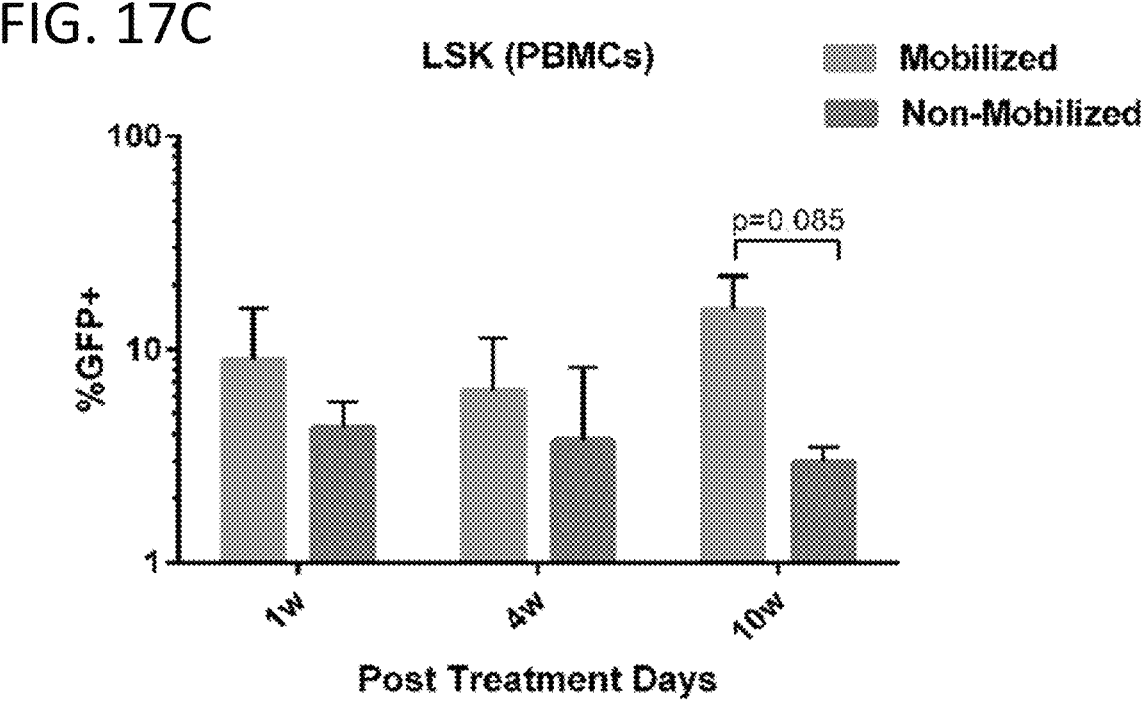
Figure 17D:
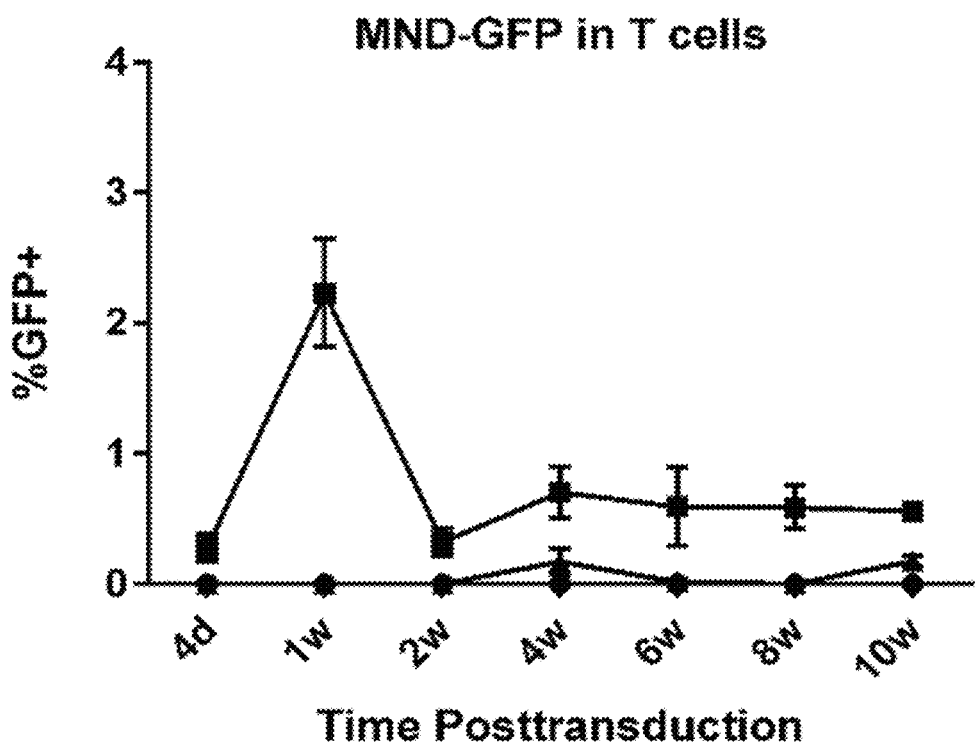
Figure 17E:
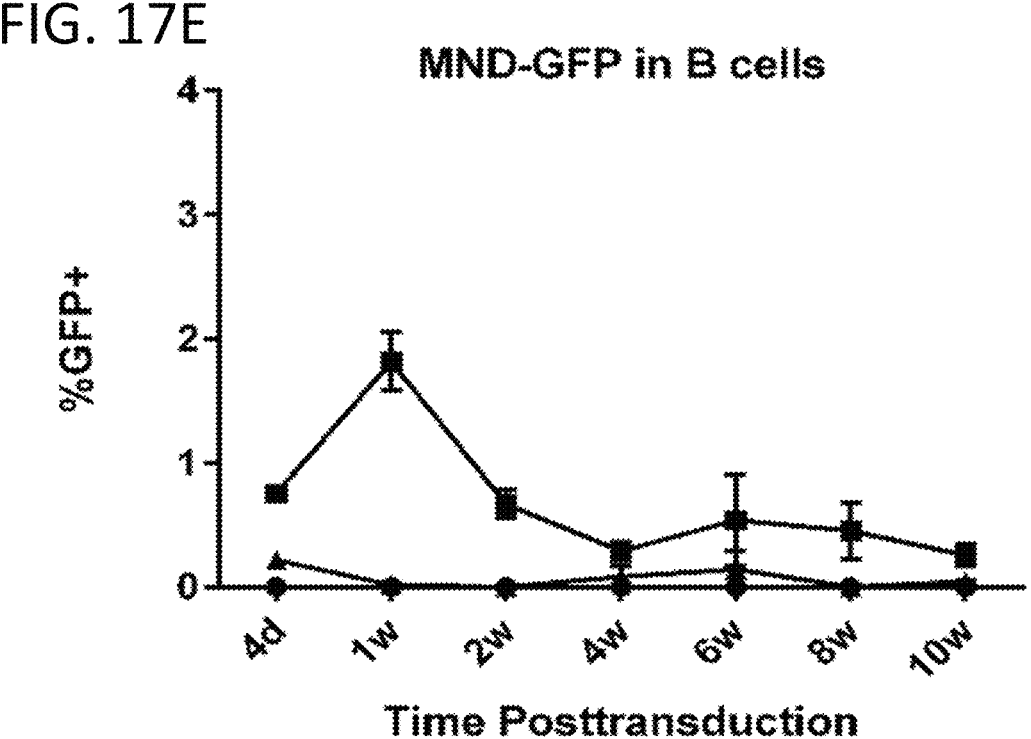
Figure 17F:
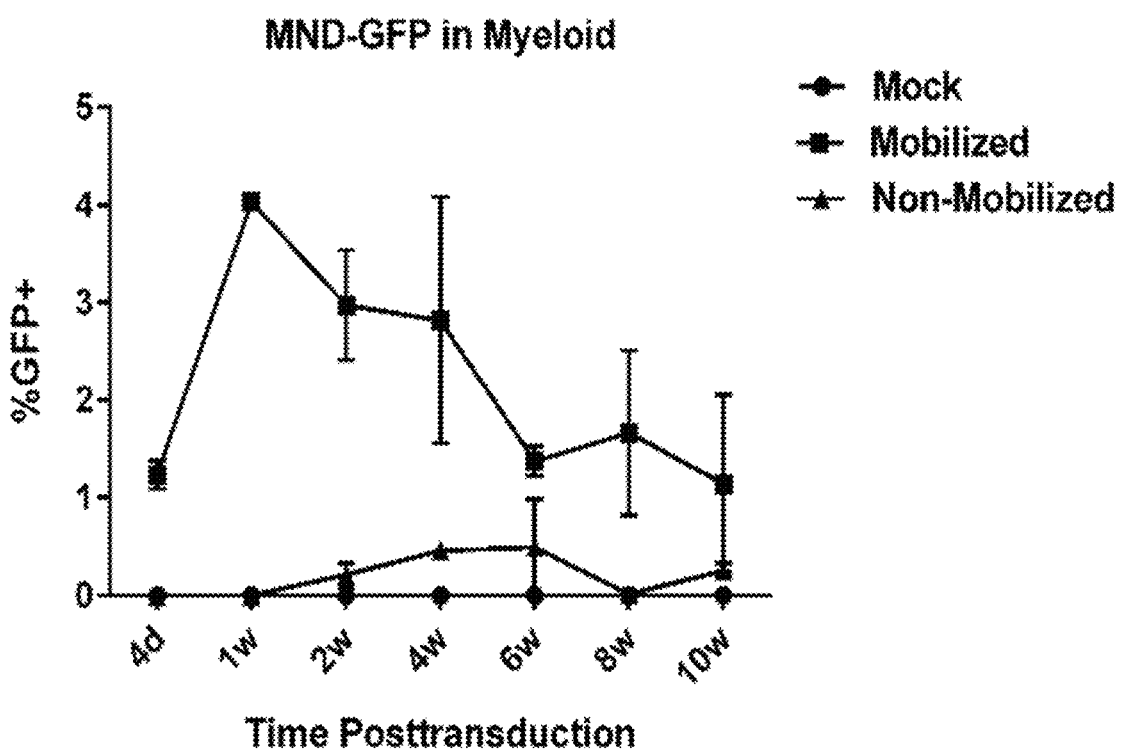

Increases of GFP-Marked Hematopoietic Lineages in Mobilization Mice after LV Transduction LV containing the ubiquitous promoter MND to drive GFP expression in mobilization mice model was used to evaluate the transduction efficiency via IV delivery of lentivirus. The mobilization drugs (G-CSF and AMD3100; see FIG. 22C) were utilized to mobilize HSCs from BM to peripheral blood. The mobilization resulted in more than 100 folds increase of LSK cells entering blood (FIG. 17A). Then, IV delivery MND-GFP-LV was initiated by retro orbital injection. The highest GFP expression in the whole PBMCs is at Day 7 in the mobilization group after administration of MND-GFP-LVs (FIG. 17B). GFP-positive LSK cells in blood can be detected even in the 10th week (FIG. 17C). MND-GFP-LVs also can transduce myeloid cells, T cells and B cells, but a faster decline of GPF was observed in these cell types in the mobilization group (FIGS. 17D-17F).

Figure 17G:
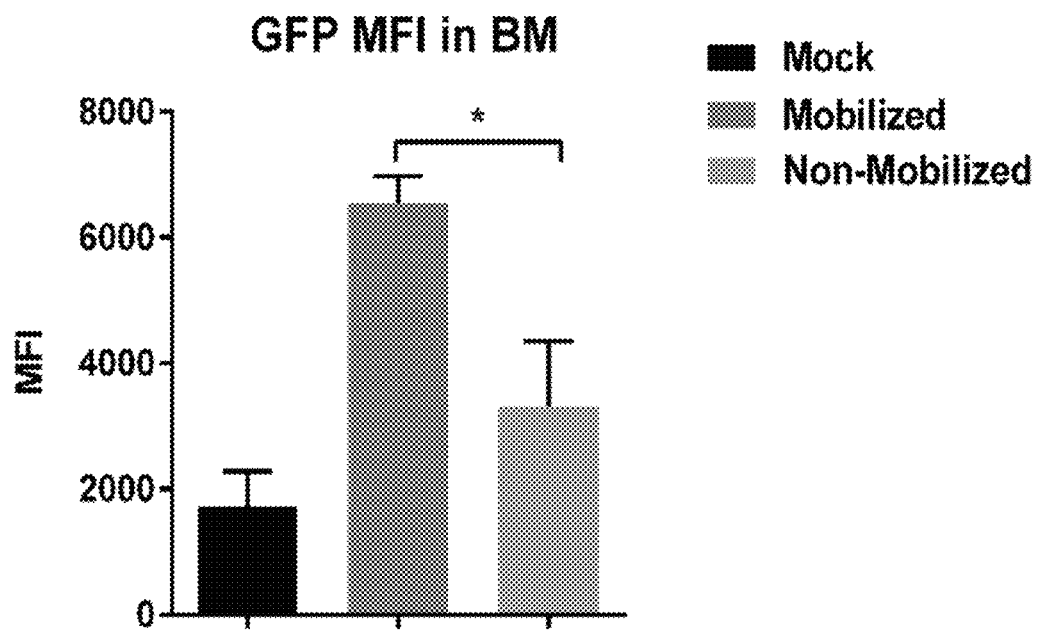

The transduction status in BM was also analyzed after MND-GFP-LVs injection in Mobilization group and non-mobilization group. The GFP MFI (mean fluorescence intensity) of total mononuclear cells in BM displays a significant difference between mobilization group and non-mobilization group 10 weeks post LVs delivery (FIG. 17G).

Figure 17H:
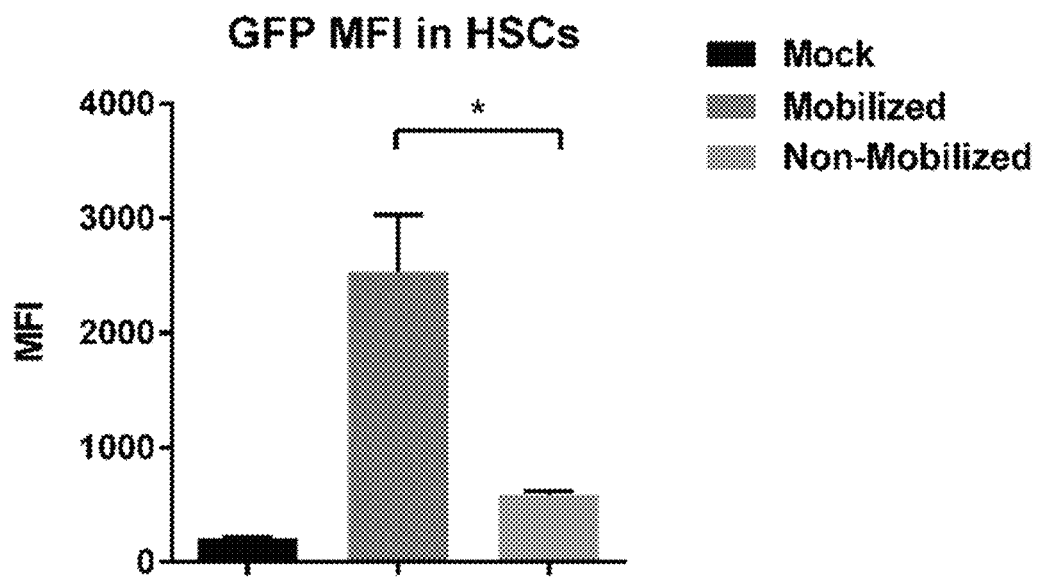

GFP expression in HSCs of BM can be detected in both groups by flow cytometer after 10 weeks. MFI of the GFP+ signal in the mobilization group is 5 times higher than that in the non-mobilization group (FIG. 17H). These results confirmed that IV delivery of LVs can efficiently transduce HSCs mobilized in the peripheral blood, and that the transduced HSCs home back to BM from the circulation.

Figure 18A:
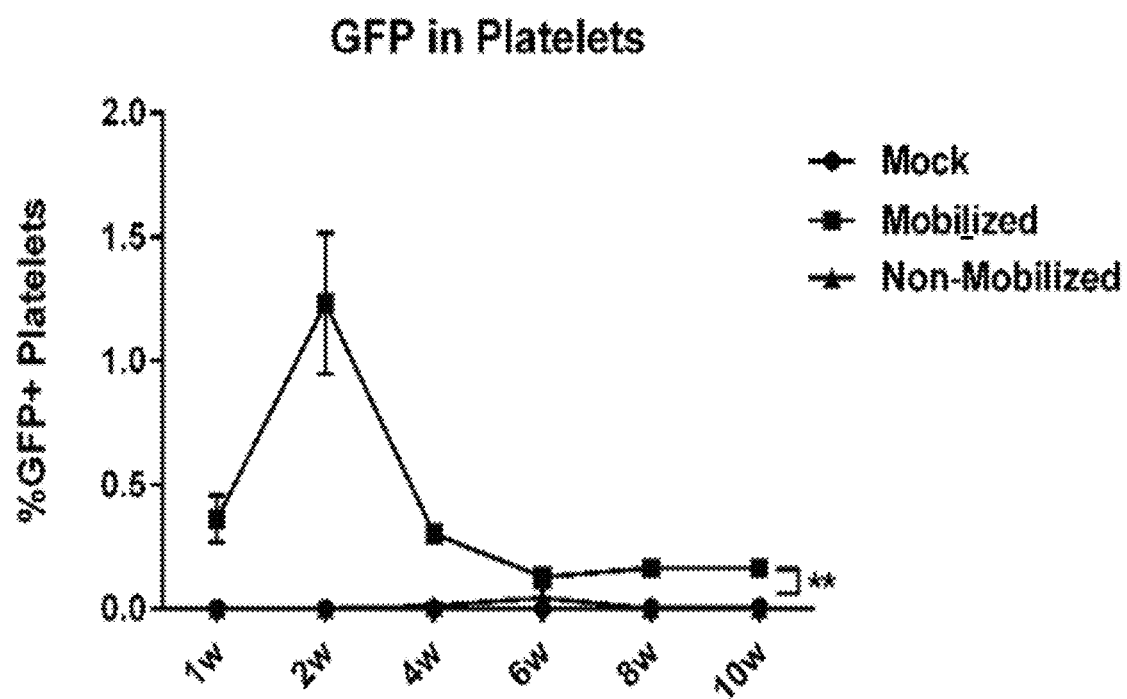

Gp1bα Promoter Drives Sustained GFP Expression in Platelets after G-GFP-LV Injection in Mobilized Mice Model As in this case of LVs transducing HSCs successfully by systemic delivery under the condition of mobilization. Gp1bα promoter would drive GFP expression in megakaryocytes and storage Platelets. To evaluate the possibility, G-GFP-LVs was injected in mobilization and non-mobilization group via IV. The peak of GFP expression in platelets was at the 2nd week after G-GFP-LVs injection. Sustained GFP expression in platelets was observed in about 0.2% platelets in mobilization group at 10 weeks (FIG. 18A). Meanwhile, GFP expression was not detectable in non-mobilization group after LVs delivery. G-GFP cannot be detected in T, B and Myeloid Cells, which demonstrated that Gp1bα promoter expressed only in megakaryocytes. These results indicated that transduction efficiency of G-GFP-LVs is significantly enhanced in HSCs after mobilization to allow increased GFP expression in platelets. FIG. 18B is the representative flow data; FIG. 12A is the summary of the results.

Figure 19A:
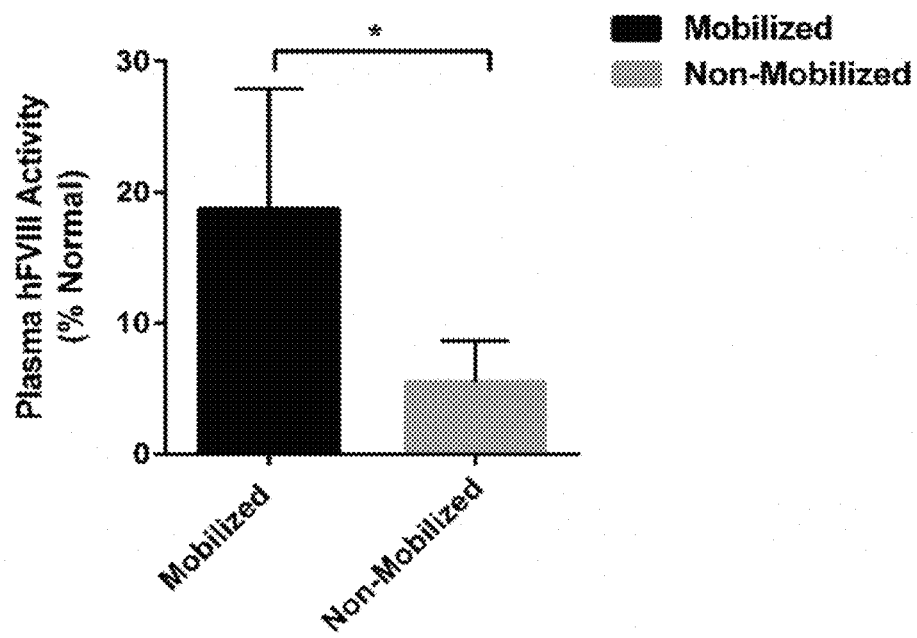
FIGS. 19A-19B. Circulatory FVIII in plasma of HemA mice post mobilization treatment and E-FVIII-LV delivery via IV injection.
Figure 19B:
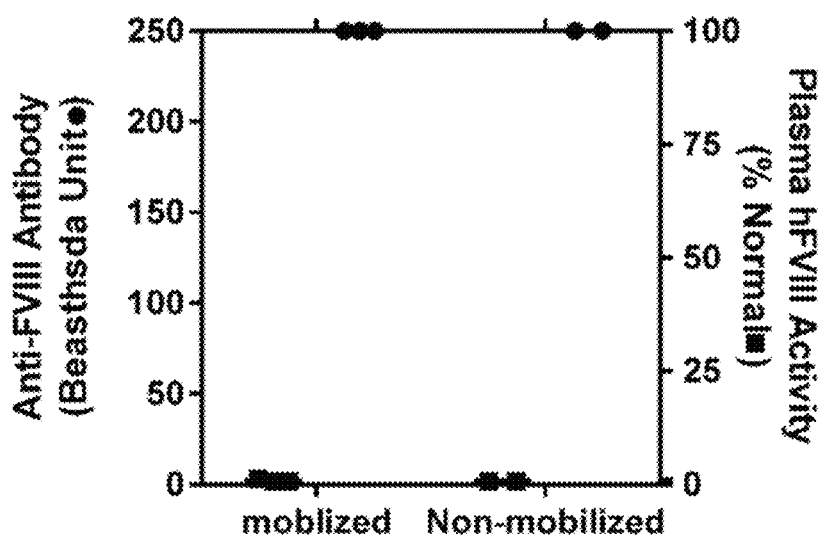

Ubiquitous Expression of E-F8-LV Vectors Via IV Injection Induce Formation of FVIII Antibodies In Vivo To demonstrate the therapeutic benefits of this novel strategy of LVs infusion, we treated HemA mice by IV injection of the EF-hFVIII-LVs. In both mobilization group and non-mobilization group, the circulatory FVIII activity in plasma was detected by APTT assay after 2 weeks E-FVIII-LVs treatment (FIG. 19A). We observed a decrease of FVIII expression to undetectable levels 6 weeks after LVs infusion, which correlated with the appearance of anti-FVIII inhibitory antibodies (FIG. 19B). Thus, it appears that FVIII expression driven by ubiquitous promoters tends to induce formation of FVIII antibodies.

FVIII Protein can be Stored in Platelets after G-FVIII-LV Transduction In Vivo

Figure 20B:
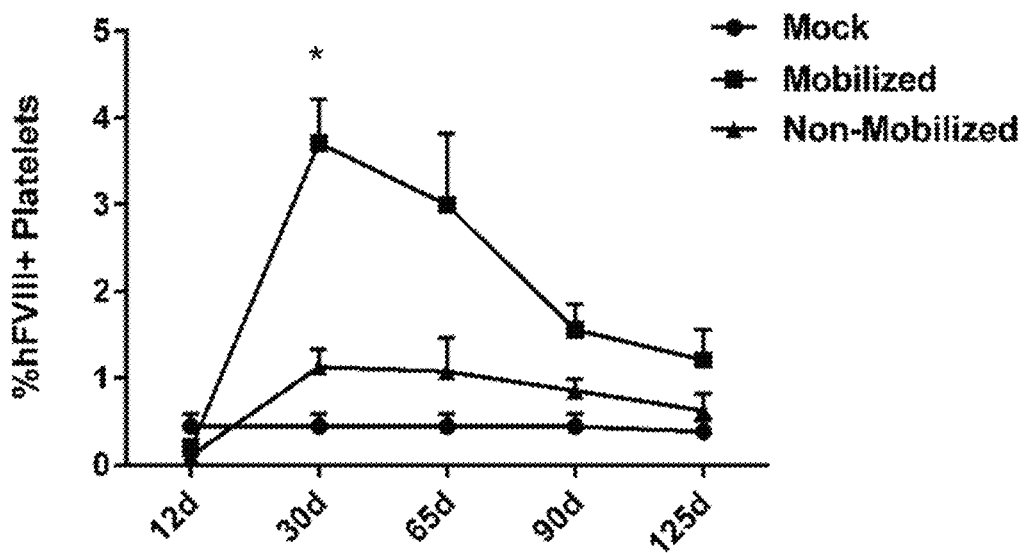
Figure 20C:
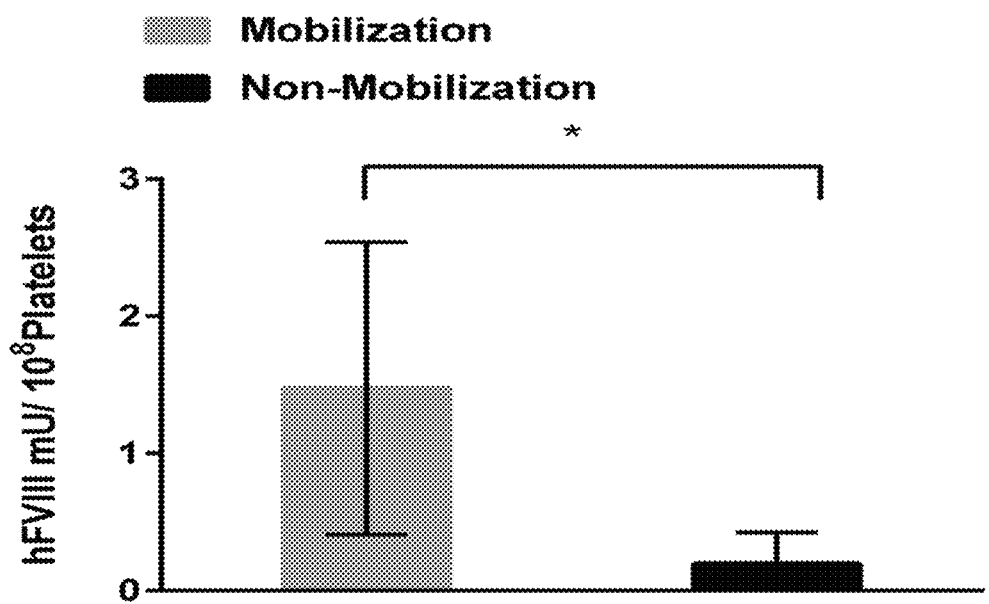
Figure 20D:
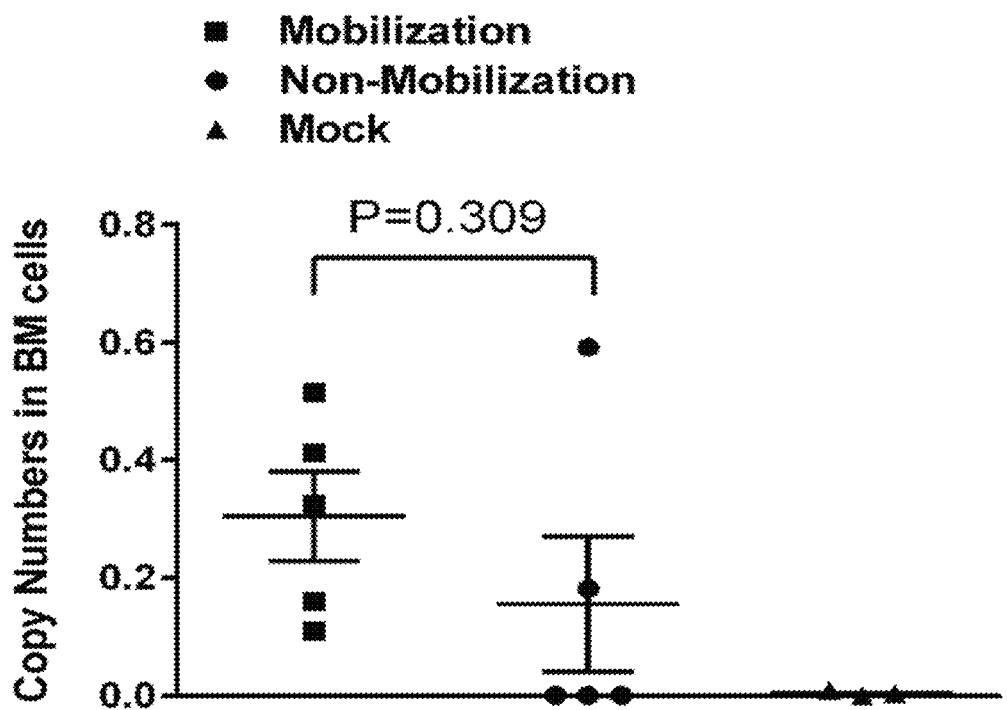
Figure 20E:
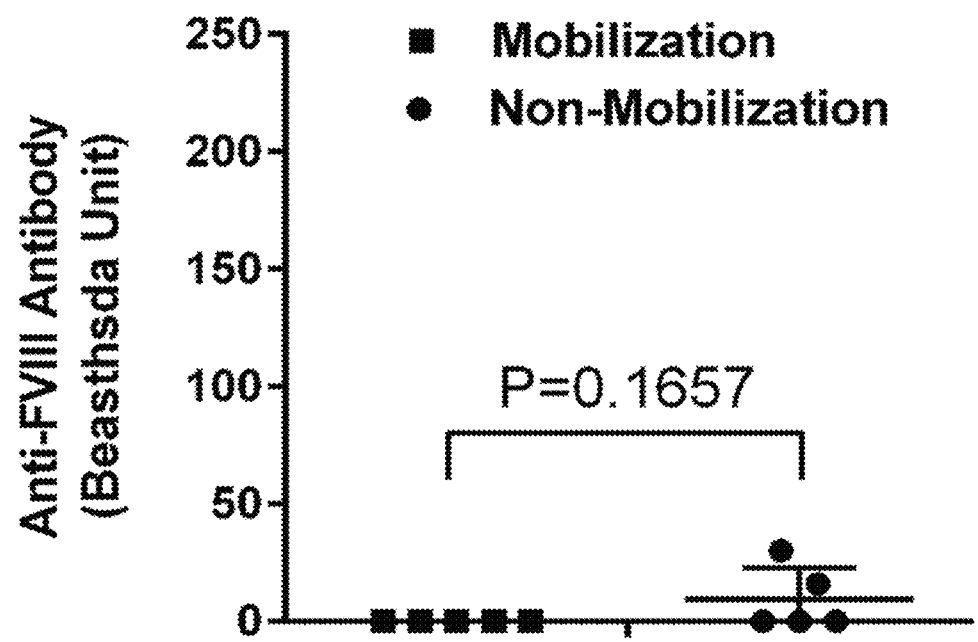
Figure 21A:
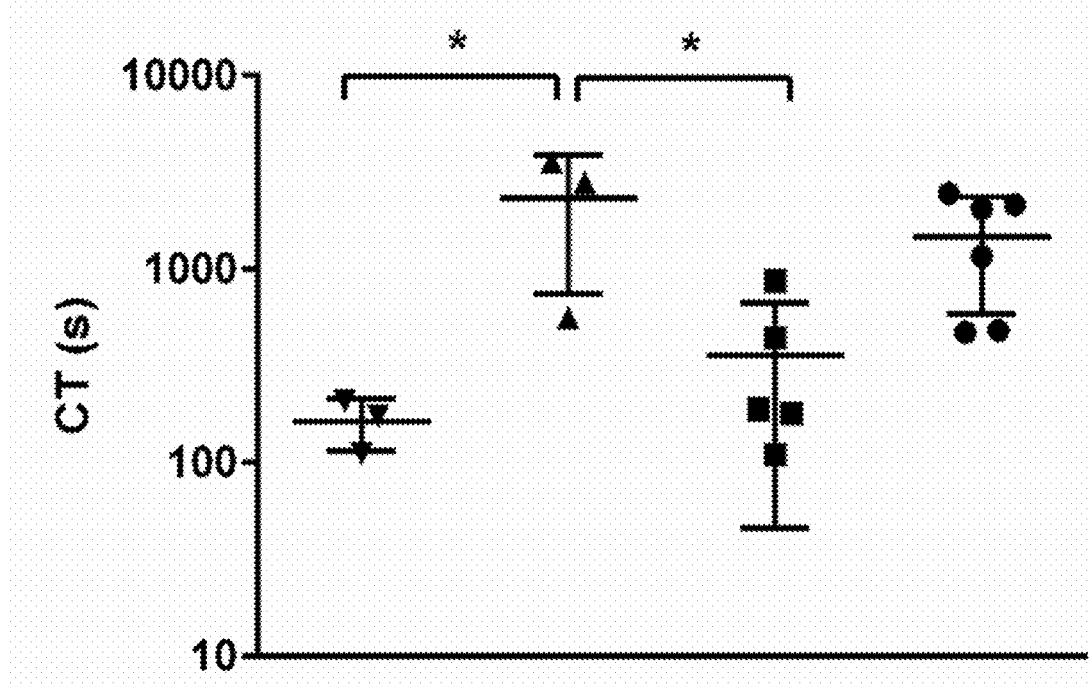
Figure 21B:
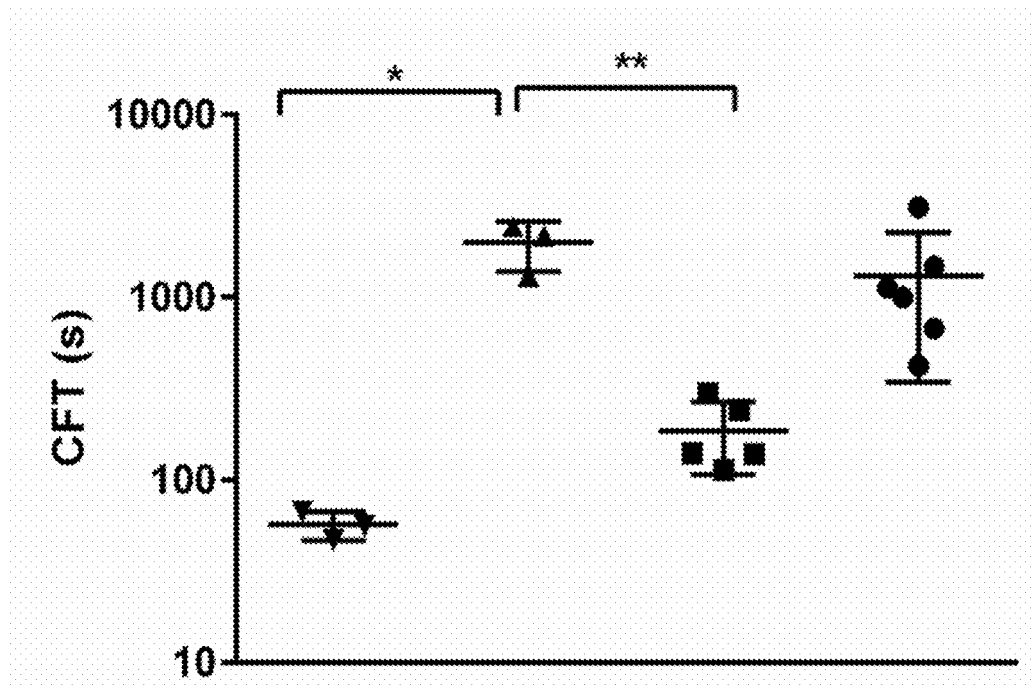
Figure 21C:
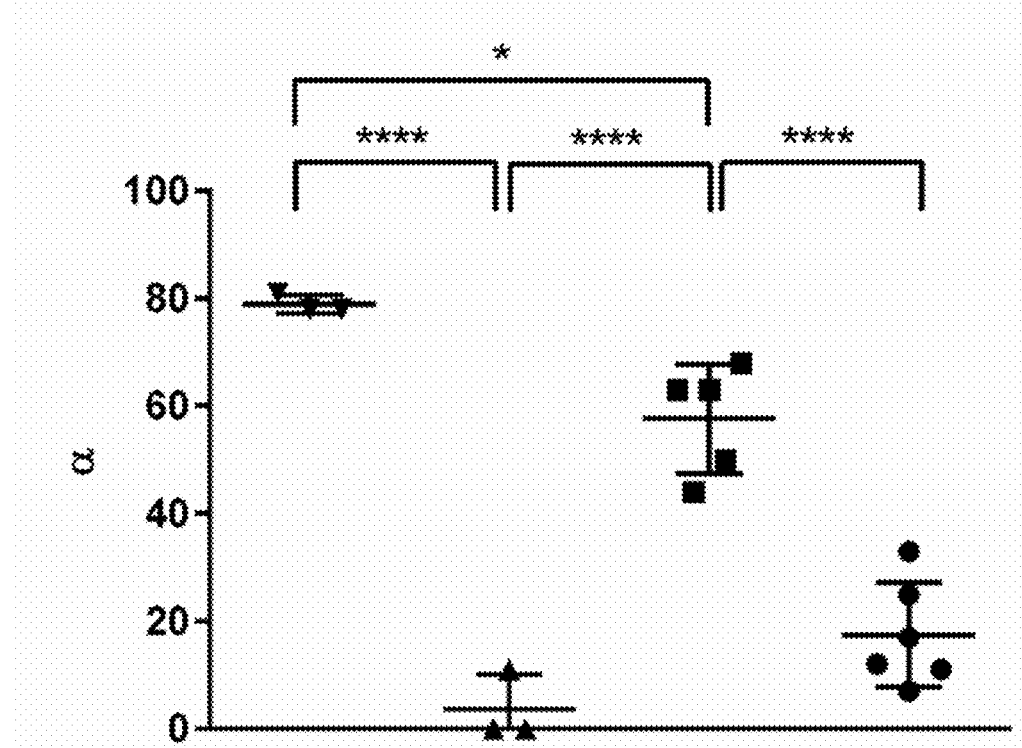
Figure 21D:
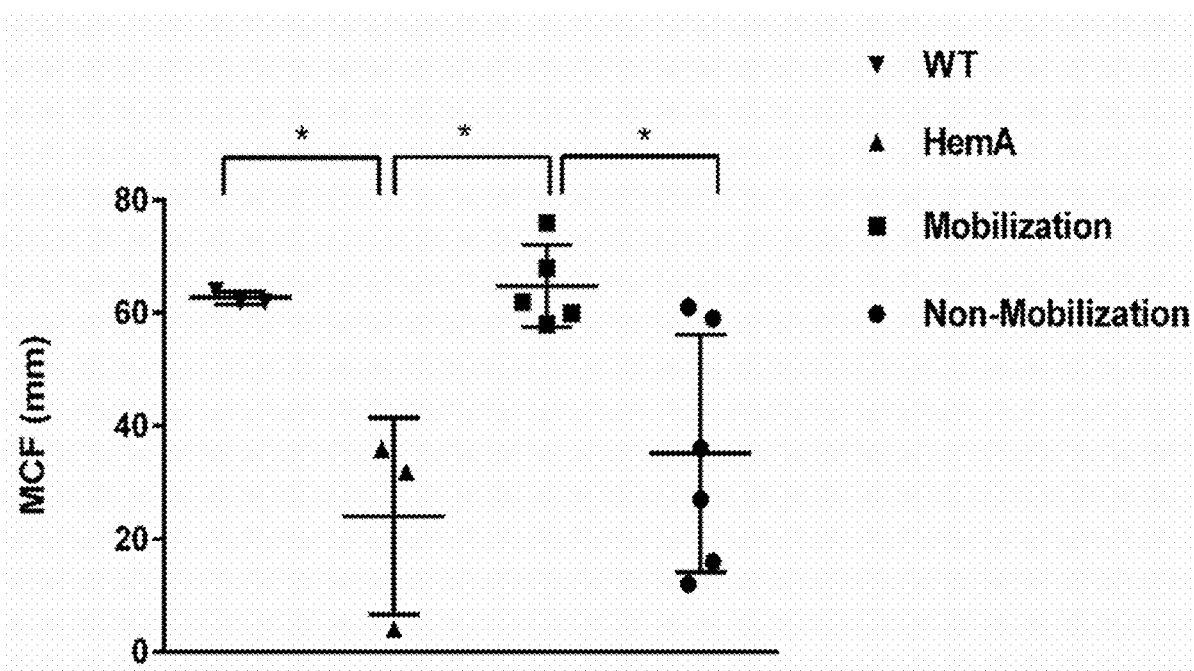

The approach of G-FVIII-LVs treating HemA emerged since the G promoter can drive GFP expression and stocked in platelets. Delivery of G-FVIII-LVs for the expression of FVIII in platelets specifically has the potential to escape immune response against FVIII. To test this possibility, G-FVIII-LVs was delivered via IV; there were 1.5-4% platelets containing FVIII in the mobilization group for 3 months experimental period (FIGS. 20A-20B). By ELISA assay detection, FVIII expression was about 1.5 mU/$10^8$ platelets (FIG. 20C). The copy number in BM is 0.3 copy/cell by q-PCR detection (FIG. 20D). No mouse in the mobilization group injected with G-FVIII-LVs displayed FVIII inhibitor in plasma.

Targeted FVIII Expression in Platelets Partially Corrects Hemophilia Phenotype.

To determine if expression of FVIII in platelets could functionally compensate Hemophilia, the ROTEM® (rotational thermoelectrometry) assay was employed; this is a clotting assay to evaluate the blood clotting function by detecting the clotting time (CT), clot formation time (CFT), max clotting firmness (MCF) and a angle. The mice transduced by G-FVIII-LVs were subjected to ROTEM® assay after 6 months gene therapy. ROTEM® results confirmed a faster clotting time, shorter clotting formation time, and bigger a angle in the mobilization group compared with those in HemA mice. There were significant differences between mobilization and non-mobilization groups on a angle and MCF parameters. In the non-mobilization group, the blood clotting function did not show significant improvements, when compared with that in HemA mice (FIGS. 21A-21D).

DISCUSSION

To obtain long-term FVIII expression after single treatment, several groups have explored different approaches of gene therapy techniques. At least four gene therapy methods are in clinical trials. BMN270 and Spark 8011 are in clinical trial phase II/III; these are gene therapy-based methods using AAV vector to delivery FVIII, with HLP promoter specifically driving expression in liver for restoring FVIII in plasma (Pasi et al., *Haemophilia* 22:151-152, 2016). After the treatment, FVIII are expressed in liver and secreted into blood, where it may trigger immune responses to generate anti-FVIII inhibitory antibody. Additionally, there is also a risk of the AVV being cleaned by natural inhibitor in the human body (Ertl et al., *Human Gene Therapy* 28:328-337, 2017; Doering et al., *Molecular Therapy: J Amer Soc Gene Therapy* 15:1093-1099, 2007). Gene therapy ex vivo studies also have some drawbacks, even a long-term FVIII expression and correction hemophilia phenotype were observed after implantation of transduced HSCs back to recipient animal model. Thus there is an ongoing need for the herein-described intravenous delivery of lenti-vectors in HSCs mobilization mice model, which can avoid development of inhibitors, or HSCs culture in vitro.

LVs delivery via intravenous injection was performed before. In 2006, Carbonaro and his coworkers used LV vectors via intravenous injection in mouse neonatal ADA knockout mice, and detected copy number of integrated vectors in liver and lung (Carbonaro et al., *Mol Ther* 13(6):1110-1120, 2006). In adult mice, IV injection was performed with detection of low copy number in BM. From those studies we learned that Lentivirus delivery via IV rendered less efficiency transduction in the HSCs of BM.

The reason is that Lentivectors were eliminated by macrophages or Kupffer cells in the peripheral blood (Brown et al., *Blood* 109(7)2797-2805, 2007), there were less chance that vectors would migrate into bone marrow to transduce HSCs. Mobilization of HSCs combining with IVs injection is a good strategy, which promote efficiency of HSCs transduction, as the location of transduction was changed from BM to peripheral blood. Those HSCs transduced by LVs carrying FVIII would go back to BM and stay in the niche of BM for further regeneration and differentiation.

Indeed, this approach increased the efficiency of LV transduction significantly. Data herein showed that MFI is 5-fold higher in mobilization group than that in the non-mobilization group after LV injection. However, when the ubiquitous promoter was used to drive the FVIII expression secreting in plasma, either mobilization or non-mobilization group displayed higher titer of FVIII inhibitor.

FVIII driven by GP1b promoter is advantageous because it is expressed in the megakaryocytes cells, and storage of the FVIII in platelets prevents it from exposure to immunity system. When a bleeding event occurs, platelets will be activated to release the FVIII and therefore join the coagulation pathway.

To demonstrate that G-FVIII-LVs also can achieve long term therapy in HemA mice, the efficacy study was tracked up to 6 months in mouse models. The blood clotting functional data demonstrated that HemA phenotype was corrected partially for a long period. Low titer of FVIII inhibitor was observed in the non-mobilization group, although there was no significate difference compared with that mobilization group. In vitro experiment demonstrated that GP1 b promoter can work in myeloid cell.

This study explored a novel strategy for gene therapy of HemA via delivery of FVIII-LVs specifically transduced HSCs by intravenous injection. This is a novel approach and offers several advantages over prior strategies, including: The IV delivery is straight forward and convenient. It does not need complicated ex vivo transplantation or cell culture in vitro. In addition, it achieves long-term efficacy by targeting HSCs. FVIII are stored in platelets, there are less chance to induce neutralization of FVIII by antibodies.

Example 7: A Novel Strategy of Lung-Specific Gene Therapy for the Treatment of Hemophilia a Via Intranasal Delivery of Lentiviral Vectors Encoding Factor VIII Recently, emerging evidence showed that lung is a reservoir for haematopoietic progenitors/stem cells (HSCs) in addition to bone marrow (Lefrancias et al., *Nature* 544 (7648):105-109, 2017). The new study reported that platelets can be produced from megakaryocytes located in the extravascular space inside the lung. Furthermore, data in the above Examples demonstrated that external factor VIII (FVIII) gene driven by the specific promoter GP1bα (G) could express FVIII protein in megakaryocytes for long-term by transducing HSCs in mice. FVIII protein stored in platelets can be released to facilitate clotting upon platelets activation. Thus, intranasal (IN) delivery of lentiviral vectors (LVs) targeting FVIII gene expression in megakaryocytes in the lung have the potential to correct HemA mice phenotype.

G-GFP-LVs were used to test if IN delivery can produce GFP expression in murine platelets. IN delivery of 24 µl G-GFP-LVs produced up to 0.075% positive GFP expression in platelets after 7 days. Although the efficiency was low, GFP expression could be detected by flow cytometer. There was a significant difference compared with the untreated control group.

To improve the transduction efficiency, higher titers/volume of LVs were used in mice pretreated with N-Acetyl Cysteine and Dexamethasone. After IN delivery of increased dosages of G-FVIII-LVs into HemA mice under the optimized protocol: Mice were treated with 130 mg/kg N-acetyl cysteine (NAC) via intravenous injection for 2 days and 10 mg/kg Dexamethasone via intraperitoneal injection 16 hrs before and 2 hrs after IN. Mice were administered with 40 µl G-FVIII-LVs ($1\times10^9$ IFU/ml)/mouse via IN, then mice slept for 5 mins under isoflurane. FVIII expression in platelets was examined by intracellular staining and FVIII ELISA at day 7 post treatment. There were 0.23% FVIII positive platelets in circulating platelets and FVIII expression can be detected up to 0.3 $mU/10^8$ platelets.

Functional clotting formation was also tested by ROTEM®. The clotting parameters obtained from IN gene therapy mice were comparable to those of wild type mice, including Clotting Time (CT), Clotting Formation Time (CFT), a angle, and Max of Clotting formation (MCF). Moreover, significant difference in the CT values was observed between HemA mice group and IN gene therapy group (2641±1437(s) vs 587±354(s); p=0.032) after 7 days treatment. These data indicated successful transduction of megakaryocytes in the lung following IN delivery, leading to therapeutic correction of HemA.

Furthermore, FVIII positive platelets staining persisted at 0.23% from day 7 to day 30 post treatment. The clotting parameters tested by ROTEM® after day 30 treatment were not significantly different compared with the data after day 7 treatment, indicating potential transduction of hematopoietic stems cells by LVs. In addition, formation of anti-FVIII inhibitors was not detected by Bethesda assay.

These data showed that FVIII expressing platelets were successfully produced and were able to partially correct HemA phenotype in mice via IN delivery of G-FVIII-LVs into the lung. A benefit of FVIII expression and storage in platelet α-granules is to protect FVIII from neutralizing antibodies and to decrease the possibility of inducing inhibitory antibodies. IN delivery of LVs encoding FVIII gene targeting lung is a promising option for therapeutic treatment of hemophilia patients.

Example 8: A Novel Strategy of Lung-Specific Gene Therapy for the Treatment of Hemophilia a Via Intranasal Delivery of Lentiviral Vectors Encoding Factor VIII In this example, an embodiment of the herein described treatment method is demonstrated, using intranasal delivery of LVs to treat hemophilia A mice.

Hemophilia A (HemA) disease is a deficiency of functional plasma factor VIII (FVIII). Recently, emerging evidence showed that lung is a reservoir for haematopoietic progenitors/stem cells (HSCs) in addition to bone marrow. The new study reported that platelets can be produced from megakaryocytes located in the extravascular space inside the lung.

We utilized lentiviral vectors (LVs) driven by a Gp1bα promoter to transduce lung via intranasal delivery (IN) to generate platelet-specific FVIII gene expression for the treatment of Hemophilia A.

Figure 23A:
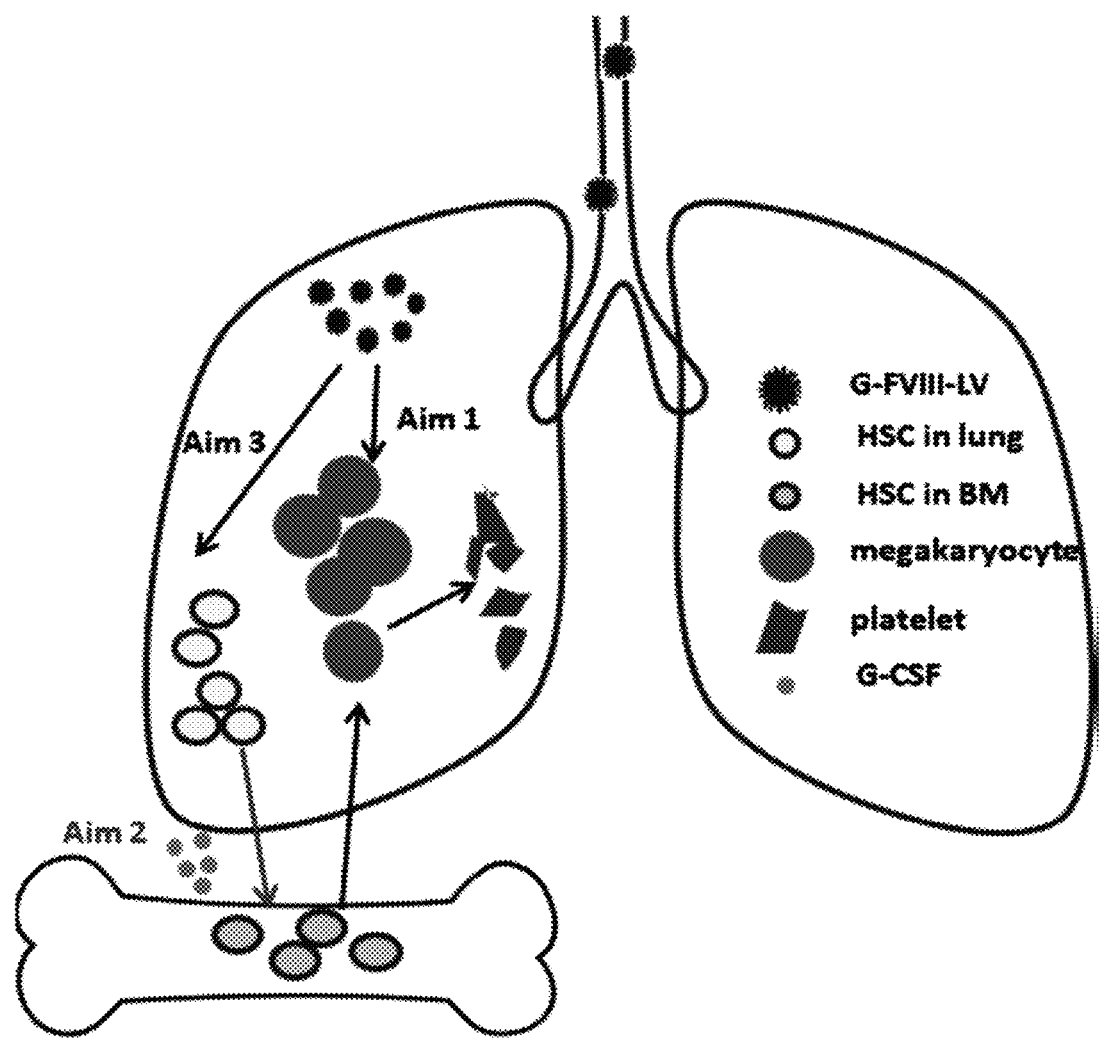
FIGS. 23A, 23B.
Figure 23B:
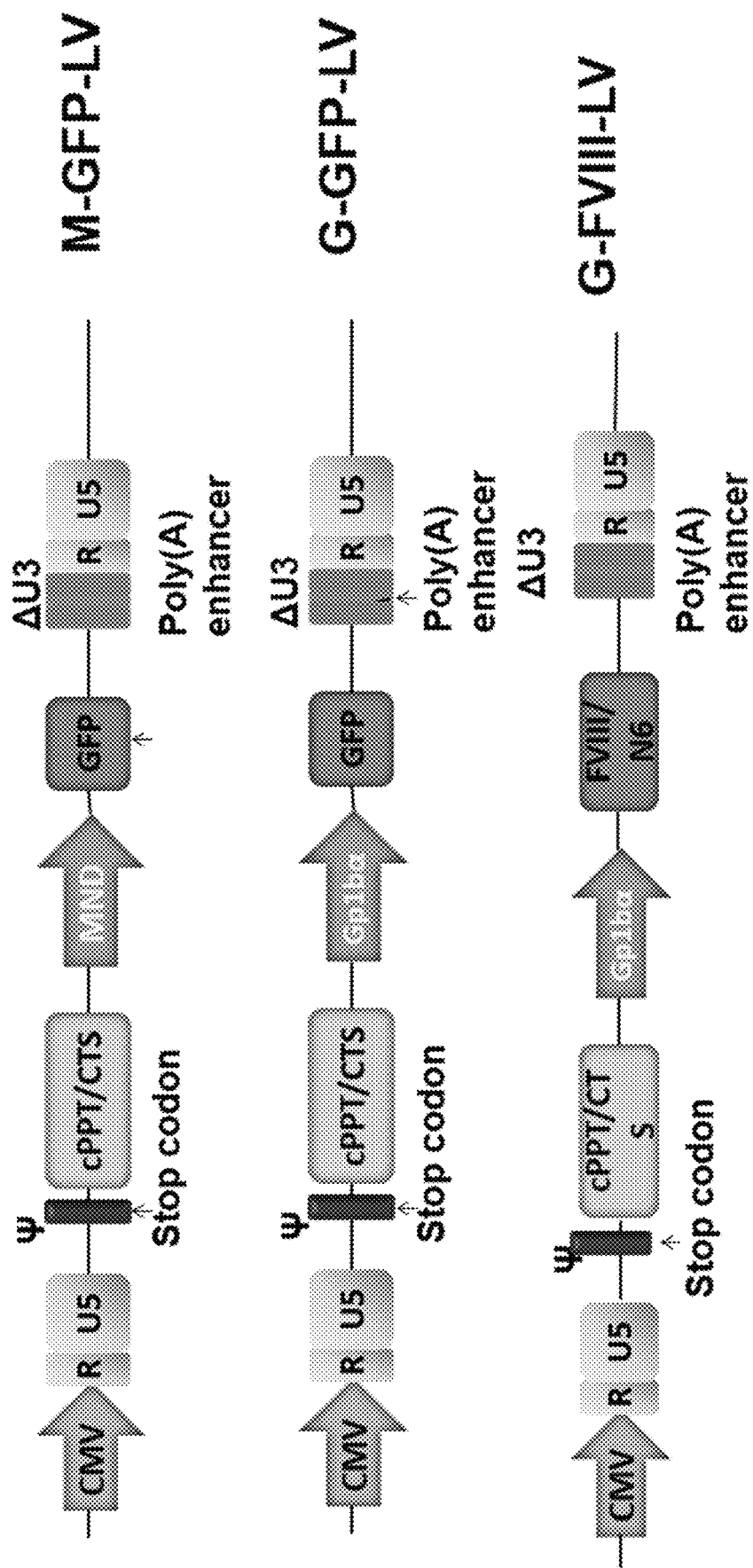

The vectors used in this study are provided in FIGS. 23A, 23B. LVs were transduced via intranasal delivery, then lung, bone marrow, and platelets were harvested and analyzed for gene expression.

Figure 24A:
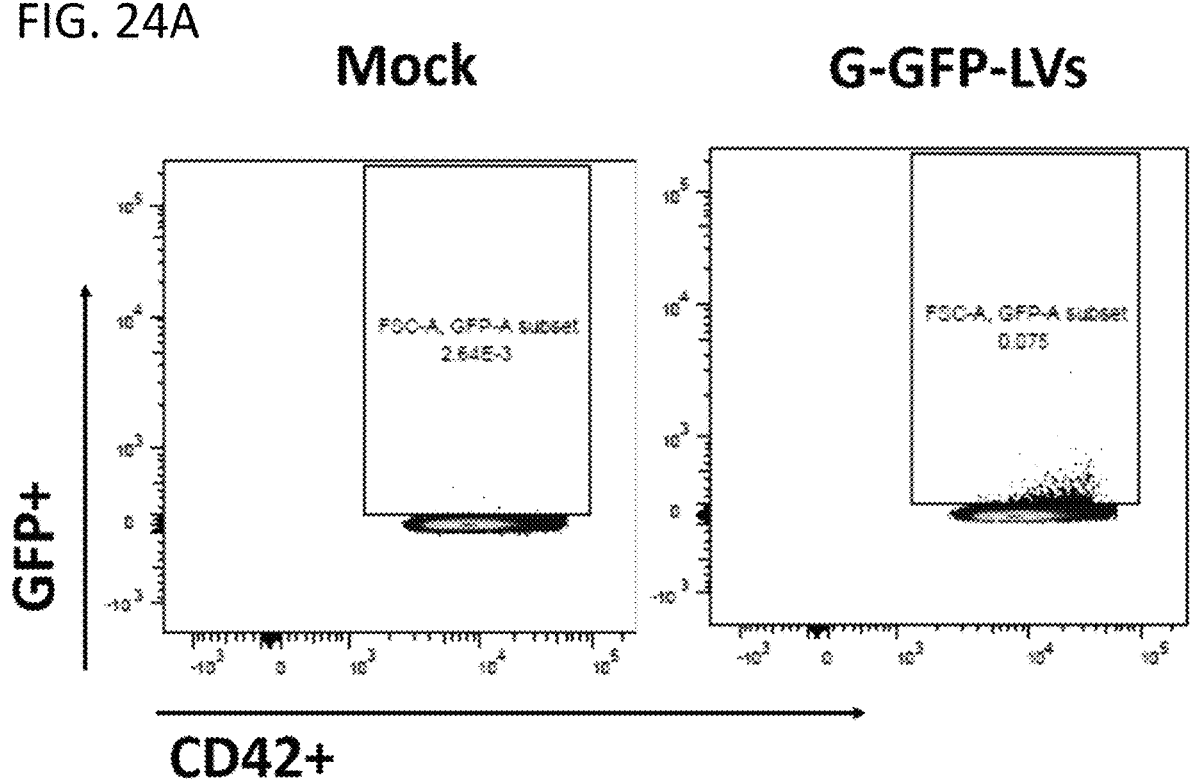
FIGS. 24A, 24B G-GFP expression in platelets by G-GFP-LVs transduction via intranasal delivery is illustrated in. Mice were administrated with 24 μl G-FVIII-LVs (1×10$^9$ IFU/ml)/mouse/day via IN for 3 days.
Figure 24B:
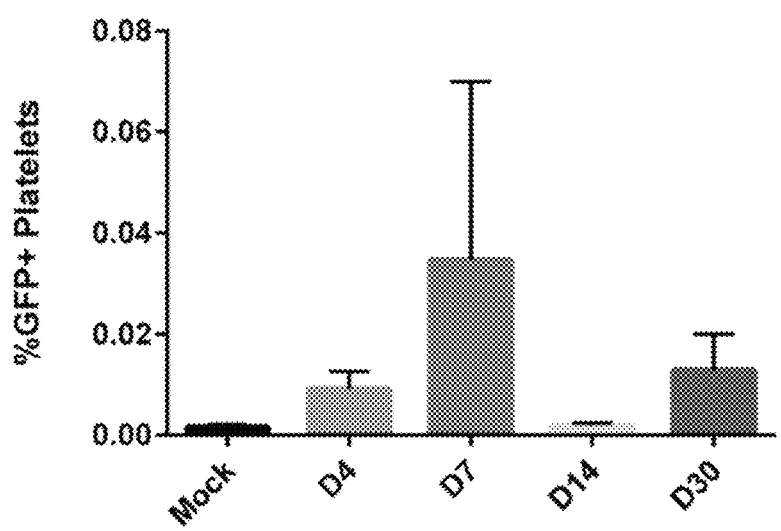

Results:

G-GFP expression in platelets by G-GFP-LVs transduction via intranasal delivery is illustrated in FIG. 24A, 24B. Mice were administered with 24 µl G-FVIII-LVs ($1\times10^9$ IFU/ml)/mouse/day via IN for 3 days. (FIG. 24A) The flow cytometry schematic of GFP+ platelets. (FIG. 24B) GFP expression in platelets was measured by flow cytometer after lentivirus treatment (N=4).

Figure 25A:
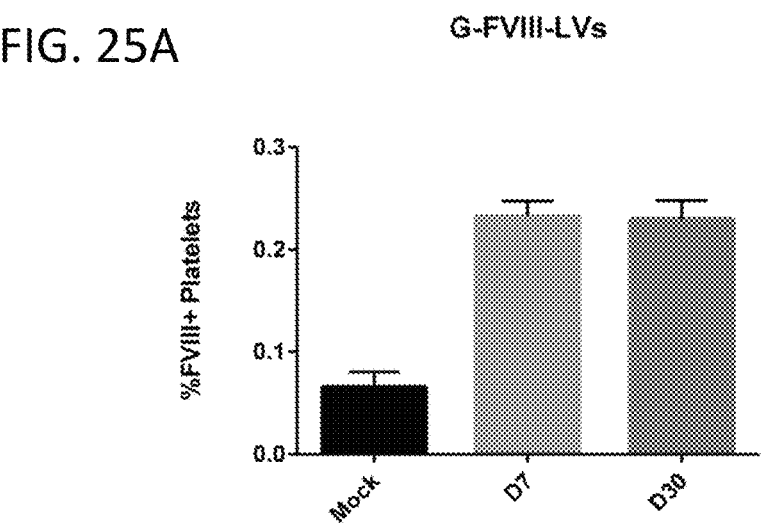
FIGS. 25A-25C Expression of FVIII in platelets by G-FVIII-LV via intranasal delivery.
Figure 25B:
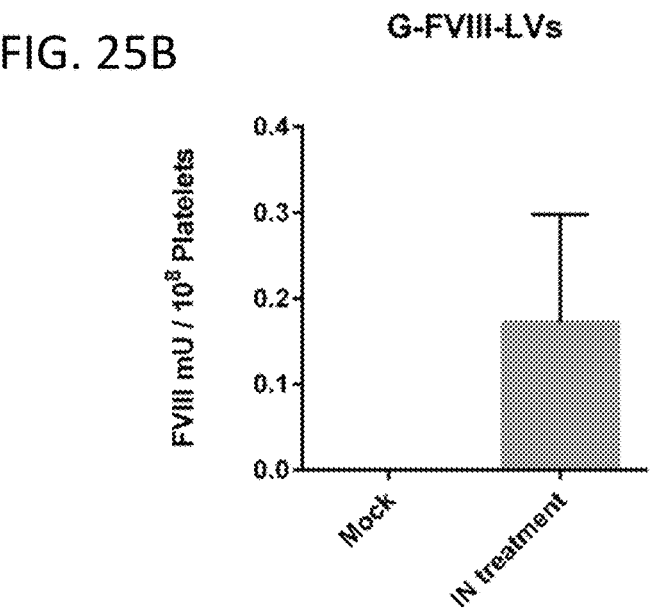
Figure 25C:
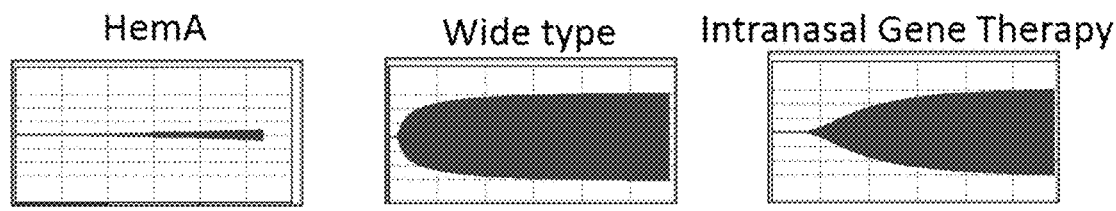

Expression of FVIII in platelets by G-FVIII-LV via intranasal delivery is illustrated in FIG. 25A-25C. Mice were treated with 130 mg/kg N-acetyl cysteine (NAC) via intravenous injection for 2 days and 10 mg/kg Dexamethasone via intraperitoneal injection 16 hrs before and 2 hrs after IN. Mice were administered with 40 µl G-FVIII-LVs ($1\times10^9$ IFU/ml)/mouse via IN, then mice slept for 5 mins under isoflurane. (FIG. 25A-25B) FVIII expression was detected by intracellular staining and ELISA assay in platelets after IN treatment (N=4). (FIG. 25C) The representative schematic of the whole blood clotting by ROTEM in HemA, wild type, and LV-treated mice at 30 days after IN dosing.

Lung HSCs transduction by M-GFP-LVs is illustrated in FIGS. 26A-26H. M-GFP-LVs can transduce hematopoietic stem cells in lung via intranasal delivery.

Conclusions: Transducing megakaryocytes in lung with lentiviral vectors via intranasal delivery achieved instant gene expression. NAC and Dex treatment helped LVs transduction efficiency. M-GFP-LVs can transduce haematopoietic stem cells in lung via intranasal delivery. Transducing haematopoietic stem cells in lung by G-FVIII-LV via intranasal delivery to achieve long-term partially cure of HemA.

As will be understood by one of ordinary skill in the art, each embodiment disclosed herein can comprise, consist essentially of or consist of its particular stated element, step, ingredient, or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient, or component not specified. The transition phrase "consisting essentially of" limits the scope of the embodiment to the specified elements, steps, ingredients, or components and to those that do not materially affect the embodiment. As used herein, a material effect would cause a statistically-significant reduction in transient expression of a therapeutic protein within 7 days following administration of a disclosed nanocarrier to a subject.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, numerous references have been made to patents and printed publications throughout this specification. Each of the herein-cited references and printed publications are individually incorporated herein by reference for their particular cited teachings.

It is to be understood that the embodiments disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

Definitions and explanations used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art, such as the Oxford Dictionary of Biochemistry and Molecular Biology (Ed. Anthony Smith, Oxford University Press, Oxford, 2004).

SEQUENCE LISTING

```
Sequence total quantity: 11
SEQ ID NO: 1            moltype = DNA  length = 4419
FEATURE                 Location/Qualifiers
misc_feature            1..4419
                        note = nucleic acid sequence of the insert BDDFVIIIX10K12,
                        which encodes the human FVIII variant F8X10K12; it differs
                        from variant F8/N6 by a deleted B-domain, a 10-amino acid
                        change in the A1 domain and a 12-amino acid change in the
                        light chain
source                  1..4419
                        mol_type = other DNA
                        organism = synthetic construct
SEQUENCE: 1
atgcaaatag agctctccac ctgcttcttt ctgtgccttt tgcgattctg ctttagtgcc    60
accagaagat actacctggg tgcagtggaa ctgtcatggg actatatgca aagtgatctc   120
ggtgagctgc ctgtggacgc aagatttcct cctagagtgc caaaatcttt tccattcaac   180
acctcagtcg tgtacaaaaa gactctgttt gtagaattca cggatcacct tttcaacatc   240
gctaagccaa ggccaccctg gatgggtctg ctaggtccta ccatccaggc tgaggtttac   300
gacacggtgg tcgttaccct gaagaacatg gcttctcatc ccgttagtct tcacgctgtc   360
ggcgtctcct tctggaaatc ttccgaaggc gctgaatatg aggatcacac cagccaaagg   420
gagaaggaag acgataaagt ccttcccggt aaaagccaaa cctacgtctg gcaggtcctg   480
aaagaaaatg gtccaacagc ctctgaccca ccatgtctta cctactcata cctgtctcac   540
gtggacctgg tgaaagacct gaattcgggc ctcattggag ccctactagt atgtagagaa   600
gggagtctgg ccaaggaaaa gacacagacc ttgcacaaat ttatactact tttgctgta   660
tttgatgaag ggaaagttgg gcactcagaa acaaagaact ccttgatgca ggatagggat   720
gctgcatctg ctcgggcctg gcctaaaatg cacacagtca atggttatgt aaacaggtct   780
ctgccaggtc tgattggatg ccacaggaaa tcagtctatt ggcatgtgat tggaatgggc   840
accactcctg aagtgcactc aatattcctc gaaggtcaca catttcttgt gaggaaccat   900
cgccaggcgt ccttggaaat ctcgccaata actttcctta ctgctcaaac actcttgatg   960
gaccttggac agtttctact gttttgtcat atctcttccc accaacatga tggcatggaa  1020
gcttatgtca aagtagacag ctgtccagag gaacccaac tacgaatgaa aaataatgaa  1080
gaagcggaag actatgatga tgatcttact gattctgaaa tggatgtggt caggtttgat  1140
gatgacaact ctccttcctt tatccaaatt cgctcagttg ccaagaagca tcctaaaact  1200
tgggtacatt acattgctgc tgaagaggag gactgggact atgctccctt agtcctcgcc  1260
cccgatgaca gaagttataa aagtcaatat ttgaacaatg gccctcagcg gattggtagg  1320
aagtacaaaa aagtccgatt tatggcatac acagatgaaa cctttaagac tcgtgaagct  1380
attcagcatg aatcaggaat cttgggacct ttactttatg gggaagttgg agacacactg  1440
ttgattatat ttaagaatca agcaagcaga ccatataaca tctaccctca cggaatcact  1500
gatgtccgtc ctttgtattc aaggagatta ccaaaaggtg taaaacattt gaaggatttt  1560
ccaattctgc caggagaaat attcaaatat aaatggacag tgactgtaga agatgggcca  1620
actaaatcag atcctcggtg cctgacccgc tattactcta gtttcgttaa tatggagaga  1680
gatctagctt caggactcat tggccctctc ctcatctgct acaaagaatc tgtagatcaa  1740
agaggaaacc agataatgtc agacaagagg aatgtcatcc tgttttctgt atttgatgag  1800
aaccgaagct ggtacctcac agagaatata caacgctttc tccccaatcc agctggagtg  1860
cagcttgagg atccagagtt ccaagcctcc aacatcatgc acagcatcaa tggctatgtt  1920
tttgatagtt tgcagttgtc agtttgtttg catgaggtgg catactggta cattctaagc  1980
attggagcac agactgactt cctttctgtc ttcttctctg gatataccct caaacacaaa  2040
atggtctatg aagacacact caccctattc ccattctcag gagaaactgt cttcatgtcg  2100
atggaaaacc caggtctatg gattctgggg tgccacaact cagactttcg gaacagaggc  2160
atgaccgcct tactgaaggt ttctagttgt gacaagaaca ctggtgatta ttacgaggac  2220
agttatgaag atatttcagc atacttgctg agtaaaaaca atgccattga accagaaggc  2280
ttctcccaga attcaagaca ccctagcact aggcaaaagc aatttaatgc caccacacca  2340
ccagtccttga aacgccatca acgcgaaata actcgtacta ctcttcagtc agatcaagag  2400
gaaattgact atgatgatac catatcagtt gaaatgaaga ggaagattt tgacatttat  2460
gatgaggatg aaaatcagag ccccgcagc tttcaaaaga aaacacgaca ctattttatt  2520
gctgcagtgg agaggctctg ggattatggg atgagtagct ccccacatgt tctaagaaac  2580
```

-continued

```
agggctcaga gtggcagtgt ccctcagttc aagaaagttg ttttccagga atttactgat 2640
ggctccttta ctcagccctt ataccgtgga gaactaaatg aacatttggg actcctgggg 2700
ccatatataa gagcagaagt tgaagataat atcatggtaa ctttcagaaa tcaggcctct 2760
cgtcccttat ccttctattc tagccttatt tcttatgagg aagatcagag gcaaggagca 2820
gaacctagaa aaaactttgt caagcctaat gaaaccaaaa cttacttttg gaaagtgcaa 2880
catcatatgg cacccactaa agatgagttt gactgcaaag cctgggctta ttttctgtgat 2940
gttgatttgg agaaagatgt gcactcaggc ttgattggac cccttctgat ctgccgcact 3000
aacacactga accctgctca tgggagacaa gtgacagtac aggaatttgc tctgttttc 3060
accatctttg atgagaccaa aagctggtac ttcactgaaa atatggaaag aaactgcagg 3120
gctccctgca atatccagaa ggaggatccc acttttaaag agaattatcg cttccatgca 3180
atcaacggct atataaagga tacactccct ggcttagtaa tggctcagga tcaaaggatt 3240
cgatggtatc tgctcagcat gggcagcaat gaaaacatcc attctattca tttcagtgga 3300
catgtgttca ctgtacggaa aaaagaggaa tataaaatgg cagtctacaa cctctatcca 3360
ggtgttttg agactgtgga aatgctacca tccaaagttg gaatctggcg ggtggaatgc 3420
cttatcggcg agcacctgca agccgggatg agcactctgt ttctggtgta cagcaataag 3480
tgtcagactc ccctgggaat ggcttctgga cacattagaa attttcagat tacagcttca 3540
ggacaatatg gacagtgggc cccaaagctg gccagacttc attattccgg atcaatcaat 3600
gcctgagcga ccaaggatcc cttttcctgg atcaaggtgg atctcttggc accgatgatt 3660
attcacggca tcatgaccca gggggccccgc cagaagttct ccagcctcta catctctcag 3720
tttatcatca tgtatagtct tgatggcaag aagtggcaca cttaccgagg aaattccact 3780
ggaaccttaa tggtcttctt tggcaatgtg gattcatctg gataaaaca caatattttt 3840
aaccctccaa ttattgctcg atacatccgt ttgcacccaa ctcattataa cattcacagc 3900
actcttcgca tggagttgat gggctgtgat ttaaatagtt gcagcatgcc attgggaatg 3960
gagagtaaag caatatcaga tgcacagatt actgcttcat cctactttac caatatgttt 4020
gccacctggt ctccttcaaa agctcgactt cacctccaag ggaggagtaa tgcctggaga 4080
cctcaggtga ataatccaaa agagtggctg caagtggact tccagaagac aatgaaagtc 4140
acaggagtaa ctactcaggg agtaaaatct ctgcttacca gcatgtatgt gaaggagttc 4200
ctcatctcca gcagtcaaga tggccatcag tggactctct tttttcagaa tggcaaagta 4260
aaggtttttc agggaaatca agactccttc acacctgtgg tgaactctct agaccccaccg 4320
ttactgactc gctaccttcg aattcacccc cagagttggg tgcaccagat tgccctgagg 4380
atggaggttc tgggctgcga ggcacaggac ctctactga 4419
```

SEQ ID NO: 2          moltype = DNA   length = 5107
FEATURE                Location/Qualifiers
misc_feature          1..5107
                         note = nucleic acid sequence of the insert BDDFVIIIn6K12RH,
                         which encodes the human FVIII variant F8/N6K12RH it
                         differs from variant F8/N6 at a 12-amino acid change in
                         the light chain and an amino acid change at the furin
                         cleavage site within the B domain
source                 1..5107
                         mol_type = other DNA
                         organism = synthetic construct
SEQUENCE: 2

```
ctcgagacca ccatgcaaat agagctctcc acctgcttct ttctgtgcct tttgcgattc 60
tgctttagtg ccaccagaag atactacctg ggtgcagtgg aactgtcatg ggactatatg 120
caaagtgatc tcggtgagct gcctgtggac gcaagattc ctcctagagt gccaaaatct 180
tttccattca cacctcagt cgtgtacaaa aagactctgt ttgtagaatt cacggttcac 240
cttttcaaca tcgctaagcc aaggccaccc tggatgggtc tgctaggtcc taccatccag 300
gctgaggttt atgatacagt ggtcattaca cttaagaaca tggcttccca tcctgtcagt 360
cttcatgctg ttggtgtatc ctactggaaa gcttctgagg gagctgaata tgatgacaag 420
accagtcaaa gggagaaaga agatgataaa gtcttccctg gtggaagcca tacatatgtc 480
tggcaggtcc tgaaagagaa tggtccaatg gcctctgacc cactgtgcct tacctactca 540
tatctttctc atgtggacct ggtaaaagac ttgaattcag gcctcattgg agccctacta 600
gtatgtagag aagggagtct ggccaaggaa aagacacaga ccttgcacaa atttatacta 660
cttttgctg tatttgatga agggaaaagt tggcactcag aaacaaagaa ctccttgatg 720
caggatagg atgctgcatc tgctcgggcc tggcctaaaa tgcacacagt caatggttat 780
gtaaacaggt ctctgccagg tctgattgga tgccacagga atcagtcta ttggcatgtg 840
attggaatgg gcaccactcc tgaagtgcac tcaatattcc tcgaaggtca cacattctt 900
gtgaggaacc atcgccaggc tccttggaa atctcgccaa taactttcct tactgctcaa 960
acacttctga tggaccttgg acagtttcta ctgttttgtc atatctcttc ccaccacat 1020
gatggcatgg aagcttatgt caaagtagag actgtccag gaacccca actacgaatg 1080
aaaaataatg aagaagcgga agactatgat gatgatctta ctgattctga atggatgtg 1140
gtcaggtttg atgatgacaa ctctccttcc tttatccaag ttcgtcagt tgccaagaag 1200
catcctaaaa cttgggtaca ttcattgct gctgaagagg aggactggga ctatgctccc 1260
ttagtcctcg ccccgatga cagaagttat aaaagtcaat atttgaacaa tggccctcag 1320
cggattgta ggaagtacaa aaaagtccga tttatggcat acacagatga aacctttaag 1380
actcgtgaag ctattcagca tgaatcagga atcttgggac ttttacttta tgggaagtt 1440
ggagacacac tgttgattat atttaagaat caagcaagca gaccatataa catctacct 1500
cacggaatca ctgatgtccg tcctttgtat tcaaggagat taccaaaagg tgtaaaacat 1560
ttgaaggatt tccaattct gccaggagaa atattcaaat ataatggac agtgactgta 1620
gaagatgggc caactaaatc agatcctcgg tgcctgaccc gctattactc tagttcgtt 1680
aatatggaga gagatctagc ttcaggactc attggccctc tcctcatctg ctacaaagaa 1740
tctgtagatc aaagaggaaa ccagataatg tcagacaaga ggaatgtcat cctgttttct 1800
gtatttgatg agaaccgaag ctggtacctc acagagaata taacgcgtt ctccccaat 1860
ccagctggag tgcagcttga ggatccagag ttccaagcct caacatcat gcacagcatc 1920
aatggctatg tttttgatag tttgcagttg tcagtttgtt tgcatgaggt ggcatactgg 1980
tacattctaa gcattggagc acagactgac ttcctttctg tcttcttctc tggatatacc 2040
ttcaaacaca aaatggtcta tgaagacaca ctcacctat tcccattctc aggagaaact 2100
```

-continued

```
gtcttcatgt cgatggaaaa cccaggtcta tggattctgg ggtgccacaa ctcagacttt  2160
cggaacagag gcatgaccgc cttactgaag gtttctagtt gtgacaagaa cactggtgat  2220
tattacgagg acagttatga agatatttca gcatacttgc tgagtaaaaa caatgccatt  2280
gaaccaagaa gcttctccca gaattcaaga caccctagca ctaggcaaaa gcaatttaat  2340
gccaccacaa ttccagaaaa tgacatagag aagactgacc cttggttgc acacagaaca  2400
cctatgccta aaatacaaaa tgtctcctct agtgatttgt tgatgctctt gcgacagagt  2460
cctactccac atgggctatc cttatctgat ctccaagaag ccaaatatga acttttct  2520
gatgatccat cacctggagc aatagacagt aataacagcc tgtctgaaat gacacacttc  2580
aggccacagc tccatcacag tggggacatg gtatttaccc ctgagtcagg cctccaatta  2640
agattaaatg agaaactggg gacaactgca gcaacagagt tgaagaaact tgatttcaaa  2700
gtttctagta catcaaataa tctgatttca acaattccat cagacaattt ggcagcaggt  2760
actgataata caagttcctt aggaccccca agtatgccag ttcattatga tagtcaatta  2820
gataccactc tatttggcaa aaagtcatct ccccttactg agtctggtgg acctctgagc  2880
tgagtgaag aaaataatga ttcaaagttg ttagaatcag gtttaatgaa tagccaagaa  2940
agttcatggg gaaaaaatgt atcgacgcgt ccaccagtct tgaaacacca tcaacgcgaa  3000
ataactcgta ctactcttca gtcagatcaa gaggaaattg actatgatga taccatatca  3060
gttgaaatga agaaggaaga ttttgacatt tatgatgagg atgaaaatca gagcccccgc  3120
agctttcaaa agaaaacacg acactatttt attgctgcag tgggaggct ctgggattat  3180
gggatgagta gctccccaca tgttctaaga aacagggctc agagtggcag tgtccctcag  3240
ttcaagaaag ttgttttcca ggaatttact gatggctcct ttactcagcc cttataccgt  3300
ggagaactaa atgaacattt gggactcctg gggccatata aagagcaga agttgaagat  3360
aatatcatgg taactttcag aaatcaggcc tctcgtccct attccttcta ttctagcctt  3420
atttcttatg aggaagatca gaggcaagga gcagaaccta gaaaaaactt tgtcaagcct  3480
aatgaaacca aaacttactt ttggaaagtg caacatcata tggcacccac taaagatgag  3540
tttgactgca aagcctgggc ttatttttct gatgttgatt tggagaaaga tgtgcactca  3600
ggcttgattg gaccccttct gatctgccgc actaacacac tgaaccctgc tcatgggaga  3660
caagtgacga tacaggaatt tgctctgttt ttcaccatct ttgatgagac caaaagctgg  3720
tacttcactg aaaatatgga aagaaactgc agggctcct gcaatatcca aaggaggat  3780
cccactttta aagagaatta tcgcttccat gcaatcaacg gctatataaa ggatacactc  3840
cctggcttag taatggctca ggatcaaagg attcgatggt atctgctcag catgggcagc  3900
aatgaaaaca tccattctat tcatttcagt ggacatgtgt tcactgtacg gaaaaaagag  3960
gaatataaaa tggcagtcta aacctctat ccaggtgttt ttgagactgt ggaaatgcta  4020
ccatccaaag ttggaatctg gcgggtggaa tgccttatcg gcgagcacct gcaagccggg  4080
atgagcactc tgtttctggt gtacagcaat aagtgtcaga ctcccctggg aatggcttct  4140
ggacacatta gagattttca gattacagct tcaggacaat atggacagtg ggcccaaag  4200
ctggccagac ttcattattc cggatcaatc aatgcctgga gcaccaagga tcccttttcc  4260
tggatcaagg tggatctctt ggcaccgatg attattcacg gcatcatgac caggggcc  4320
cgccagaagt tctccagcct ctacatctcc cagtttatca tcatgtatag tcttgatggc  4380
aagaagtggc acacttaccg aggaaattcc actggaacct taatggtctt ctttggcaat  4440
gtggattcat ctgggataaa acacaatatt tttaaccctc caattattgc tcgatacatc  4500
cgtttgcacc caactcatta taacattcac agcactcttc gcatggagtt gatgggctgt  4560
gatttaaata gttgcagcat gccattggga atggagagta agcaatatc agatgcacag  4620
attactgctt catcctactt taccaatatg tttgccacct ggtctccttc aaaagctga  4680
cttcacctcc aagggaggag taatgcctgg agacctcagg tgaataatcc aaaagagtgg  4740
ctgcaagtgg acttccagaa gacaatgaaa gtcacaggag taactactca gggagtaaaa  4800
tctctgctta ccagcatgta tgtgaaggag ttcctcatct ccagcagtca agatggccat  4860
cagtggactc tcttttttca gaatggcaaa gtaaaggttt ttcagggaaa tcaagactcc  4920
ttcacacctg tggtgaactc tctagaccca ccgttactga ctcgctacct tcgaattcac  4980
ccccagagtt gggtgcacca gattgccctg aggatggagg ttctgggctg cgaggcacag  5040
gacctctact gactcgagct catggcgcgc ctaggccttg acggccttcc gccaattcgc  5100
cggatcc                                                            5107
```

| SEQ ID NO: 3 | moltype = DNA  length = 10958 |
|---|---|
| FEATURE | Location/Qualifiers |
| misc_feature | 1..10958 |
| | note = nucleic acid sequence of pRRL-GP1balpha-hF8X10K12-WPRE |
| source | 1..10958 |
| | mol_type = other DNA |
| | organism = synthetic construct |

SEQUENCE: 3

```
agcttaatgt agtcttatgc aatactcttg tagtcttgca acatggtaac gatgagttag  60
caacatgcct tacaaggaga gaaaaagcac cgtgcatgcc gattggtgga agtaaggtgg  120
tacgatcgtg ccttattagg aaggcaacag acgggtctga catggattgg acgaaccact  180
gaattgccgc attgcagaga tattgtattt aagtgcctag ctcgatacaa taaacgggtc  240
tctctggtta ccagatctg agcctgggag ctctctggc taactaggga acccactgct  300
taagcctcaa taaagcttgc cttgagtgct tcaagtagtg tgtgcccgtc tgttgtgtga  360
ctctggtaac tagagatccc tcagaccctt ttagtcagtg tggaaaatct ctagcagtgg  420
cgcccgaaca gggaccctgaa gcgaaaggg aaaccagag tctctcgacg caggactcgg  480
cttgctgaag cgcgcacggc aagaggcgag gggcggcgac tggtgagtac gccaaaaatt  540
ttgactagcg gaggctagaa ggagagagat gggtgcgaga gcgtcagtat taagcggggg  600
agaattagat cgcgatggga aaaaattcgg ttaaggccag ggggaaagaa aaatatataa  660
ttaaaacata tagtatgggc aagcagggag ctagaacgat tcgcagttaa tcctggcctg  720
ttagaaacat cagaaggctg tagacaaata ctgggacaga taccaaccatc ccttcagaca  780
ggatcagaag aacttagatc attatataat acagtagcaa ccctctattg tgtgcatcaa  840
aggatagaga taaaagacac caaggaagct ttagacaaga tagaggaaga gcaaaacaaa  900
agtaagacca ccgcacagca agcggccgct gatcttcaga cctggaggag gagatatgag  960
ggacaattgg agaagtgaat tatataaata taaagtagta aaaattgaac cattaggagt  1020
agcacccacc aaggcaaaga gaagagtggt gcagagagaa aaaagagcag tgggaatagg  1080
```

-continued

```
agctttgttc cttgggttct tgggagcagc aggaagcact atgggcgcag cctcaatgac   1140
gctgacggta caggccagac aattattgtc tggtatagtg cagcagcaga acaatttgct   1200
gagggctatt gaggcgcaac agcatctgtt gcaactcaca gtctgggca tcaagcagct    1260
ccaggcaaga atcctggctg tggaaagata cctaaaggat caacagctcc tggggatttg   1320
gggttgctct ggaaaactca tttgcaccac tgctgtgcct tggaatgcta gttggagtaa   1380
taaatctctg gaacagattt ggaatcacac gacctggatg gagtgggaca gagaaattaa   1440
caattacaca agcttaatac actccttaat tgaagaatcg caaaaccagc aagaaaagaa   1500
tgaacaagaa ttattggaat tagataaatg ggcaagtttg tggaattggt ttaacataac   1560
aaattggctg tggtatataa aattattcat aatgatagta ggaggcttgg taggtttaag   1620
aatagttttt gctgtacttt ctatagtgaa tagagttagg cagggatatt caccattatc   1680
gtttcagacc cacctcccaa ccccgagggg acccgacagg cccgaaggaa tagaagaaga   1740
aggtggagag agagacagag acagatccat tcgattagtg aacggatctc gacggtatcg   1800
gttaactttt aaaagaaaag gggggattgg gggtacagt gcagggaaa gaatagtaga    1860
cataatagca acagacatac aaactaaaga attacaaaa caattacaa aaattcaaaa    1920
ttttatcgat ccatagaccg gtgaacctgc tagctctggg attacaggca tgagccacgc   1980
gcccggccct ggagaggttt ttaaaagatg cagaaggct gtttggagga gtccaccccc    2040
atctcccctg tgtaaaagga aagcggaaga gaaccaca aagagggcct gggggaaagc     2100
cgtggagtga ggcgataagg gcttgtgtcc aggggattcc cggtcactgg aatccctatc   2160
aggcctgcat ttcctcctca ccccccatccc cttccttgcc actggcttag tcctccatgg  2220
ggctagaaga gagaaggacg gagtcgagtg gcacccctaga agacgctctg tgccttcgga  2280
ggtgctagca ctggagatat ctaggacctc gagaccacca tgcaaataga gctctccacc   2340
tgcttctttc tgtgcctttt gcgattctgc tttagtgcca ccagaagata ctacctgggt   2400
gcagtggaac tgtcatggga ctatatgcaa agtgatctcg gtgagctgcc tgtggacgca   2460
agatttcctc ctagagtgcc aaaatctttt ccattcaaca cctcagtcgt gtacaaaaag   2520
actctgtttg tagaattcac ggatcacctt ttcaacatcg ctaagccaag gccaccctgg   2580
atgggtctgc taggtcctac catccaggct gaggtttacg acacggtggt cgttaccctg   2640
aagaacatgg cttctcatcc cgttagtctt cacgctgtcg gcgtctcctt ctggaaatct   2700
tccgaaggcg ctgaatatga ggatcacacc agccaaaggg agaaggaaga cgataaagtc   2760
cttcccggta aaagccaaac ctacgtctgg caggtcctga agaaaatggg tccaacagcc   2820
tctgacccac catgtcttac ctactcatac ctgtctcacg tggacctggt gaaagacctg   2880
aattcgggcc tcattggagc cctactagta tgtagagaag gggagtctggc caaggaaaag   2940
acacagacct tgcacaaatt tatactactt tttgctgtat ttgatgaagg gaaaagttgg   3000
cactcagaaa caaagaactc cttgatgcag gatagggatg ctgcatctgc tcgggcctgg   3060
cctaaaatgc acacagtcaa tggttatgta aacaggtctc tgccaggtct gattggatgc   3120
cacaggaaat cagtctattg gcatgtgatt ggaatgggca ccactcctga agtgcactca   3180
atattcctcg aagtcacac atttcttgtg aggaaccatc gccaggcgtc cttgaaatc     3240
tcgccaataa ctttccttac tgctcaaaca ctcttgatgg accttggaca gtttctactg   3300
ttttgtcata tctcttccca ccaacatgat ggcatggaag cttatgtcaa agtagacagc   3360
tgtccagaga aacccaact acgaatgaaa aataatgaaa aagcggaaga ctatgatgat   3420
gatcttactg attctgaaat ggatgtggtc aaggtttgatg atgacaactc tccttccttt   3480
atccaaattc gctcagttgc caagaagcat cctaaaactt gggtacatta cattgctgct   3540
gaagaggagg actgggacta tgctccctta gtcctcgccc ccgatgacag aagttataaa   3600
agtcaatatt tgaacaatgg ccctcagcgg atttgtagga agtacaaaaa agtccgattt   3660
atggcataca cagatgaaac ctttaagact cgtgaagcta ttcagcatga atcaggaatc   3720
ttgggacctt tactttatgg ggaagttgga gacacactgt tgattatatt taagaatcaa   3780
gcaagcagac catataacat ctaccctcac ggaatcactg atgtccgtcc tttgtattca   3840
aggagattac caaaggtgt aaaacatttg aaggattttc caattctgcc aggagaaata   3900
ttcaaatata aatggacagt gactgtagaa gatgggccaa ctaaatcaga tcctcggtgc   3960
ctgacccgct attactctag tttcgttaat atggagagag atctagcttc aggactcatt   4020
ggccctctcc tcatctgcta caaagaatct gtagatcaaa gaggaaacca gataatgtca   4080
gacaaggga atgtcatcct gttttctgta tttgatgaga accgaagctg gtacctcaca   4140
gagaatatac aacgctttct ccccaatcca gctggagtgc agcttgagga tccagagttc   4200
caagcctcca acatcatgca cagcatcaat ggctatgttt ttgatagttt gcagttgtca   4260
gtttgtttgc atgaggtggc atactggtac attctaagca ttggagcaca gactgacttc   4320
ctttctgtct tcttctctgg atataccttc aaacacaaaa tggtctatga agacacactc   4380
accctattcc cattctcagg agaaactgtc ttcatgtcga tggaaaaccc aggtctatgg   4440
attctgggt gccacaactc agactttcgg aacagaggca tgaccgcctt actgaaggtt   4500
tctagttgtg acaagaacac tggtgattat tacgaggaca gttatgaaga tatttcagca   4560
tacttgcta gtaaaaacaa tgccattgaa ccaagaagct tctcccagaa ttcaagacac   4620
cctagcacta ggcaaaagca atttaatgcc accacaccac cagtcttgaa acgccatcaa   4680
cgcgaaataa ctcgtactac tcttcagtca gatcaagagg aaattgacta tgatgatacc   4740
atatcagtta aaatgaagaa ggaagatttt gacatttatg atgaggatga aaatcagagc   4800
ccccgcagct ttcaaaagaa aacacgacac tattttattg ctgcagtgga gaggctctgg   4860
gattatggga tgagtagctc cccacatgtt ctaagaaatg aggctcagag tggcagtgtc   4920
cctcagttca gaaagttgt tttccaggaa tttactgatg gctcctttac tcagcccta    4980
taccgtggag aactaaatga acatttggga ctcctgggc catatataag agcagaagtt   5040
gaagataata tcatggtaac tttcagaaat caggcctctc gtccctattc cttctattct  5100
agccttattt cttatgagga agatcagagg caaggagca aacctagaaa aaactttgtc   5160
aagcctaatg aaaccaaaac ttactttgg aagtgcaaa atcatatggc acccactaaa    5220
gatgagtttg actgcaaagc ctgggcttat ttttctgatg ttgatttgga gaagatgtg    5280
cactcaggct tgattggacc ccttctgatc tgccgcacta acacactgaa ccctgctcat  5340
gggagacaag tgcagtaca ggaatttgct ctgttttca ccatctttga tgagaccaaa   5400
agctggtact tcactgaaaa tatggaaaga aactgcaggg ctccctgcaa tatccagaag   5460
gaggatccca cttttaaaga gaattatcgc ttccatgcaa tcaacggcta tataaaggat   5520
acactccctg gcttagtaat ggctcaggat caaaggattc gatggtatct gctcagcatg   5580
ggcagcaatg aaaacatcca ttctattcat ttcagtggac atgtgttcac tgtacgaaaa   5640
aaagaggaat ataaaatggc agtctacaac ctctatccag gtgttttga gactgtgaa    5700
atgctaccat ccaaagttgg aatctggcgg gtggaatgcc ttatcggcga gcacctgcaa   5760
gccgggatga gcactctgtt tctggtgtac agcaataagt gtcagactcc cctgggaatg   5820
```

```
gcttctggac acattagaga ttttcagatt acagcttcag gacaatatgg acagtgggcc   5880
ccaaagctgg ccagacttca ttattccgga tcaatcaatg cctggagcac caaggatccc   5940
ttttcctgga tcaaggtgga tctcttggca ccgatgatta ttcacggcat catgacccag   6000
ggggcccgcc agaagttctc cagcctctac atctctcagt ttatcatcat gtatagtctt   6060
gatgcaaga agtggcacac ttaccgagga aattccactg gaaccttaat ggtcttcttt   6120
ggcaatgtgg attcatctgg gataaaacac aatattttta accctccaat tattgctcga   6180
tacatccgtt tgcacccaac tcattataac attcacagca ctcttcgcat ggagttgatg   6240
ggctgtgatt taaatagttg cagcatgcca ttgggaatgg agagtaaagc aatatcagat   6300
gcacagatta ctgcttcatc ctactttacc aatatgtttg ccacctggtc tccttcaaaa   6360
gctcgacttc acctccaagg gaggagtaat gcctgagac ctcaggtgaa taatccaaaa   6420
gagtggctgc aagtggactt ccagaagaca atgaaagtca caggagtaac tactcaggga   6480
gtaaaatctc tgcttaccag catgtatgtg aaggagttcc tcatctccag cagtcaagat   6540
ggccatcagt ggactctctt ttttcagaat ggcaaagtaa aggttttca gggaaatcaa   6600
gactccttca cacctgtggt gaactctcta gacccaccgt tactgactcg ctaccttcga   6660
attcacccc agagttgggt gcaccagatt gccctgagga tggaggttct gggctgcgag   6720
gcacaggacc tctactgact cgagctcatg gcgcgcctag gccttgacgg ccttccgcca   6780
attcgccgga tccaccggta ctagtgtcga caatcaacct ctggattaca aaatttgtga   6840
aagattgact ggtattctta actatgttgc tccttttacg ctatgtggat acgctgcttt   6900
aatgcctttg tatcatgcta ttgcttcccg tatggctttc attttctcct ccttgtataa   6960
atcctggttg ctgtctcttt atgaggagtt gtggcccgtt gtcaggcaac gtggcgtggt   7020
gtgcactgtg tttgctgacg caaccccccac tggttgggc attgccacca cctgtcagct   7080
cctttccggg acttttcgct tcccccctccc tattgccacg gcgaactca tcgccgcctg   7140
ccttgcccgc tgctggacag gggctcggct gttgggcact gacaattccg tggtgttgtc   7200
ggggaagctg acgtccttc catgctgct cgcctgtgtt gccacctgga ttctgcgcgg   7260
gacgtccttc tgctacgtcc cttcggccct caatccagcg gaccttcctt cccgcggcct   7320
gctgccgggct ctgcggcctc ttccgcgtct tcgccttcgc cctcagacga ctcggatctc   7380
cctttgggcc gcctcccgc ctggaattcg agctcggtac ctttaagacc aatgacttac   7440
aaggcagctg tagatcttag ccacttttta aaagaaaagg ggggactgga agggctaatt   7500
cactcccaac gaagacaaga tctgcttttt gcttgtactg ggtctctctg gttagaccag   7560
atctgagcct gggagctctc tggctaacta gggaacccac tgcttaagcc tcaataaagc   7620
ttgccttgag tgcttcaagt agtgtgtgcc cgtctgttgt gtgactctgg taactagaga   7680
tccctcagac ccttttagtc agtgtggaaa atctctagca gtagtagttc atgtcatctt   7740
attattcagt atttataact tgcaaagaaa tgaatatcag agagtgagag gaacttgttt   7800
attgcagctt ataatggtta caaataaagc aatagcatca caaattcac aaataaagca   7860
tttttttcac tgcattctag ttgtggtttg tccaaactca tcaatgtatc ttatcatgtc   7920
tggctctagc tatcccgccc ctaactccgc ccagttccgc ccattctccg ccccatggct   7980
gactaatttt ttttattat gcagaggccg aggccgcctc ggcctctgag ctattccaga   8040
agtagtgagg aggcttttt ggaggcctag gcttttgcgt cgagacgtac ccaattcgcc   8100
ctatagtgag tcgtattacg cgcgctcact ggccgtcgtt ttacaacgtc gtgactggga   8160
aaaccctggc gttacccaac ttaatcgcct tgcagcacat ccccctttcg ccagctggcg   8220
taatagcgaa gaggcccgca ccgatcgccc ttcccaacag ttgcgcagcc tgaatgcgca   8280
atggcgcgac gcgcctgta gcggcgcatt aagcgcggcg ggtgtggtgg ttacgcgcag   8340
cgtgaccgct acacttgcca gcgccctagc gcccgctcct ttcgctttct tcccttcctt   8400
tctcgccacg ttcgccggct ttccccgtca agctctaaat cggggcctcc ctttagggtt   8460
ccgatttagt gctttacggc acctcgaccc caaaaaactt gattagggtg atggttcacg   8520
tagtgggcca tcgccctgat agacggtttt tcgccctttg acgttggagt ccacgttctt   8580
taatagtgga ctcttgttcc aaactggaac aacactcaac cctatctcgg tctattcttt   8640
tgatttataa gggattttgc cgatttcggc ctattggtta aaaaatgagc tgatttaaca   8700
aaaatttaac gcgaatttta acaaaatatt aacgtttaca atttcccagg tggcacttt   8760
cggggaaatg tgcgcggaac ccctatttgt ttatttttct aaatacattc aaatatgtat   8820
ccgctcatga gacaataacc ctgataaatg cttcaataat attgaaaaag gaagagtatg   8880
agtattcaac atttccgtgt cgcccttatt cccttttttg cggcattttg ccttcctgtt   8940
tttgctcacc cagaaacgct ggtgaaagta aaagatgctg aagatcagtt gggtgcacga   9000
gtgggttaca tcgaactgga tctcaacagc ggtaagatcc ttgagagttt tcgccccgaa   9060
gaacgttttc caatgatgag cactttttaaa gttctgctat gtggcgcggt attatcccgt   9120
attgacgccg ggcaagagca actcggtcgc cgcatacact attctcagaa tgacttggtt   9180
gagtactcac cagtcacaga aaagcatctt acggatggca tgacagtaag agaattatgc   9240
agtgctgcca taaccatgag tgataacact gcggccaact tacttctgac aacgatcgga   9300
ggaccgaagg agctaaccgc ttttttgcac aacatggggg atcatgtaac tcgccttgat   9360
cgttgggaac cggagctgaa tgaagccata ccaaacgacg agcgtgacac cacgatgcct   9420
gtagcaatgg caacaacgtt gcgcaaacta ttaactggcg aactacttac tctagcttcc   9480
cggcaacaat taatagactg gatggaggcg gataaagttg caggaccact tctgcgctcg   9540
gcccttccgg ctggctggtt tattgctgat aaatctggag ccggtgagcg tgggtctcgc   9600
ggtatcattg cagcactggg gccagatggt aagccctccc gtatcgtagt tatctacacg   9660
acggggagtc aggcaactat ggatgaacga aatagacaga tcgctgagat aggtgcctca   9720
ctgattaagc attggtaact gtcagaccaa gtttactcat atatacttta gattgattta   9780
aaacttcatt tttaatttaa aaggatctag gtgaagatcc ttttgataa tctcatgacc   9840
aaaatccctt aacgtgagtt ttcgttccac tgagcgtcag accccgtaga aagatcaaa   9900
ggatcttctt gagatccttt ttttctgcgc gtaatctgct gcttgcaaac aaaaaaacca   9960
ccgctaccag cggtggtttg tttgccggat caagagctac caactctttt tccgaaggta  10020
actggcttca gcagagcgca gataccaaat actgtcctc tagtgtagcc gtagttaggc  10080
caccacttca agaactctgt agcaccgcct acatacctcg ctctgctaat cctgttacca  10140
gtggctgctg ccagtggcga taagtcgtgt cttaccgggt tggactcaag acgatagtta  10200
ccggataagg cgcagcggtc gggctgaacg ggggttcgtg cacacagccc agcttggag  10260
cgaacgacct acaccgaact gagataccta cagcgtgagc tatgagaaag cgccacgctt  10320
cccgaaggga gaaaggcgga caggtatccg gtaagcggca gggtcggaac aggagagcgc  10380
acgagggagc ttccaggggg aaacgcctgg tatctttata gtcctgtcgg gtttcgccac  10440
ctctgacttg agcgtcgatt tttgtgatgc tcgtcagggg gcggagcct atggaaaaac  10500
gccagcaacg cggccttttt acggttcctg gccttttgct ggccttttgc tcacatgttc  10560
```

```
tttcctgcgt tatccctga ttctgtggat aaccgtatta ccgcctttga gtgagctgat   10620
accgctcgcc gcagccgaac gaccgagcgc agcgagtcag tgagcgagga agcggaagag   10680
cgcccaatac gcaaaccgcc tctccccgcg cgttggccga ttcattaatg cagctggcac   10740
gacaggtttc ccgactggaa agcgggcagt gagcgcaacg caattaatgt gagttagctc   10800
actcattagg caccccaggc tttacacttt atgcttccgg ctcgtatgtt gtgtggaatt   10860
gtgagcggat aacaatttca cacaggaaac agctatgacc atgattacgc caagcgcgca   10920
attaaccctc actaaaggga acaaaagctg gagctgca                           10958

SEQ ID NO: 4           moltype = DNA   length = 11579
FEATURE                Location/Qualifiers
misc_feature           1..11579
                       note = nucleic acid sequence of
                       pRRL-GP1balpha-hF8/N6K12RH-WPRE
source                 1..11579
                       mol_type = other DNA
                       organism = synthetic construct
SEQUENCE: 4
agcttaatgt agtcttatgc aatactcttg tagtcttgca acatggtaac gatgagttag    60
caacatgcct tacaaggaga gaaaaagcac cgtgcatgcc gattggtgga agtaaggtgg   120
tacgatcgtg ccttattagg aaggcaacag acgggtctga catggattgg acgaaccact   180
gaattgccgc attgcagaga tattgtattt aagtgcctag ctcgatacaa taaacgggtc   240
tctctggtta gaccagatct gagcctggga gctctctgga taactaggga acccactgct   300
taagcctcaa taaagcttgc cttgagtgct tcaagtagtg tgtgcccgtc tgttgtgtga   360
ctctggtaac tagagatccc tcagacccct ttagtcagtg tggaaaatct ctagcagtgg   420
cgcccgaaca gggacctgaa agcgaaaggg aaaccagagc tctctcgacg caggactcgg   480
cttgctgaag cgcgcacggc aagaggcgag gggcggcgac tggtgagtac gccaaaaatt   540
ttgactagcg gaggctagaa ggagagagat gggtgcgaga gcgtcagtat taagcggggg   600
agaattagat cgcgatggga aaaaattcgg ttaaggccag ggggaagaaa aaatataaa    660
ttaaaacata tagtatgggc aagcaggag ctagaacgat tcgcagttaa tcctggcctg   720
ttagaaacat caagaggctg tagacaaata ctgggacaa tacaaccatc ccttcagaca   780
ggatcagaag aacttagatc attatataat acagtagcaa ccctctattg tgtgcatcaa   840
aggatagaga taaaagacac caaggaagct ttagacaaga tagaggaaga gcaaaacaaa   900
agtaagacca ccgcacagca agcggccgct gatcttcaga cctggaggag agatatgag    960
ggacaattgg agaagtgaat tatataaata taaagtagta aaaattgaac cattaggagt  1020
agcacccacc aaggcaaaga gaagagtggt gcagagagaa aaaagagcag tgggaatagg  1080
agctttgttc cttgggttct tgggagcagc aggaagcact atgggcgcag cctcaatgac  1140
gctgacggta caggccagac aattattgtc tggtatagtg cagcagcaga caatttgct   1200
gagggctatt gaggcgcaac agcatctgtt gcaactcaca gtctgggca tcaagcagct  1260
ccaggcaaga atcctggctg tggaaagata cctaaaggat caacagctcc tggggatttg  1320
gggttgctct ggaaaactca tttgcaccac tgctgtgcct tggaatgcta gttggagtaa  1380
taaatctctg gaacagattt ggaatcacac gacctggatg gagtgggaca gagaaattaa  1440
caattacaca agcttaatac actccttaat tgaagaatcg caaaaccagc aagaaaagaa  1500
tgaacaagaa ttattggaat tagataaatg ggcaagtttg tggaattggt ttaacataaa  1560
aaattggctg tggtatataa aattattcat aatgatagta ggaggcttgg taggtttaag  1620
aatagttttt gctgtacttt ctatagtgaa tagagttagg cagggatatt caccattatc  1680
gtttcagacc cacctcccaa ccccgagggg acccgacagg cccgaaggaa tagaagaaga  1740
aggtggagag agagacagag acagatccat tcgattagtg aacggatctc gacggtatcg  1800
gttaactttt aaaagaaaag ggggattggg gggtacagt gcaggggaaa gaatagtaga  1860
cataatagca acagacatac aaactaaaga attacaaaaa caaattacaa aaattcaaaa  1920
ttttatcgat ccatagaccg tgaacctgc tagctctggg attacaggca tgagccacgc  1980
gcccgccct ggagaggttt ttaaaagatg tcagaaggct gtttggagga gtccacccgc  2040
atctccctg tgtaaaagga agcggaaga gagaaccaca aagagggcct gggggaaagc  2100
cgtggagtga ggcgataagg gcttgtgtcc aggggattcc cggtcactgg aatccctatc  2160
aggcctgcat ttcctcctca ccccatccc cttccttgcc actggcttag tcctccatgg  2220
ggctagaaga gagaaggacg gagtcgagtg gcaccctaga agcagctctc tgccttcgga  2280
ggtgctagca ctggagatat ctaggacctc gagaccacca tgcaaataga gctctccacc  2340
tgcttctttc tgtgcctttt gcgattctgc tttagtgcca ccagaagata ctaccctggt  2400
gcagtggaac tgtcatggga ctatatgcaa agtgatctcg gtgagctgcc tgtggacgca  2460
agattccctc ctagagtgcc aaaatcttt ccattcaaca cctcagtcgt gtacaaaaag  2520
actctgtttg tagaattcac ggttcaccctt ttcaacatcg ctaagccag gccaccctgg  2580
atgggtctgc taggtcctac catccaggct gaggtttatg atacagtggt cattacactt  2640
aagaacatgg cttcccatcc tgtcagtctt catgctgttg gtgtatccta ctggaaagct  2700
tctgaggag ctgaatatga tgatcagacc agtcaaaggg agaaagaaga tgataaagtc  2760
ttccctggtg gaagccatac atatgtctgg caggtcctga aagagaatgg tccaatgcgc  2820
tctgacccac tgtgccttac ctactcatat ctttctcatg tggaccctgg aaaagacttg  2880
aattcaggcc tcattggagc cctactagta tgtagagaag ggagtctggc caaggaaaag  2940
acacagacct tgcacaaatt tatactactt tttgctgtat ttgatgaagg aaaagttgg   3000
cactcagaaa caaagaactc cttgatgcag gatagggatg ctgcatctgc tcggcctcag  3060
cctaaaatgc acacagtcaa tggttatgta aacaggtctc tgccaggtct gattggatgc  3120
cacaggaaat cagtctattg gcatgtgatt ggaatgggca ccactcctga gtgcactca   3180
atattcctcg aaggtcacac atttcttgtg aggaaccatc gccaggcgtc cttgaaatc   3240
tcgccaataa ctttccttac tgctcaaaca ctcttgatgg accttggaca gtttctactg  3300
ttttgtcata tctcttccca ccaacatgat ggcatggaag cttatgtcaa agtagatagc  3360
tgtccagagg aacccccaact agcaatgaaa aatcaggaag aagcgaaa ctatgatgat  3420
gatcttactg attctgaaat ggatgtggtc aggtttgatg atgacaactc tccttccttt  3480
atccaaattc gctcagttgc caagaagcat cctaaaactt gggtacatta cattgctgct  3540
gaagaggagg actgggacta tgctccctta gtcctcgccc ccgatgacag aagttataaa  3600
agtcaatatt tgaacaatgg ccctcagcgg attggtagga agtacaaaaa agtccgattt  3660
atggcataca cagatgaaac cttaagact cgtgaagcta ttcagcatga atcaggaatc  3720
```

```
ttgggacctt tactttatgg ggaagttgga gacacactgt tgattatatt taagaatcaa  3780
gcaagcagac catataacat ctaccctcac ggaatcactg atgtccgtcc tttgtattca  3840
aggagattac caaaaggtgt aaaacatttg aaggattttc caattctgcc aggagaaata  3900
ttcaaatata aatggacagt gactgtgaaa gatgggccaa ctaaatcaga tcctcggtgc  3960
ctgacccgct attactctag tttcgttaat atggagagag atctagcttc aggactcatt  4020
ggccctctcc tcatctgcta caaagaatct gtagatcaaa gaggaaacca gataatgtca  4080
gacaagagga atgtcatcct gttttctgta tttgatgaga accgaagctg gtacctcaca  4140
gagaatatac aacgctttct ccccaatcca gctggagtgc agcttgagga tccagagttc  4200
caagcctcca acatcatgca cagcatcaat ggctatgttt ttgatagttt gcagttgtca  4260
gtttgtttgc atgaggtggc atactggtac attctaagca ttggagcaca gactgacttc  4320
cttctgtct tcttctctgg atataccttc aaacacaaaa tggtctatga agacacactc  4380
accctattcc cattctcagg agaaactgtc ttcatgtcga tggaaaaccc aggtctatgg  4440
attctggggt gccacaactc agactttcgg aacagaggca tgaccgcctt actgaaggtt  4500
tctagttgta acaagaacac tggtgattat tacgagcaca gttatgaaga tatttcagca  4560
tacttgctga gtaaaaacaa tgccattgaa ccaagaagct tctcccagaa ttcaagacac  4620
cctagcacta ggcaaaagca atttaatgcc accacaattc cagaaaatga catagagaag  4680
actgacccctt ggtttgcaca cagaacacct atgcctaaaa tacaaaatgt ctcctctagt  4740
gatttgttga tgctcttgcg acagagtcct actccacatg ggctatcctt atctgatctc  4800
caagaagcca aatatgagac tttttctgat gatccatcac ctggagcaat agacagtaat  4860
aacagcctgt ctgaaatgac acacttcagg ccacagctcc atcacagtgg ggacatggta  4920
tttaccccctg agtcaggcct ccaattaaga ttaaatgaga aactggggac aactgcagca  4980
acagagttga agaaacttga tttcaaagtt tctagtacat caaataatct gatttcaaca  5040
attccatcag acaatttggc agcaggtact gataatacaa gttccttagg accccccaagt  5100
atgccagttc attatgatag tcaattagat accactctat ttggcaaaaa gtcatctccc  5160
cttactgagt ctggtggacc tctgagcttg agtgaagaaa ataatgattc aaagttgtta  5220
gaatcaggtt taatgaatac ccaagaaagt tcatggggaa aaatgtatc gacgcgtcca  5280
ccagtcttga aacaccatca acgcgaaata actcgtacta ctcttcagtc agatcaagag  5340
gaaattgact atgatgatac catatcagtt gaaatgaaga aggaagattt tgacatttat  5400
gatgaggatg aaaatcagag cccccgcagc tttcaaaaga aaacacgaca ctatttttatt  5460
gctgcagtga agaggctctg ggattatggg atgagtagct ccccacatgt tctaagaaac  5520
agggctcaga gtggcagtgt ccctcagttc aagaaagttg ttttccagga atttactgat  5580
ggctccttta ctcagccctt ataccgtgga gaactaaatg aacatttggg actcctgggg  5640
ccatatataa gagcagaagt tgaagataat atcatggtaa ctttcagaaa tcaggcctct  5700
cgtccctatt ccttctattc tagccttatt tcttatgagg aagatcaaga gcaaggagca  5760
gaacctagaa aaaactttgt caagcctaat gaaaccaaaa cttactttg gaaagtgcaa  5820
catcatatgg cacccactaa agatgagttt gactgcaaag cctgggctta tttttctgat  5880
gttgatttgg agaagatgt gcactcaggc ttgattggac cccttctgat ctgccgcact  5940
aacacactga accctgctca tgggagacaa gtgacagtac aggaatttgc tctgtttttc  6000
accatctttg atgagaccaa aagctggtac ttcactgaaa atatgaaag aaactgcagg  6060
gctccctgca atatccagaa ggaggatccc acttttaaag agaattatcg cttccatgca  6120
atcaacggct atataaagga tactcccct ggcttagtaa tggctcagga tcaaaggatt  6180
cgatggtatc tgctcagcat gggcagcaat gaaaacatcc attctattca tttcagtgga  6240
catgtttca ctgtacggaa aaaagaggaa tataaaatgg cagtctacaa cctctatcca  6300
ggtgttttttg agactgtgga aatgctacca tccaaagttg gaatctggcg ggtggaatgc  6360
cttatcggcg agcacctgca agccgggatg agcactctgt ttctggtgta cagcaataag  6420
tgtcagactc ccctgggaat ggcttctgga cacattagg attttcagat tacagcttca  6480
ggacaatatg gacagtgggc cccaaagctg gccagacttc attattccgg atcaatcaat  6540
gcctggagca ccaaggatcc cttttcctgg atcaaggtgg atctcttggc accgatgatt  6600
attcacggca tcatgaccca gggggccgc cagaagttct ccagcctcta catctctcag  6660
tttatcatca tgtatagtct tgatggcaag aagtggcaca cttaccgagg aaattccact  6720
ggaaccttaa tggtcttctt tggcaatgtg gattcatctg ggataaaaca caatattttt  6780
aaccctccaa ttattgctcg atacatccgt ttgcacccaa ctcattataa cattcacagc  6840
actcttcgca tggagttgat gggctgtgat ttaaatagtt gcagcatgcc attgggaatg  6900
gagagtaaag caatatcaga tgcacagatt actgcttcat cctactttac caatatgttt  6960
gccacctggt ctccttcaaa agctcgactt cacctccaag gggagtaa tgcctggaga  7020
cctcaggtga ataatccaaa agagtggctg caagtggact tccagaagac aatgaaagtc  7080
acaggagtaa ctactcaggg agtaaaaatc ctgcttacca gcatgtatgt gaaggagttc  7140
ctcatctcca gcagtcaaga tggccatcag tggactctct tttttcagaa tggcaaagta  7200
aaggttttc agggaaatca agactccttc acacctgtgg tgaactctct agacccaccg  7260
ttactgactc gctaccttcg aattcacccc cagagttgg tgcaccagat tgccctgagg  7320
atggaggttc tgggctgcga ggcacaggac ctctactgac tcgagctcat ggcgcgccta  7380
ggccttgacg gccttccgcc aattcgccgg atccaccggt actagtgtcg caatcaacc  7440
tctgattac aaaatttgtg aaagattgac tggtattctt aactatgttg ctccttttac  7500
gctatgtgga tacgctgctt taatgcctt gtatcatgct attgcttccc gtatgctttt  7560
cattttctcc tccttgtata atcctggtt gctgtctctt tatgaggagt tgtggccgt  7620
tgtcaggcaa cgtggcgtgg tgtgcactgt gtttgctgac gcaaccccca ctggttgggg  7680
cattgccacc acctgtcagc tccttttccgg gactttcgct ttcccccctcc ctattgccac  7740
ggcggaactc atcgccgcct gccttgcccg ctgctggaca ggggctcggc tgttgggcac  7800
tgacaattcc gtggtgttgt cggggaagct gacgtccttt ccatgctgc tcgcctgtgc  7860
tgccacctgg attctgcgcg gacgtcctt ctgctacgtc ccttcggccc tcaatccagc  7920
ggaccttcct tcccgcggcc tgctgccggc tctgcggcct cttccgcgtc ttcgccttcg  7980
ccctcagacg agtcggatct cccttttggcc cgcctcccg cctggaattc gagctcgta  8040
cctttaagac caatgactta caaggcagct gtagatctta gccacttttt aaaagaaag  8100
ggggggactgg aagggctaat tcactcccaa cgaagacaag atctgcttt tgcttgtact  8160
gggtctctct ggttagacca gatctgagcc tgggagctct ctggctaact agggaaccca  8220
ctgcttaagc ctcaataaag cttgccttga gtgcttcaag tagtgtgtgc ccgtctgttg  8280
tgtgactctg gtaactagag atccctcaga ccctttttagt cagtgtggaa atctctagc  8340
agtagtagtt catgtcatct tattattcag tatttataac ttgcaaagaa atgaatatca  8400
gagagtgaga ggaacttgtt tattgcagct tataatggtt acaaataaag caatagcatc  8460
```

-continued

```
acaaatttca caaataaagc atttttttca ctgcattcta gttgtggttt gtccaaactc  8520
atcaatgtat cttatcatgt ctggctctag ctatcccgcc cctaactccg cccagttccg  8580
cccattctcc gccccatggc tgactaattt tttttattta tgcagaggcc gaggccgcct  8640
cggcctctga gctattccag aagtagtgag gaggcttttt tggaggccta ggcttttgcg  8700
tcgagacgta cccaattcgc cctatagtga gtcgtattac gcgcgctcac tggccgtcgt  8760
tttacaacgt cgtgactggg aaaaccctgg cgttacccaa cttaatcgcc ttgcagcaca  8820
tccccctttc gccagctggc gtaatagcga agaggcccgc accgatcgcc cttcccaaca  8880
gttgcgcagc ctgaatggcg aatggcgcga cgcgccctgt agcggcgcat taagcgcggc  8940
gggtgtggtg gttacgcgca gcgtgaccgc tacacttgcc agcgccctag cgcccgctcc  9000
tttcgctttc ttcccttcct ttctcgccac gttcgccggc tttccccgtc aagctctaaa  9060
tcggggggctc cctttagggt tccgatttag tgctttacgg cacctcgacc ccaaaaaact  9120
tgattagggt gatggttcac gtagtgggcc atcgccctga tagacggttt ttcgcccttt  9180
gacgttggag tccacgttct ttaatagtgg actcttgttc caaactggaa caacactcaa  9240
ccctatctcg gtctattctt ttgatttata ggggattttg ccgatttcgg cctattggtt  9300
aaaaaatgag ctgatttaac aaaaatttaa cgcgaatttt aacaaaatat taacgtttac  9360
aatttcccag gtggcacttt tcggggaaat gtgcgcggaa ccctatttg tttatttttc  9420
taaatacatt caaatatgta tccgctcatg agacaataac cctgataaat gcttcaataa  9480
tattgaaaaa ggaagagtat gagtattcaa catttccgtg tcgcccttat tcccttttt  9540
gcggcatttt gccttcctgt ttttgctcac ccagaaacgc tggtgaaagt aaaagatgct  9600
gaagatcagt tgggtgcacg agtgggttac atcgaactgg atctcaacag cggtaagatc  9660
cttgagagtt ttcgccccga agaacgtttt ccaatgatga gcacttttaa agttctgcta  9720
tgtggcgcgg tattatccg tattgacgcc gggcaagagc aactcggtcg ccgcatacac  9780
tattctcaga atgacttggt tgagtactca ccagtcacag aaaagcatct tacggatggc  9840
atgacagtaa gagaattatg cagtgctgcc ataaccatga gtgataacac tgcggccaac  9900
ttacttctga caacgatcgg aggaccgaag gagctaaccg cttttttgca caacatgggg  9960
gatcatgtaa ctcgccttga tcgttgggaa ccggagctga attgaagcat accaaacgac 10020
gagcgtgaca ccacgatgcc tgtagcaatg gcaacaacgt tgcgcaaact attaactggc 10080
gaactactta ctctagcttc ccggcaacaa ttaatagact ggatgaggc ggataaagtt 10140
gcaggaccac ttctgcgctc ggcccttccg gctggctggt ttattgctga taaatctgga 10200
gccggtgagc gtgggtctcg cggtatcatt gcagcactgg ggccagatgg taagccctcc 10260
cgtatcgtag ttatctacac gacggggagt caggcaacta tggatgaacg aaatagacag 10320
atcgctgaga taggtgcctc actgattaag cattggtaac tgtcagacca agttactca 10380
tatatacttt agattgattt aaaacttcat ttttaattta aaaggatcta ggtgaagatc 10440
cttttttgata atctcatgac caaaatccct taacgtgagt tttcgttcca ctgagcgtca 10500
gaccccgtag aaaagatcaa aggatcttct tgagatcctt tttttctgcg cgtaatctgc 10560
tgcttgcaaa caaaaaaacc accgctacca gcggtggttt gtttgccgga tcaagagcta 10620
ccaactcttt ttccgaaggt aactggcttc agcagagcgc agataccaaa tactgtcctt 10680
ctagtgtagc cgtagttagg ccaccacttc aagaactctg tagcaccgcc tacatacctc 10740
gctctgctaa tcctgttacc agtggctgct gccagtggcg ataagtcgtg tcttaccggg 10800
ttggactcaa gacgatagtt accggataag gcgcagcggt cgggctgaac ggggggttcg 10860
tgcacacagc ccagcttgga gcgaacgacc tacaccgaac tgagatacct acagcgtgag 10920
ctatgagaaa gcgccacgct tcccgaaggg agaaaggcgg acaggtatcc ggtaagcggc 10980
agggtcggaa caggagagcg cacgagggag cttccagggg gaaacgcctg gtatctttat 11040
agtcctgtcg ggtttcgcca cctctgactt gagcgtcgat ttttgtgatg ctcgtcaggg 11100
gggcggagcc tatggaaaaa cgccagcaac gcggccttt tacggttcct ggccttttgc 11160
tggcctttg ctcacatgtt ctttcctgcg ttatcccctg attctgtgga taaccgtatt 11220
accgcctttg agtgagctga taccgctcgc cgcagccgaa cgaccgagcg cagcgagtca 11280
gtgagcgagg aagcggaaga gcgcccaata cgcaaaccgc ctctccccgc gcgttggccg 11340
attcattaat gcagctggca cgacaggttt cccgactgga aagcgggcag tgagcgcaac 11400
gcaattaatg tgagttagct cactcattag gcaccccagg ctttacactt tatgcttccg 11460
gctcgtatgt tgtgtggaat tgtgagcgga taacaatttc acacaggaaa cagctatgac 11520
catgattacg ccaagcgcgc aattaaccct cactaaaggg aacaaaagct ggagctgca  11579
```

SEQ ID NO: 5 moltype = DNA length = 23
FEATURE Location/Qualifiers
misc_feature 1..23
 note = synthetic primer
source 1..23
 mol_type = other DNA
 organism = synthetic construct
SEQUENCE: 5
ggagctagaa cgattcgcag tta 23

SEQ ID NO: 6 moltype = DNA length = 25
FEATURE Location/Qualifiers
misc_feature 1..25
 note = synthetic primer
source 1..25
 mol_type = other DNA
 organism = synthetic construct
SEQUENCE: 6
ggttgtagct gtcccagtat ttgtc 25

SEQ ID NO: 7 moltype = DNA length = 30
FEATURE Location/Qualifiers
misc_feature 1..30
 note = synthetic probe

```
source                  1..30
                        mol_type = other DNA
                        organism = synthetic construct
SEQUENCE: 7
acagccttct gatgtttcta acaggccagg                                         30

SEQ ID NO: 8            moltype = DNA  length = 22
FEATURE                 Location/Qualifiers
misc_feature            1..22
                        note = synthetic primer
source                  1..22
                        mol_type = other DNA
                        organism = synthetic construct
SEQUENCE: 8
ccagagttcc aagcctccaa ca                                                 22

SEQ ID NO: 9            moltype = DNA  length = 23
FEATURE                 Location/Qualifiers
misc_feature            1..23
                        note = synthetic primer
source                  1..23
                        mol_type = other DNA
                        organism = synthetic construct
SEQUENCE: 9
ggaagtcagt ctgtgctcca atg                                                23

SEQ ID NO: 10           moltype = DNA  length = 19
FEATURE                 Location/Qualifiers
misc_feature            1..19
                        note = synthetic primer
source                  1..19
                        mol_type = other DNA
                        organism = synthetic construct
SEQUENCE: 10
gcatcctcat ggagcacat                                                     19

SEQ ID NO: 11           moltype = DNA  length = 18
FEATURE                 Location/Qualifiers
misc_feature            1..18
                        note = synthetic primer
source                  1..18
                        mol_type = other DNA
                        organism = synthetic construct
SEQUENCE: 11
ctggtcagcc aggagctt                                                      18
```

The invention claimed is:

1. A method of treating a subject having hemophilia A (hemA) or von Willebrand disease in need of plasma Factor VIII without inducing formation of detectable anti-Factor VIII antibodies in the subject, the method comprising:
administering to the subject a therapeutically effective amount of an inflammation suppressor;
administering to the subject a therapeutically effective amount of a CD8+ T cell depleting agent; and
administering to the subject a therapeutically effective amount of a composition comprising a lentiviral vector (LV) comprising a FVIII expression cassette expressibly linked to a megakaryocyte-specific promoter, wherein the FVIII expression cassette comprises:
a sequence that encodes hF8/N6K12RH;
wherein administration is via:
intraosseous (IO) infusion;
and wherein the administering does not induce formation of detectable anti-Factor VIII antibodies against the encoded hF8/N6K12RH in the subject having hemA or von Willebrand disease.

2. The method of claim 1, wherein the inflammation suppressor comprises dexamethasone.

3. The method of claim 2, wherein the dexamethasone is administered in doses of 100 mg/kg at −24 h before, −4 h before, 4 h after, and 24 h after administration of the LV.

4. The method of claim 1, wherein the CD8+T cell depleting agent comprises an anti-CD8 antibody.

5. The method of claim 4, wherein the CD8+T cell depleting agent is an anti-CD8αmAb administered in doses of 4 mg/kg at −1 day before, 4 days after, and 11 days after delivery of the LV.

6. The method of claim 1, wherein the megakaryocyte-specific promoter is a GP1b-alpha promoter.

7. The method of claim 1, which method does not comprise pre-conditioning or myeloablative treatment of the subject.

8. The method of claim 1, wherein the IO infusion is carried out at a rate of 2µL/min to 15 µL/min.

9. The method of claim 1, wherein the IO infusion is carried out at a rate of 0.01 mL/min to 0.5 mL/min.

10. The method of claim 1, wherein the IO infusion is carried out over a period of no more than 45 minutes.

11. The method of claim 1, wherein the LV comprises: SEQ ID NO: 4.

12. The method of claim 1, wherein the subject has HemA and preexisting anti-FVIII inhibitory antibodies.

13. The method of claim 1, wherein the IO infusion is carried out at a rate of 5 µL/min to 12 µL/min.

* * * * *